United States Patent
Kieling et al.

(10) Patent No.: US 11,543,731 B1
(45) Date of Patent: *Jan. 3, 2023

(54) GENERATION OF ENTANGLED PHOTONIC STATES

(71) Applicant: PSIQUANTUM CORP., Palo Alto, CA (US)

(72) Inventors: Konrad Kieling, Potsdam (DE); Terence Rudolph, Palo Alto, CA (US); Mercedes Gimeno-Segovia, Palo Alto, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,576

(22) Filed: Jul. 30, 2021

Related U.S. Application Data

(63) Continuation of application No. 16/691,459, filed on Nov. 21, 2019, now Pat. No. 11,126,062.
(Continued)

(51) Int. Cl.
*G02F 1/35* (2006.01)
*G02F 1/365* (2006.01)

(52) U.S. Cl.
CPC ............ *G02F 1/3501* (2013.01); *G02F 1/365* (2013.01)

(58) Field of Classification Search
CPC ............................... G02F 1/3501; G02F 1/365
See application file for complete search history.

(56) References Cited

U.S. PATENT DOCUMENTS

| | | |
|---|---|---|
| 6,437,413 B1 | 8/2002 | Yamaguchi et al. |
| 7,346,246 B2 | 3/2008 | Munro |

(Continued)

FOREIGN PATENT DOCUMENTS

| | | | |
|---|---|---|---|
| JP | 5437634 B2 * | 3/2014 | ............ B82Y 10/00 |
| JP | 5437634 B2 | 3/2014 | |
| WO | WO 2017/189053 A1 | 11/2017 | |

OTHER PUBLICATIONS

Psiquantum Corp., International Search Report and Written Opinion, PCT/US2019/023756, Jul. 29, 2019, 11 pgs.
(Continued)

*Primary Examiner* — Daniel Petkovsek
(74) *Attorney, Agent, or Firm* — Morgan, Lewis & Bockius LLP

(57) ABSTRACT

A method of generating an m-photon entangled state includes inputting photons into a plurality of sets of modes. Each set of modes is coupled to a different set of modes. The method includes detecting photons in the plurality of sets of modes. The method includes, in accordance with a determination, based on a number of photons detected, that more than m-photons remain in the plurality of sets of modes: performing a second detection operation that includes detecting photons in the plurality of sets of modes; determining, based at least in part on a number of photons detected, whether the photons remaining in the plurality of sets of modes after the second detection operation are in the m-photon entangled state; and in accordance with a determination that the photons remaining in the plurality of sets of modes are in the m-photon entangled state, outputting the remaining photons.

20 Claims, 47 Drawing Sheets

Related U.S. Application Data

(60) Provisional application No. 62/867,166, filed on Jun. 26, 2019, provisional application No. 62/866,357, filed on Jun. 25, 2019, provisional application No. 62/795,481, filed on Jan. 22, 2019, provisional application No. 62/770,645, filed on Nov. 21, 2018, provisional application No. 62/770,648, filed on Nov. 21, 2018.

(56) References Cited

U.S. PATENT DOCUMENTS

| | | | |
|---|---|---|---|
| 7,554,080 | B2 | 6/2009 | Munro |
| 7,667,995 | B1 | 2/2010 | Leuenberger et al. |
| 9,178,154 | B2 | 11/2015 | Bunyk |
| 11,126,062 | B1 * | 9/2021 | Kieling ................ G02F 1/3501 |
| 2003/0055513 | A1 | 3/2003 | Raussendorf et al. |
| 2005/0133780 | A1 | 6/2005 | Azuma |
| 2007/0252081 | A1 | 11/2007 | Munro et al. |
| 2014/0126030 | A1 | 5/2014 | Crespi et al. |
| 2015/0214984 | A1 | 7/2015 | Ahn et al. |
| 2016/0292586 | A1 | 10/2016 | Rigetti et al. |
| 2017/0061317 | A1 | 3/2017 | Chow et al. |
| 2017/0082494 | A1 | 3/2017 | Hughes et al. |
| 2018/0114138 | A1 | 4/2018 | Monroe et al. |
| 2019/0244128 | A1 | 8/2019 | Choi |

OTHER PUBLICATIONS

Ying, "Entangled Many-body States as Resources of Quantum Information Processing." Jul. 23, 2013 (Jul. 23, 2013) Retrieved on Jun. 9, 2019 (Jun. 9, 2019) from http://www.nsx0.quantumlah.org/media/thesis/CQT_130723_LiYing.pdf entire document.

Psiquantum Corp., International Search Report and Written Opinion, PCT/US2019/021241, Jul. 2, 2019, 13 pgs.

Fowler, A.G. and Goyal, "Topological cluster state quantum computing." arXiv:0805.3202v2 (quant-ph), available online: Feb. 25, 2009 (Feb. 25, 2009), Fig 1, 1a, section 1, 11 (online) URL https://pdfs.semanticscholar.org/f1d0/5ccb2ad6d3a61e20c0888c49fca3c8a50a4c.pdf.

Psiquantum Corp., International Search Report and Written Opinion, PCT/US2019/21711, Jul. 22, 2019, 17 pgs.

Browne, Resource-efficient linear optical quantum computation, QOLS, Blackett Laboratory, Imperial College London, Feb. 9, 2005, 5 pgs.

Gimeno-Segovia, Mercedes, From three-photon GHZ states to ballistic universal quantum computation, Phys. Rev. Lett. 115, 020502, Jul. 8, 2015, 6 pgs.

Pant, Percolation Thresholds for Photonic Quantum, Computing, Cornell University, Quantum Physics, Jan. 13, 2017, 14 pgs.

Psiquantum Corp., International Preliminary Report on Patentability, PCT/US2019/021711, Sep. 15, 2020, 14 pgs.

Psiquantum Corp., International Preliminary Report on Patentability, PCT/US2019/021241, Sep. 8, 2020, 10 pgs.

Psiquantum Corp., International Search Report / Written Opinion, PCT/US2019/045563, Oct, 25, 2019, 3 pgs.

Caspani et al. "Integrated Sources of Photon Quantum States Based on Nonlinear Optics." In:Light; Science & Applications 6. Nov. 17, 2017 (Nov. 17, 2017) Retrieved on Oct. 7, 2019 (Oct. 7, 2019) from <https://www.nature.com/articles/lsa2017100.pdf> entire document.

Dusek. "Discrimination of the Bell States of Qudits by means of linear optics." In: Optics Communications 199. 1-4, Jul. 23, 2001 (Jul. 23, 2001) Retrieved on Oct. 7, 2019 (Oct. 7, 2019) from <https://arxiv.org/pdf/quant-ph/0107119.pdf> entire document.

Cao et al., "Generation of Atomic Entangled States Using Linear Optics." In: arXiv, Preprint quant-ph/0311086, Nov. 13, 2003 (Nov. 13, 2003) Retrieved on Oct. 7, 2019 (Oct. 7, 2019) from <https://arxiv.org/ftp/quant-ph/papers/0311/0311086.pdf> entire document.

Schon et al. "Sequential Generation of Entangled Multiqubit States." In: Physical Review Letter, Jan. 18, 2005, (Jan. 18, 2005) Retrieved on Oct. 7, 2019, (Oct. 7, 2019) from <https://arxiv.org/pdf/quant-ph/0501096.pdf> entire document.

Kieling, Notice of Allowance, U.S. Appl. No. 16/691,459, dated May 3, 2021, 9 pgs.

PSIQuantum Corp., International Preliminary Report on Patentability, PCT/US2019/023756, dated Sep. 29, 2020, 8 pgs.

PSIQuantum Corp., International Preliminary Reporton Patentability, PCT/US2019/045563, dated Feb. 9, 2021, 9 pgs.

Gimeno-Segovia, Notice of Allowance, U.S. Appl. No. 16/621,994, dated Mar. 30, 2022, 11 pgs.

Rudolph, Notice of Allowance, U.S. Appl. No. 16/689,964, dated May 12, 2022, 10 pgs.

* cited by examiner

2200

2202 — Input a respective photon into each mode of a first plurality of modes.

The plurality of modes includes at least a first pair of modes and a second pair of modes.

2204 — Perform a first detection operation that includes detecting zero or more photons in a second plurality of modes that is coupled with the first plurality of modes

2206 — In accordance with a determination, based on a number of photons detected in the first detection operation, that more than m photons remain in the first plurality of modes after the first detection operation:

2208 — Perform a second detection operation that includes detecting zero or more photons in a third plurality of modes coupled with the first plurality of modes

2210 — Determine, based at least in part on a number of photons detected in the second detection operation, whether the photons remaining in the first plurality of modes after the second detection operation are in the entangled state or a state convertible to the entangled state

2212 — In accordance with a determination that the photons remaining in the first plurality of modes after the second detection operation are in the entangled state or a state convertible to the entangled state, output the photons remaining in the first plurality of modes.

FIG. 22

GENERATION OF ENTANGLED PHOTONIC STATES

RELATED APPLICATIONS

This application is a continuation of U.S. patent application Ser. No. 16/691,459, entitled "GENERATION OF ENTANGLED PHOTONIC STATES," filed Nov. 21, 2019, now U.S. Pat. No. 11,126,062 B1, issued on Sep. 21, 2021, which claims priority to U.S. Provisional Application No. 62/867,166, filed Jun. 26, 2019; U.S. Provisional Application No. 62/866,357, filed Jun. 25, 2019; U.S. Provisional Application No. 62/795,481, filed Jan. 22, 2019; U.S. Provisional Application No. 62/770,645, filed Nov. 21, 2018; and U.S. Provisional Application No. 62/770,648, filed Nov. 21, 2018, each of which is incorporated herein by reference in its entirety.

This application is related to U.S. patent application Ser. No. 16/689,964, entitled "SYSTEMS AND METHODS FOR GENERATING ENTANGLEMENT BETWEEN QUBITS," filed Nov. 20, 2019 and U.S. patent application Ser. No. 16/691,450, entitled "GENERATION OF AN ENTANGLED PHOTONIC STATE FROM PRIMITIVE RESOURCES", filed Nov. 19, 2019, each of which is incorporated by reference herein in its entirety.

TECHNICAL FIELD

This relates generally to photonic devices (or hybrid electronic/photonic devices) and, more specifically, to photonic devices (or hybrid electronic/photonic devices) for generating entangled photonic states (e.g., as resources for quantum computing, quantum computation, quantum metrology, and other quantum information processing tasks).

BACKGROUND

One of the main barriers to widespread use of quantum technologies, such as quantum computing, quantum communications, and the like, is the ability to reliably generate entanglement among two or more physical quantum systems, e.g., between two qubits. In the specific case of quantum computation, many quantum computing algorithms require cluster states of multiple qubits, or, more generally, graph states. A graph state is a highly entangled multi-qubit state that can be represented visually as a graph with nodes representing qubits and edges representing entanglement between the qubits. However, various problems that either inhibit the generation of entangled states or destroy the entanglement once created (e.g., such as decoherence) have frustrated advancements in quantum technologies that rely on the use of highly entangled quantum states. Furthermore, in some qubit architectures, e.g., photonic architectures, the generation of entangled states of multiple qubits is an inherently probabilistic process that may have a low probability of success. For example, current methods for producing Bell states from single photons have success probabilities of around 20% (corresponding to an 80% failure rate). Accordingly, there remains a need for improved systems and methods for producing entangled states.

SUMMARY

Some embodiments described herein use single-photons as the basis for qubits (e.g., each qubit is path encoded by a single-photon's occupation in two distinct waveguides). Using integrated optics, single-photons can be made to have low decoherence rates, thus solving the problem of maintenance of entangled states once created. However, in general, collective manipulations of single-photons have a non-deterministic nature, i.e., the success probability of most multi-qubit gates, e.g., entangling gates, is generally less than 1. Also, the generation of entangled states based on single-photons is a probabilistic process rather than a deterministic one. The non-deterministic nature of certain quantum gates poses a technical challenge for quantum computers using single photons because many additional resources may be required to increase the success probability of any given non-deterministic quantum process.

The above deficiencies and other related problems are reduced or eliminated by the methods and devices described herein for generating groups of photons in entangled states. In some embodiments, a resource state generation scheme is provided whereby a class of primitive non-qubit resource states, called "primates," are fused into Greenberger-Horne-Zeilinger (GHZ) states. This scheme can be used in turning 2n photons to an n-GHZ state (i.e., n photons in a GHZ state). To that end, non-qubit resource states (primates) are fused into a larger entangled (e.g., qubit) state of photons. In some embodiments, various techniques are employed for increasing the success probability of generating these primates. For example, a "bleeding" or "thin-slicing" scheme is employed in some embodiments. As another example, in some embodiments, the outputs of primate generators are multiplexed, e.g., by detecting which primates were successfully generated and then using a switch to direct at least one successfully generated primate to an output, thus increasing the apparent success probability of a primate source. Dissecting the process for generating larger entangled (e.g., qubit) states of photons into multiplexable or "thin-sliceable" primate generators leads to a dramatic reduction in the number of resources required to generate the larger entangled states (e.g., an n-GHZ state).

To that end, embodiments of the present disclosure provide a method of generating and multiplexing primates. The method is performed at an apparatus that includes a plurality of first optical devices and a second optical device. Each first optical device includes a respective first pair of waveguides comprising a respective first waveguide and a respective second waveguide that are coupled together; and a respective second pair of waveguides comprising a respective third waveguide and a respective fourth waveguide that are coupled together. The second optical device includes a first pair of waveguides comprising a first waveguide and a second waveguide that are coupled together. The method includes providing a photon to each waveguide of the first pair of waveguides of the second optical device. The method further includes, for each first optical device of the plurality of first optical devices: providing a photon to each waveguide of the respective first pair of waveguides and the respective second pair of waveguides of the first optical device; and performing a first fusion on the respective second waveguide and the respective third waveguide of the first optical device. The first fusion includes a detection operation that produces a detection pattern for the first optical device. The method further includes selecting a respective first optical device based at least in part on the detection pattern for the respective first optical device. The method further includes performing a second fusion on the respective fourth waveguide of the selected first optical device and the first waveguide of the second optical device.

Further embodiments of the present disclosure provide an apparatus for generating and multiplexing primates. The apparatus includes a plurality of first optical devices and a second optical device. Each first optical device includes: a respective first pair of waveguides comprising a respective first waveguide and a respective second waveguide that are coupled together; a respective second pair of waveguides comprising a respective third waveguide and a respective fourth waveguide that are coupled together; a first fusion gate that includes one or more detectors. Each first fusion gate is configured to perform a first fusion on the respective second waveguide and the respective third waveguide of a respective first optical device. The first fusion produces a first detection pattern for the respective first optical device. The apparatus further includes a multiplexer to: select a respective first optical device of the plurality of first optical devices based at least in part on the detection pattern for the respective first optical device; and output photons from the respective first optical device.

Further embodiments of the present disclosure provide a method of "bleeding" ("thin-slicing") to generate primates. The method is performed at an apparatus that includes one or more first optical devices and a second optical device. Each first optical device includes: a respective first pair of waveguides comprising a respective first waveguide and a respective second waveguide that are coupled together; a respective second pair of waveguides comprising a respective third waveguide and a respective fourth waveguide that are coupled together. The second optical device includes a first pair of waveguides comprising a first waveguide and a second waveguide that are coupled together. The method includes providing a photon to each waveguide of the first pair of waveguides of the second optical device. The method further includes, for a respective first optical device of the one or more of first optical devices: providing a photon to each waveguide of the respective first pair of waveguides and the respective second pair of waveguides; and performing a first fusion on the respective second waveguide and the respective third waveguide of the respective first optical device. Performing the first fusion includes: performing a first detection operation that produces a first detection pattern for the respective first optical device; determining that the first detection pattern heralds a photonic state capable of being converted to a predefined photonic resource state; and in accordance with the determination that the first detection pattern heralds a photonic state capable of being converted to the predefined photonic resource state, performing a second detection operation that produces a second detection pattern for the respective first optical device; and in accordance with a determination that the first detection pattern and the second detection pattern, collectively, herald the predefined photonic resource state, performing a second fusion on the respective fourth waveguide of the respective first optical device and the first waveguide of the second optical device.

Further embodiments of the present disclosure provide an apparatus for "bleeding" ("thin-slicing") to generate primates. The apparatus includes a first optical device, including: a first pair of waveguides comprising a first waveguide and a second waveguide that are coupled together; a second pair of waveguides comprising a third waveguide and a fourth waveguide that are coupled together; and a first fusion gate configured to perform a first fusion on the second waveguide and the third waveguide of the first optical device. The first fusion includes performing a first detection operation that produces a first detection pattern for the first optical device; and performing a second detection operation in accordance with a determination that the first detection pattern heralds a photonic state capable of being converted to a predefined photonic resource state. The second detection operation produces a second detection pattern for the first optical device. The apparatus further includes a switch configured to output photons from the first optical device in accordance with a determination that the first detection pattern and the second detection pattern herald the predefined photonic state.

Thus, methods and devices are provided herein for generating primates. In some embodiments, the primates are used to generate entangled states of photons, which can, in turn, be used to generate graph states. Generating entangled states of photons (e.g., qubit states) from primates (e.g., non-qubit states) is advantageous because the entangled states can be generated with significantly fewer resources, leading to an overall improvement in efficiency for generating graph states.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures. Letters following reference numeral are meant to distinguish different instances of the same part on the same sheet. Two instances of the same part on different sheets may be labeled with the same letter, but they are not necessarily the same instance of the part.

FIG. 22 is a flowchart illustrating a method of obtaining a pair of photons in a Bell state, in accordance with some embodiments.

DETAILED DESCRIPTION

Figure 1:
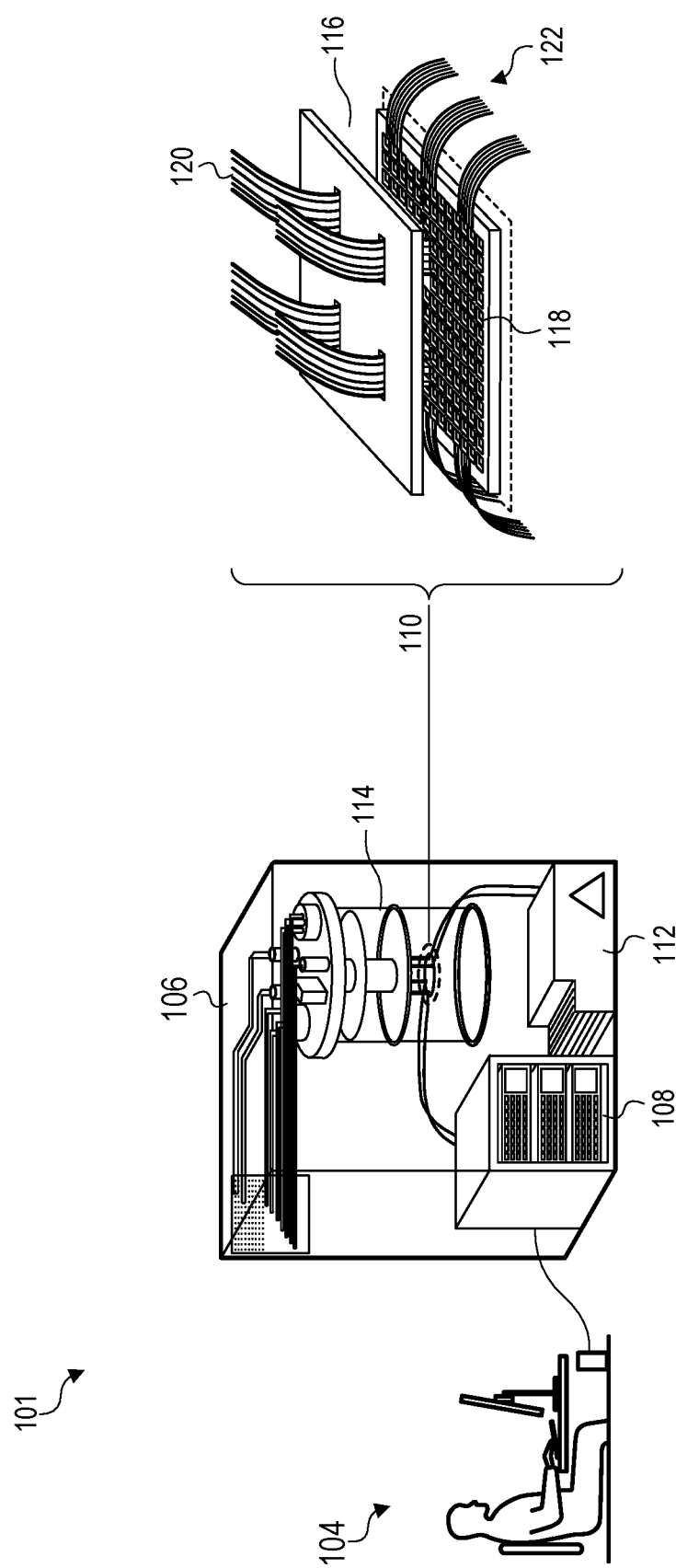
FIG. 1 shows a hybrid computing system in accordance with one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

I. INTRODUCTION TO QUBITS AND PATH ENCODING

The dynamics of quantum objects, e.g., photons, electrons, atoms, ions, molecules, nanostructures, and the like, follow the rules of quantum theory. More specifically, in quantum theory, the quantum state of a quantum object, e.g., a photon, is described by a set of physical properties, the complete set of which is referred to as a mode. In some embodiments, a mode is defined by specifying the value (or distribution of values) of one or more properties of the quantum object. For example, again for photons, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields) and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon can be propagating in. Furthermore, the temporal mode $t_j$ is determined by which one of a set of discrete time periods (referred to herein as "bins") the photon can be present in. In some embodiments, the temporal discretization of the system can be provided by the timing of a pulsed laser which is responsible for generating the photons. In the examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Furthermore, in the description that follows, embodiments will be described that employ photonic waveguides to define the spatial modes of the photon. However, one of ordinary skill having the benefit of this disclosure will appreciate that any type of mode, e.g., polarization modes, temporal modes, and the like, can be used without departing from the scope of the present disclosure.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. Because modes are the complete set of properties, this description is sufficient. For example, a multi-mode, two particle Fock state $|1001\rangle_{1,2,3,4}$ specifies a two-particle quantum state with one photon in mode 1, zero photons in mode 2, zero photons in mode three, and 1 photon in mode four. Again, as introduced above, a mode can be any set of properties of the quantum object (and can depend on the single particle basis states being used to define the quantum state). For the case of the photon, any two modes of the electromagnetic field can be used, e.g., one may design the system to use modes that are related to a degree of freedom that can be manipulated passively with linear optics. For example, polarization, spatial degree of freedom, or angular momentum, could be used. For example, the four-mode system represented by the two particle Fock state $|1001\rangle_{1,2,3,4}$ can be physically implemented as four distinct waveguides with two of the four waveguides (representing mode 1 and mode 4, respectively) having one photon travelling within them. Other examples of a state of such a many-body quantum system are the four photon Fock state $|1111\rangle_{1,2,3,4}$ that represents each waveguide containing one photon and the four photon Fock state $|2200\rangle_{1,2,3,4}$ that represents waveguides one and two respectively housing two photons and waveguides three and four housing zero photons. For modes having zero photons present, the term "vacuum mode" is used. For example, for the four photon Fock state $|2200\rangle_{1,2,3,4}$ modes 3 and 4 are referred to herein as "vacuum modes" (also referred to as "ancilla modes").

As used herein, a "qubit" (or quantum bit) is a physical quantum system with an associated quantum state that can be used to encode information. Qubits, in contrast to classical bits, can have a state that is a superposition of logical values such as 0 and 1. In some embodiments, a qubit is "dual-rail encoded" such that the logical value of the qubit is encoded by occupation of one of two modes by exactly one photon (a single photon). For example, consider the two spatial modes of a photonic system associated with two distinct waveguides. In some embodiments, the logical 0 and 1 values can be encoded as follows:

$$|0\rangle_L = |10\rangle_{1,2} \quad (1)$$

$$|1\rangle_L = |01\rangle_{1,2} \quad (2)$$

where the subscript "L" indicates that the ket represents a logical value (e.g., a qubit value) and, as before, the notation $|ij\rangle_{1,2}$ on the right-hand side of the Equations (1)-(2) above indicates that there are i photons in a first waveguide and j photons in a second waveguide, respectively (e.g., where i and j are integers). In this notation, a two qubit state having a logical value $|01\rangle_L$ (representing a state of two qubits, the first qubit being in a '0' logical state and the second qubit being in a '1' logical state) may be represented using photon occupations across four distinct waveguides by $|1001\rangle_{1,2,3,4}$ (i.e., one photon in a first waveguide, zero photons in a second waveguide, zero photons in a third waveguide, and one photon in a fourth waveguide). In some instances, throughout this disclosure, the various subscripts are omitted to avoid unnecessary mathematical clutter.

A Bell pair is a pair of qubits in any type of maximally entangled state referred to as a Bell state. For dual rail encoded qubits, examples of Bell states include:

$$|\Phi^+\rangle = \frac{|0\rangle_L|0\rangle_L + |1\rangle_L|1\rangle_L}{\sqrt{2}} = \frac{|1010\rangle + |0101\rangle}{\sqrt{2}} \quad (3)$$

$$|\Phi^-\rangle = \frac{|0\rangle_L|0\rangle_L - |1\rangle_L|1\rangle_L}{\sqrt{2}} = \frac{|1010\rangle - |0101\rangle}{\sqrt{2}} \quad (4)$$

$$|\Psi^+\rangle = \frac{|0\rangle_L|1\rangle_L + |1\rangle_L|0\rangle_L}{\sqrt{2}} = \frac{|1001\rangle + |0110\rangle}{\sqrt{2}} \quad (5)$$

$$|\Psi^-\rangle = \frac{|0\rangle_L|1\rangle_L - |1\rangle_L|0\rangle_L}{\sqrt{2}} = \frac{|1001\rangle - |0110\rangle}{\sqrt{2}} \quad (6)$$

In a computational basis (e.g., logical basis) with two states, a Greenberger-Horne-Zeilinger state is a quantum superposition of all qubits being in a first state of the two states superposed with all of qubits being in a second state. Using logical basis described above, the general M-qubit GHZ state can be written as:

$$|GHZ\rangle = \frac{|0\rangle^{\otimes M} + |1\rangle^{\otimes M}}{\sqrt{2}} \quad (7)$$

II. A HYBRID CLASSICAL-QUANTUM COMPUTING SYSTEM

FIG. 1 shows a hybrid computing system in accordance with one or more embodiments. The hybrid computing system 101 includes a user interface device 104 that is communicatively coupled to a hybrid quantum computing (QC) sub-system 106, described in more detail below in FIG. 2. The user interface device 104 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 104 provides an interface with which a user can interact with the hybrid QC subsystem 106. For example, the user interface device 104 may run software, such as a text editor, an interactive development environment (IDE), command prompt, graphical user interface, and the like so that the user can program, or otherwise interact with, the hybrid QC subsystem 106 to run one or more quantum algorithms. In other embodiments, the hybrid QC subsystem 106 may be pre-programmed and the user interface device 104 may simply be an interface where a user can initiate a quantum computation, monitor the progress, and receive results from the hybrid QC subsystem 106. Hybrid QC subsystem 106 further includes a classical computing system 108 coupled to one or more quantum computing chips 110. In some examples, the classical computing system 108 and the quantum computing chips 110 can be coupled to other electronic and/or optical components 112, e.g., pulsed pump lasers, microwave oscillators, power supplies, networking hardware, etc. In some embodiments that require cryogenic operation, the quantum computing chips 110 can be housed within a cryostat, e.g., cryostat 114. On other embodiments where cryogenic operation is not required, the quantum computing chips 110, the cryostat 114 may be replaced with any other enclosure. In some embodiments, the quantum computing chips 110 can include one or more constituent chips, e.g., hybrid control electronics 116 and integrated photonics chip 118. Signals can be routed on- and off-chip any number of ways, e.g., via optical interconnects 120 and via other electronic interconnects 122. In addition, the hybrid computing system 101 may employ a quantum computing process, e.g., measurement-based quantum computing (MBQC), circuit-based quantum computing (CBQC) or any other quantum computing scheme.

Figure 2:
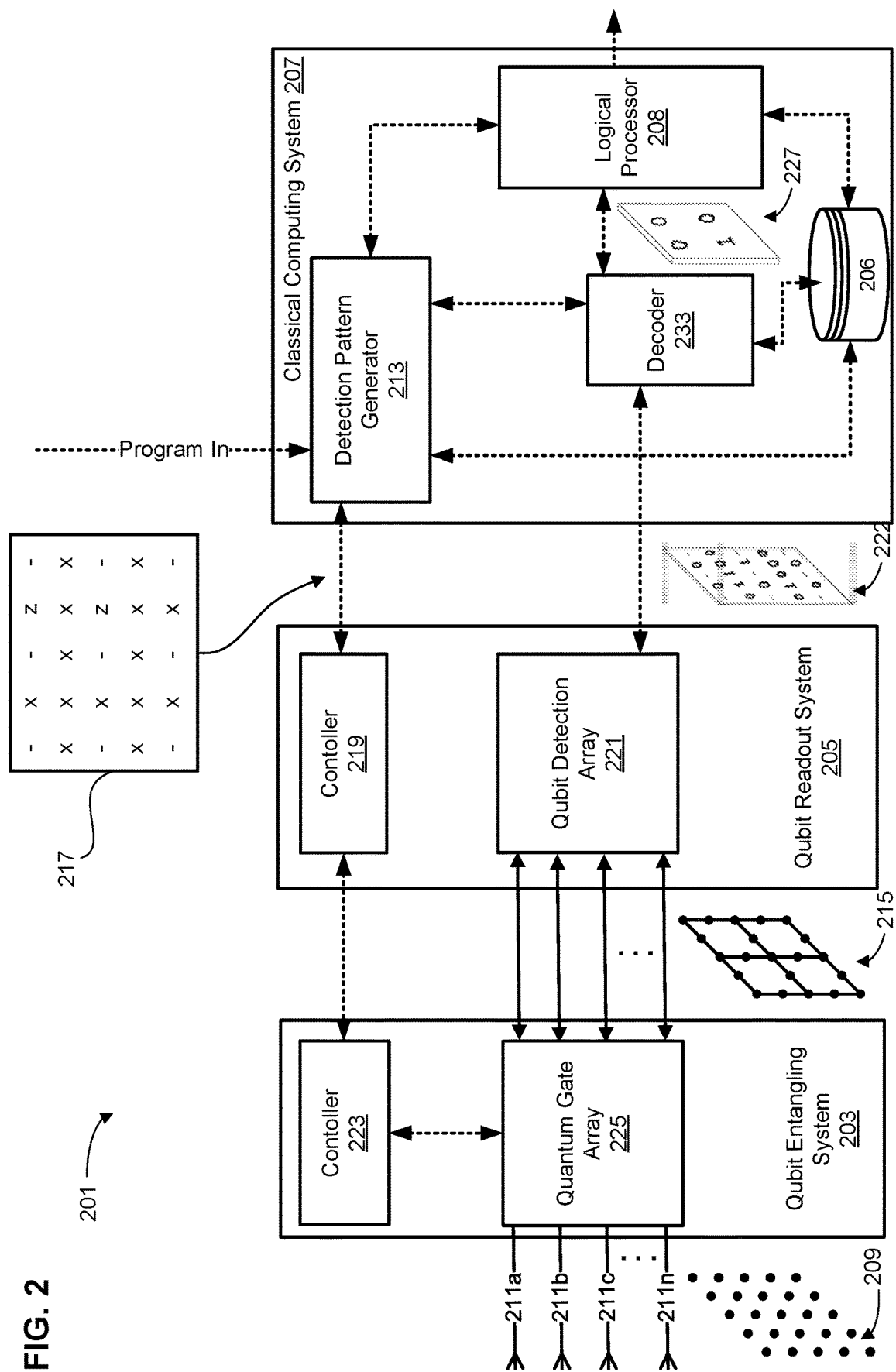
FIG. 2 shows a hybrid quantum computing system in accordance with some embodiments.

FIG. 2 shows a block diagram of a hybrid QC system 201 in accordance with some embodiments. Such a system can be associated with the hybrid computing system 101 introduced above in reference to FIG. 1. In FIG. 2, solid lines represent quantum information channels and dashed represent classical information channels. The hybrid QC system 201 includes a qubit entangling system 203, qubit readout circuit 205, and classical computing system 207. In some embodiments, the qubit entangling system 203 takes as input a collection of N physical qubits, e.g., physical qubits 209 (also represented schematically as inputs 211a, 211b, 211c, . . . , 211n) and generates quantum entanglement between two or more of them to generate an entangled state 215. For example, in the case of photonic qubits, the qubit entangling system 203 can be a linear optical system such as an integrated photonic circuit that includes waveguides, beam splitters, photon detectors, delay lines, and the like. In some examples, the entangled state 215 can be a lattice, cluster, or graph state, or one part of a larger lattice, cluster, or graph state that is created over the course of several clock cycles of the quantum computer. In some embodiments, the input qubits 209 can be a collection of quantum systems and/or particles and can be formed using any qubit architecture. For example, the quantum systems can be particles such as atoms, ions, nuclei, and/or photons. In other examples, the quantum systems can be other engineered quantum systems such as flux qubits, phase qubits, or charge qubits (e.g., formed from a superconducting Josephson junction), topological qubits (e.g., Majorana fermions), or spin qubits formed from vacancy centers (e.g., nitrogen vacancies in diamond). Furthermore, for the sake of clarity of description, the term "qubit" is used herein although the system can also employ quantum information carriers that encode information in a manner that is not necessarily associated with a binary bit. For example, qudits can be used, i.e., quantum systems that can encode information in more than two quantum states in accordance with some embodiments.

In accordance with some embodiments, the hybrid QC system 201 can be a quantum circuit-based quantum computer, a measurement-based quantum computer, or any other type of quantum computer. In some embodiments, a software program (e.g., a set of machine-readable instructions) that represents the quantum algorithm to be run on the hybrid QC system 201 can be passed to a classical computing system 207 (e.g., corresponding to system 108 in FIG. 1 above). The classical computing system 207 can be any type of computing device such as a PC, one or more blade servers, and the like, or even a high-performance computing system such as a supercomputer, server farm, and the like. Such a system can include one or more processors (not shown) coupled to one or more computer memories, e.g., memory 206. Such a computing system will be referred to herein as a "classical computer." In some examples, the software program can be received by a classical computing module, referred to herein as a detection pattern generator 213. One function of the detection pattern generator 213 is to generate a set of machine-level instructions from the input software program (which may originate as code that can be more easily written by a user to program the quantum computer), i.e., the detection pattern generator 213 can operate as a compiler, logic processor, and/or encoder to allow software programs to be run on the quantum computer. Detection pattern generator 213 can be implemented as pure hardware, pure software, or any combination of one or more hardware or software components or modules. In some examples, the compiled machine-level instructions take the form of one or more data frames that instruct the qubit readout circuit to make one or more quantum measurements on the entangled state 215. Measurement pattern 217 (e.g., a data frame) is one example of the set of measurements and/or gates that should be applied to the qubits of entangled state 215 during a certain clock cycle as the program is executed. In other examples, e.g., the measurement pattern 217 can include instructions for applying multi-qubit measurements and/or multi-qubit gates, e.g., in the case where a fusion gate is desired to be applied to two or more qubits or when stabilizer measurements are being performed. In some embodiments, several measurement patterns 217 can be stored in memory 206 as classical data. Generally, the measurement patterns 217 can dictate whether or not a detector from the qubit detection array 221 of the qubit readout circuit 205 should make a measurement on a given qubit that makes up the entangled state 215. In addition, the measurement pattern 217 can also store which basis (e.g., Pauli X, Y, Z, etc.) the measurement should be made in order to execute the program. In some examples, the measurement pattern 217 can also include a set of gates that should be applied by the qubit entangling circuit to the next set of physical qubits 209 that are to be processed at some future clock cycle of the hybrid QC system 201.

A controller circuit 219 of the qubit readout circuit 205 can receive data that encodes the measurement pattern 217 and generate the configuration signals necessary to drive a set of detectors within the qubit detection array 221. The detectors can be any detector that can detect the quantum states of one or more of the qubits in the entangled state 215. For example, for the case of photonic qubits, the detectors can be single photon detectors that are coupled to one or more waveguides, beam splitters, interferometers, switches, polarizers, polarization rotators and the like. One of ordinary skill will appreciate that many types of detectors may be used depending on the particular qubit architecture.

In some embodiments, the result of applying the measurement pattern 217 to the qubit detection array is a readout operation that "reads out" the quantum states of the qubits in the entangled state 215. Once this measurement is accomplished, the quantum information stored within the entangled state 215 is converted to classical information that corresponds to a set of eigenvalues that are measured by the detectors, referred to herein as "measurement outcomes." These measurement outcomes can be stored in a measurement outcome data frame, e.g., data frame 222 and passed back to the classical computing system for further processing.

In some embodiments, any of the submodules in the hybrid QC system 201, e.g., controller 223, quantum gate array 225, qubit detection array 221, controller circuit 219, detection pattern generator 213, decoder 233, and logical processor 208 can include any number of classical computing components such as processors (central processing units (CPUs), general processing units (GPUs), tensor processing units (TPUs)) memory (any form of random access memory (RAM), read-only memory (ROM)), hard coded logic components (classical logic gates such as AND, OR, XOR, etc.) and/or programmable logic components such as field programmable gate arrays (field programmable gate arrays (FPGA)s and the like). These modules can also include any number of application specific integrated circuits (ASICs), microcontroller units (MCUs), systems on a chip (SOCs), and other similar microelectronics.

As described herein, the logical qubit measurement outcomes 227 can be fault tolerantly recovered, e.g., via decoder 233, from the measurement outcomes 222 of the physical qubits. In the case of a cluster state that is also a stabilizer state, the error syndrome generated by the measurement of joint parity measurements (formed from the combination of one or more stabilizer measurements) are used by the decoder to identify and correct errors so that the correct logical qubit measurement outcome can be determined. Logical processor 208 can then process the logical outcomes as part of the running of the program. As shown, the logical processor 208 can feed back information to the detection pattern generator 213 to affect downstream gates and/or measurements to ensure that the computation proceeds fault tolerantly.

In accordance with some embodiments, it may be beneficial to synchronize, or otherwise coordinate in time, the actions of any or all of the components of the hybrid QC system. Advantageously, one or more embodiments provide systems and methods for clock signal generation and distribution using residual light (i.e., photons) from a train of pulses originating from the pump laser, e.g., housed within electronic and/or optical components 212 shown in FIG. 1.

In the description that follows, embodiments are described that employ spatial modes of photons as the qubit system, but one of ordinary skill will appreciate that any type of qubit described by any type of mode can be employed without departing from the scope of the present disclosure. Furthermore, in what follows, photonic waveguides are used to define the spatial modes of the photon. However, one of ordinary skill having the benefit of this disclosure will appreciate that any type of mode, e.g., polarization modes, temporal modes, and the like, can be used without departing from the scope of the present disclosure. The diagrams shown in the remaining figures are schematic diagrams with each horizontal line representing a mode of a quantum system, e.g., a waveguide.

III. DETECTION UNITS AND FUSION GATES

Figure 3A:
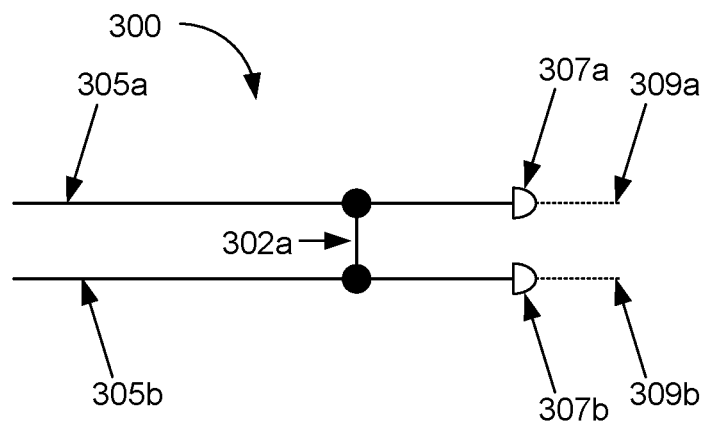
FIG. 3A illustrates an optical device for detecting photons (sometimes called a detection unit), in accordance with some embodiments.

FIG. 3A illustrates an optical device 300 for detecting photons (sometimes called a detection unit 300), in accordance with some embodiments. Detection unit 300 includes a pair of waveguides (e.g., waveguide 305a and waveguide 305b). Detection unit 300 further includes a set of detectors (e.g., detectors 307a and 307b), which are configured to detect photons in waveguides 305a and 305b. For example, detectors 307 are configured to detect photons in waveguides 305 by virtue of the fact that each waveguide 305 terminates on a respective detector 307.

One of ordinary skill having the benefit of this disclosure will appreciate that the particular type of detector employed in the systems disclosed herein is not critical and can be chosen to be any type of number resolving photon detector, e.g., superconducting nanowire single photon detectors (SNSPD), transition edge sensors (TES), a charge integration photon detector (CIPD), single photon avalanche diodes (SPAD), avalanche photodiode (APD), and the like. In some embodiments, one or more detectors can block the photon's path, i.e., they can be located directly in the optical path of the photon traveling in the waveguide. In some embodiments, one or more detectors need not be directly in the optical path of the photon but instead can be located next to the waveguide (e.g., on top of or to the side of the waveguide) such that evanescent coupling of the photon into the detector is possible.

Waveguides 305a and 305b are coupled together by a coupling 302a (e.g., a beam splitter, such as one of those described with reference to FIGS. 15A-15C). Coupling 302a causes photons that are input into either one of waveguides 305a and 305b to be in a quantum superposition state after passing through the coupling 302a. Accordingly, due to the presence of the coupling 302a, the detection of one or more photons at a detector 307 does not necessarily allow for the determination of which waveguide 305 the detected photon originated from. For example, if detector 307a detects a photon, this photon could have originated from either waveguide 305a or waveguide 305b. In some embodiments, the reflectivity of the beam splitter used to implement the coupling 302a will determine the probability of detecting a photon at a detector given that the photon originated in a certain waveguide. For example, in the case that coupling 302a is implemented as a 50/50 beam splitter, a photon originating in one waveguide (e.g., waveguide 305a) has an equal probability of being detected by either detector 307a or 307b. Thus, detecting a photon by detector 307b does allow a certain determination of where the detected photon originated from; instead the detection merely allows for a determination that there is a 50% chance that the photon originated in either detector. Such probabilistic detection schemes can be important when it is desired to preserve the coherence of the state of undetected photon.

Optical device 300 further includes classical channels 309 (e.g., classical channel 309a and classical channel 309b). Classical channels 309 output classical information indicating a result of detection operations by detectors 307 (e.g., a logical high or low to indicate that a respective detector did or did not detect a photon, or a value indicating a number of photons detected by the respective detector). The results of a detection operation are sometimes referred to herein as a "detection pattern." Detection patterns may be used to determine whether an attempted probabilistic operation (e.g., a fusion, as described) was successful.

Note that a detection operation need not detect any photons. In some embodiments, a detection operation is an attempt to detect photons. For example, a detection pattern may indicate that no photons were detected by the detection operation. In some embodiments, a detection operation includes a read out operation of the detectors, regardless of whether the detectors registered any photons. In some embodiments, the read out operation is performed based on a clock cycle of the quantum computer (e.g., synchronized to a clock cycle of the quantum computer).

Figure 3B:
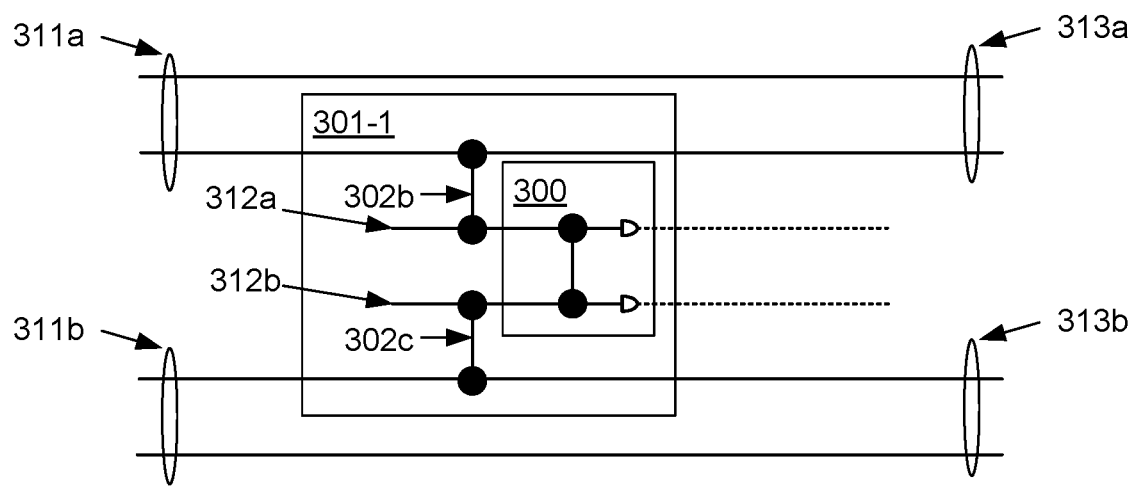
FIGS. 3B-3D illustrate optical devices for fusing groups of photons (sometimes called fusion gates), in accordance with some embodiments.
Figure 3C:
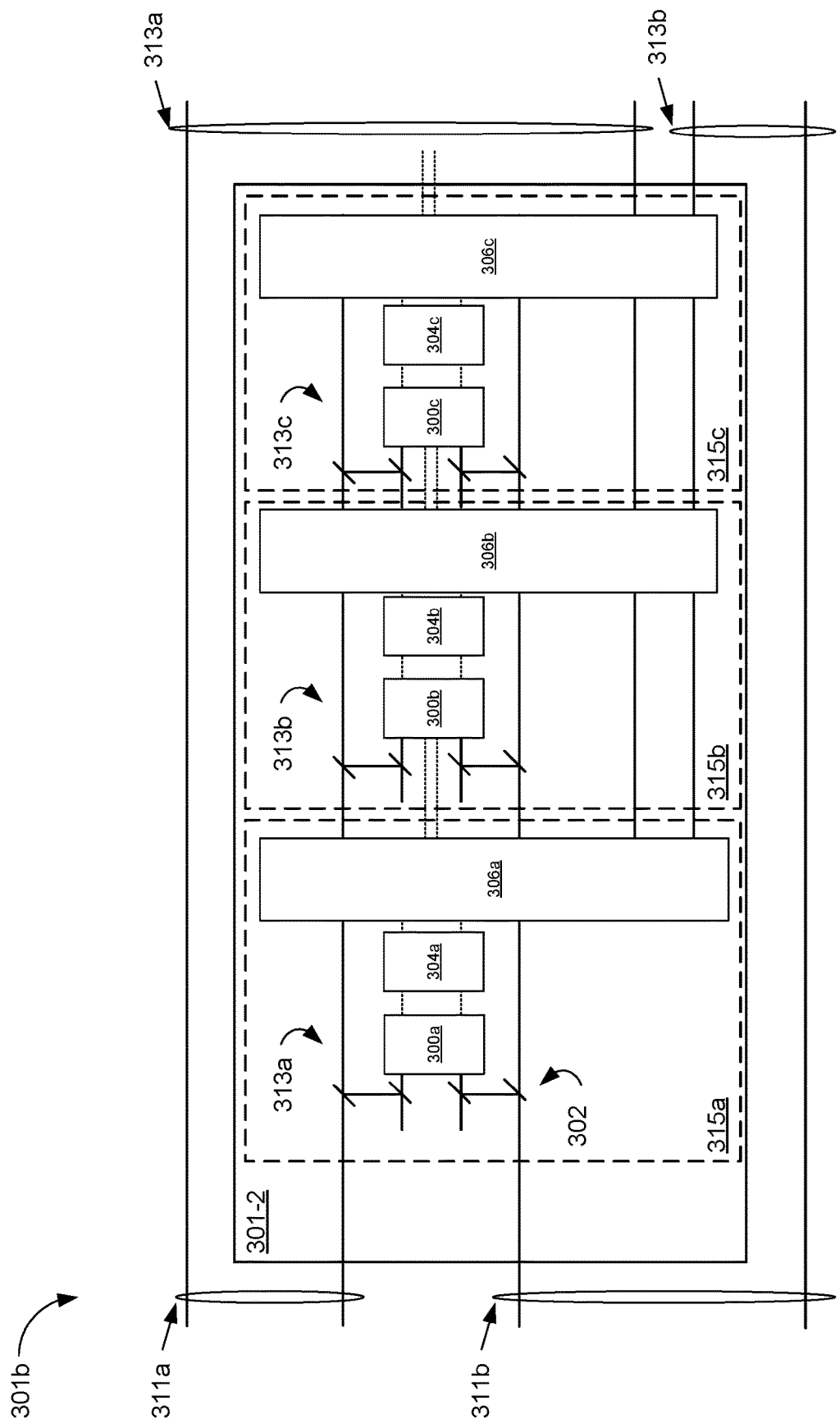
Figure 3D:
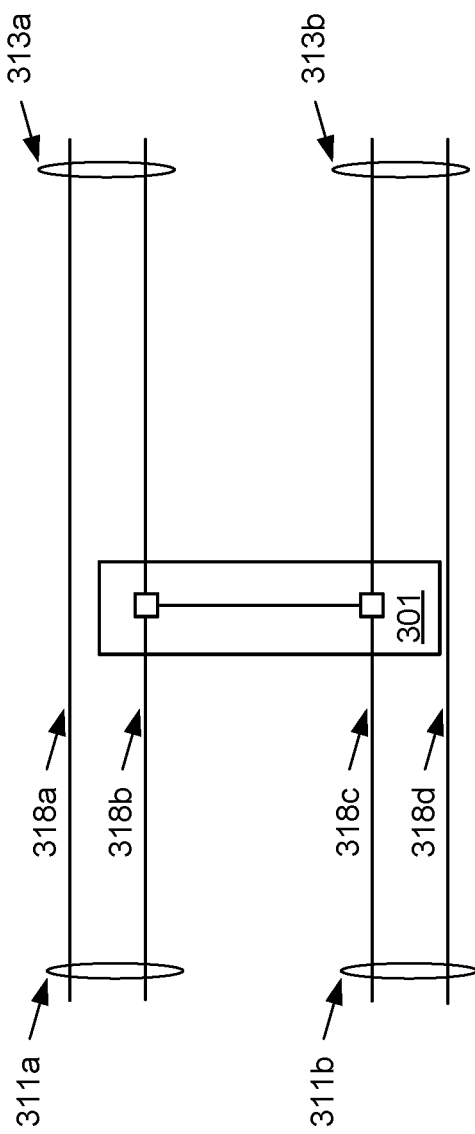

FIGS. 3B-3D illustrate optical devices 301 for generating an entangled state of two or more photons, also referred to herein as a fusion gate, in accordance with some embodiments. In general, in a photonic system, fusion gates can be linear optical circuits that modify a quantum state of two or more photons to generate additional entanglement between the two or more photons. Furthermore, in some embodiments the two or more photons input into the fusion gate may already be respectively entangled with other quantum systems prior to being input into the fusion gate and thus, the action of the fusion gate (also referred to herein as the act of "fusion") can generate entanglement between the other quantum systems as well as between the two or more input photons.

In some embodiments, a fusion gate can receive as input two or more photons and output the photons in an entangled state, e.g., Bell states, 3-GHZ states and the like, and generate additional entanglement between the input photons thereby generating larger entangled states of photons. To that end, fusion gates 301 generate an entangled state of a first and a second photon input into the gate, where the first photon can be input on input waveguides 311a and the second photon can be input on input waveguides 311b. For the sake of illustration, the waveguides 311a and 311b are shown as a pair of waveguides, but may include more than two waveguides) without departing from the scope of the present disclosure. When successful, the result of the application of the fusion gate is that the photons carried on output waveguides 313a and the photons carried on output waveguides 313b are entangled with each other. Note that some output waveguides 313 may form a continuous waveguide with input waveguides 311 (e.g., an output waveguide 313 may, structurally, be a continuation of an input waveguide 311).

FIG. 3B illustrates a fusion gate 301-1 that does not use so-called "bleeding," in accordance with some embodiments. Thus, fusion gate 301-1 can be viewed as a "single-stage" fusion gate, in contrast to the multi-stage fusion gates described with reference to FIG. 3C. To that end, fusion gate 301-1 includes a coupling 302b (e.g., a 50:50 beam splitter) that couples a respective input waveguide 311a to a waveguide 312a in a vacuum state (i.e., the waveguide 312a does not initially include a photon). Waveguide 312a is input into a detection unit 300. Fusion gate 301-1 also includes a coupling 302c (e.g., a 50:50 beam splitter) that couples a respective input waveguide 311b to a waveguide 312b in a vacuum state. Waveguide 312b is input into the detection unit 300. The fusion of fusion gate 301-1 is successful when a single photon is detected by the detection unit 300. For example, the fusion gate heralds a successful fusion if classical channels 309a and 309b output classical information indicating a result of detection operations of one photon either at one of detectors 307a or 307b.

In some embodiments the transmissivity of the fusion gate is denoted $r_7$, where η is the transmissivity of the couplings in the beam splitter (e.g., 77=0.5 for a 50:50 beam splitter). Note that, in some embodiments, different couplings in a fusion gate 301 have different transmissivity. However, for the purposes of simplicity, embodiments are described below in which each fusion gate has a single transmissivity η.

FIG. 3C illustrates a fusion gate 301-2 that employs bleeding (also sometimes called "thin-slicing," described in greater detail with reference to Section IX), in accordance with some embodiments. In particular, fusion gate 301-2 can be viewed as a "three-stage" fusion gate. Each stage includes a detection unit 300 (e.g., detection units 300a-300c, corresponding to stages 315a-315c, respectively); a logic unit 304 (e.g., logic unit 304a-304c, corresponding to stages 315a-315c, respectively); and a switch (e.g., switches 306a-306c, corresponding to stages 315a-315c, respectively). It should be understood that the present disclosure contemplates fusion gates with any number of stages (e.g., 2, 4, 5 stages or more). Each stage 315 (e.g., stages 315a-315c) of the multi-stage fusion gate 301-2 acts in the same manner as the single-stage fusion gate 301-1, except that the couplings 302 have a transmissivity greater than 50% (e.g., greater than 70%, 80%, or 90%). Thus, at each stage 315, a fraction (e.g., less than 50%) of the wave function on the coupled input waveguides 311 is "bled off" or "thinly-sliced" onto the detection unit 300's modes that are in a vacuum state. In addition, each stage 315 is backed by a logic unit 304 that determines whether the stage 315 was successful in its fusion. In some embodiments, fusion gate 301-2 is successful the first time a stage detects a single photon (e.g., exactly 1 photon).

In some embodiments, logic units 304 may be implemented as field programmable digital logic using, for example, a field programmable gate array (FPGA) or an on-chip hard-wired circuit, such as an application specific integrated circuit (ASIC). Alternatively, in some embodiments, the detection units 300 are coupled to an off-chip classical computer. In some embodiments, logic units 304 and/or the classical computer receives information from each detector indicating whether the detector detected a photon (and optionally how many). Stated another way, the logic unit 304 and/or the classical computer receives the detection pattern for a detection operation from the detectors (e.g., in the form of analog detection signals). The logic units 304 and/or the classical computer executes logic that configures a switch 306 to either output the photons, pass the photons to a subsequent stage, or pass the photons onto a remedial circuit (e.g., a mode swap circuit or a distillation circuit). In some embodiments, the digital logic module 304 and/or the classical computer does so by referencing a look-up table (e.g., stored in the memory) to determine whether the detection pattern indicates that the stage was successful and that the photons remaining a desired state (e.g., a fused state).

In some circumstances, the determination of whether a respective stage 315 was successful depends on detection patterns from one or more previous stages. Thus, in some embodiments, classical information channels pass the necessary information (e.g., indicative of prior detection patterns) to subsequent stages. When a respective stage 315 is successful, the corresponding switch 306 routes the photons to the output, rather than passing the photons to the next stage.

FIG. 3D shows an example of simplified notation for a fusion gate 301. In FIG. 3D and in subsequent figures, fusion gates are labeled "301" rather than being labeled "301-1" or "301-2." It is envisioned that these fusion gates can employ any number of stages (e.g., one stage, as in fusion gate 301-1; three stages, as in fusion gate 301-2; or a different number of stages). In addition, fusion gates 301 are drawn with boxes connecting two waveguides (e.g., waveguides 318b and 318c, FIG. 3D). The waveguides 318b and 318c connected by the boxes are the waveguides that the fusion gate 301 act upon; e.g., the waveguides that are coupled to detection units 300. All other waveguides (e.g., waveguides 318a and 318d, FIG. 3D) are not acted upon by the fusion gate 301. In some embodiments, all other waveguides are not coupled to the fusion gate 301 (e.g., waveguides 318a and 318d, FIG. 3D are physically separate from the fusion gate 301).

Furthermore, in FIG. 3D and subsequent figures, schematic representations of certain classical channels have been omitted to avoid clutter. It should be understood that classical information can be passed between any set of components and that the devices described herein include appropriate classical channels for doing so (e.g., for interconnecting and providing classical information between components). For example, such classical channel may comprise a bi-directional communication bus carrying one or more reference signals, e.g., one or more clock signals, one or more control signals, or any other signal that contains, represents, or encodes classical information, e.g., heralding signals, photon detector readout signals, and the like. Such classical channels may comprise any wired, wireless, and/or optical medium of communication.

IV. GENERATION OF 1-, 2-, and 3-PRIMATES

Figure 4A:
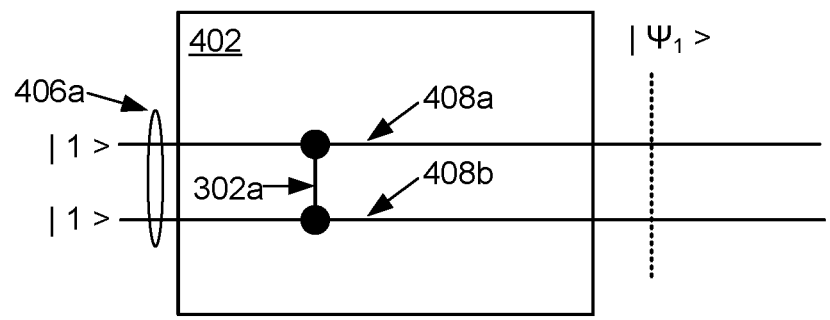
FIG. 4A-4B show optical devices for generating 1- and 2-primates, respectively, in accordance with some embodiments.

FIG. 4A shows an optical device 402 for generating 1-primates (e.g., a 1-primate generator), in accordance with some embodiments. Optical device 402 includes a first pair 406a of waveguides. The first pair 406a of waveguides includes a first waveguide 408a and a second waveguide 408b. The first waveguide 408a and the second waveguide 408b are coupled together by a coupling 302a (e.g., a 50:50 beam splitter, such as those described with reference to FIGS. 15A-15C). In some embodiments, the coupling 302a includes a phase shifter (e.g., to apply a predefined phase shift, such as a $\pi$ phase shift, to photons in one of the waveguides with respect to the other waveguide).

In use, a photon (e.g., a single photon) is provided to each waveguide of the first pair 406a of waveguides. That is, a first single photon is provided to first waveguide 408a and a second single photon, distinct from the first single photon, is provided to second waveguide 408b. In some embodiments, the photons are provided to each waveguide by a single-photon source.

Thus, in the Fock state description, the two-photon input state for the optical device 402 is $|\psi_i\rangle=|11\rangle$. After the coupling (e.g., assuming a $\pi$ phase shift applied to one of the outputs), the state is:

$$|\psi_1\rangle = \frac{1}{\sqrt{2}}(|20\rangle + |02\rangle) \quad (8)$$

This state $|\psi_1\rangle$ is referred to herein as a "1-primate." Note that optical device 402 generates 1-primates deterministically (i.e., there is no inherently probabilistic aspect to optical device 402). However, even though optical device 402 operates deterministically, photons may still be lost (e.g., due to absorption in the waveguides 408) and thus optical device 402 may still fail on a given attempt. Note that 1-primate generation can also be viewed as a transformation of two single photons with a linear optical transfer matrix $$T = e^{\frac{3\pi}{4}i}/\sqrt{2}\begin{pmatrix} 1 & i \\ i & 1 \end{pmatrix} \quad (9)$$

Figure 4B:
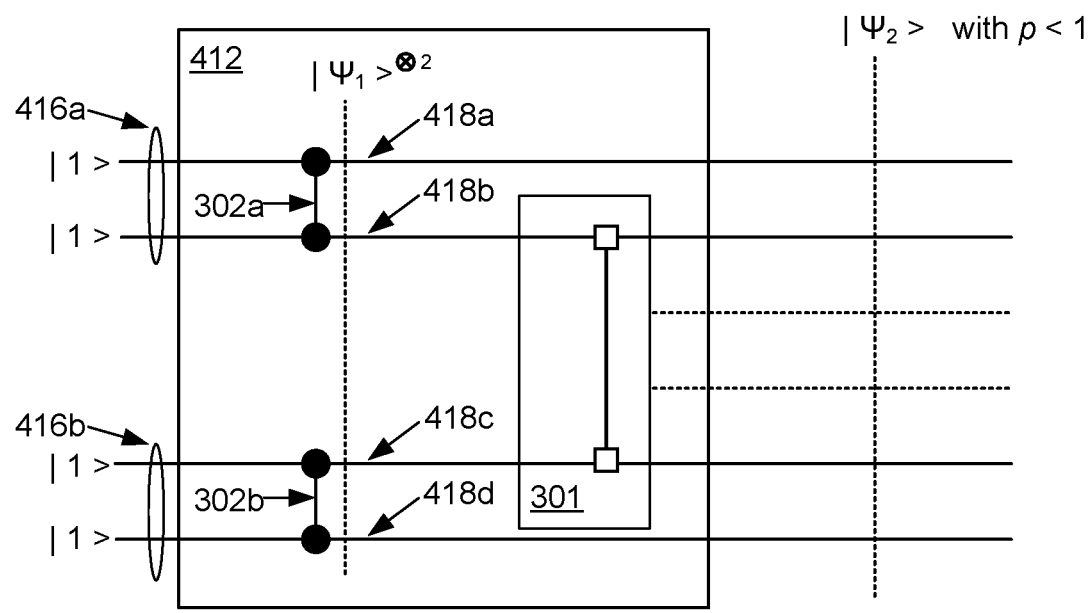

FIG. 4B shows an optical device 412 for generating 2-primates, in accordance with some embodiments. Optical device 412 includes a first pair 416a of waveguides, that includes a first waveguide 418a and a second waveguide 418b that are coupled together by a coupling 302a (e.g., a 50:50 beam splitter). Optical device 412 further includes a second pair 416b of waveguides that includes a third waveguide 418c and a fourth waveguide 418d that are coupled together by a coupling 302b (e.g., a 50:50 beam splitter). In use, a single photon is provided to each waveguide 418a-418d.

Second waveguide 418b (from the first pair 416a of waveguides) and third waveguide 418c (from the second pair 416b of waveguides) are input into a fusion gate 301 (e.g., any of the fusion gates previously discussed).

Note that the first pair 416a of waveguides, together with the coupling 302a, can be considered a first 1-primate generator. Similarly, the second pair 416b of waveguides, together with the coupling 302b, can be considered a second 1-primate generator. Therefore, since 1-primate generators are deterministic (assuming no losses), the state after the couplings 302a-302b is two 1-primates, denoted $|\psi_1\rangle^{\otimes 2}$.

Generation of 2-primates can be viewed, in some embodiments, as a fusion between two 1-primates, each of which has been generated using an optical device 402. Fusion occurs by subtracting a photon from a pair of modes, each from a different 1-primate. The photon subtraction should be performed such that no information about which mode the subtracted photon has come from has been preserved. When the fusion of fusion gate 301 is successful, the result is a 2-primate. In some embodiments, an n-primate can be generated by fusing smaller primates (e.g., by performing inter-primate fusion). For example, an n-primate can be generated by fusing together n-copies of a 1-primate, or fusing an (n−1)-primate with a 1-primate.

Figure 5:
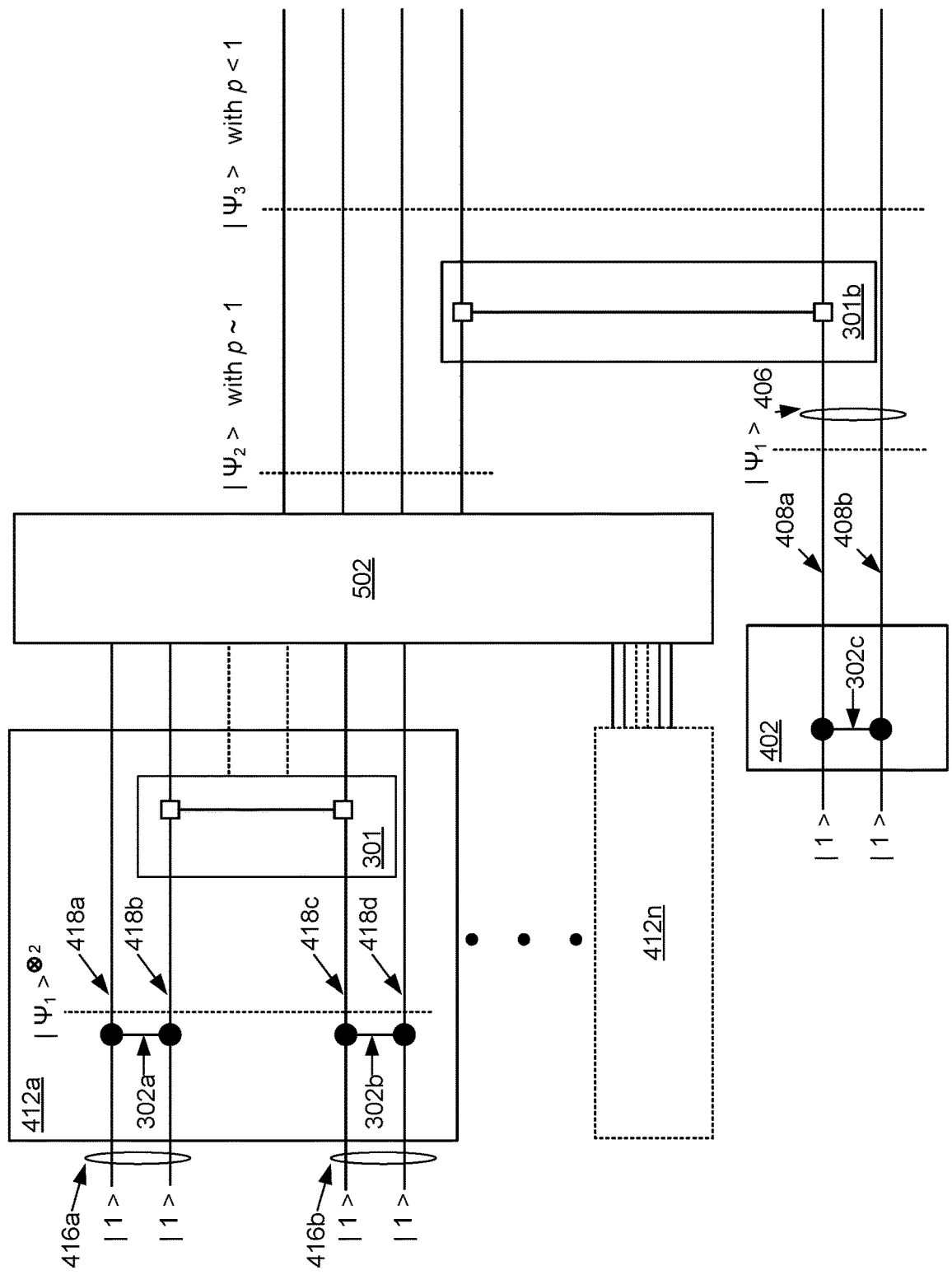
FIG. 5 shows an optical device for generating 3-primates (e.g., a 3-primate generator), in accordance with some embodiments.

FIG. 5 shows an optical device 500 for generating 3-primates (e.g., a 3-primate generator), in accordance with some embodiments. The optical device 500 includes at least one 2-primate generator 412a, described above with reference to FIG. 4B. In some embodiments, the optical device 500 includes a plurality of 2-primate generators 412a-412n that are multiplexed by a multiplexer 502. Each 2-primate generator 412 includes a respective first pair 416a of waveguides comprising a respective first waveguide 418a and a respective second waveguide 418b that are coupled together by a respective coupling 302a. Each 2-primate generator 412 also includes a respective second pair 416b of waveguides comprising a respective third waveguide 418c and a respective fourth waveguide 418d that are coupled together by a respective coupling 302b. Each 2-primate generator 412 also includes a first fusion gate 301 that includes one or more detectors (shown in FIGS. 3A-3D). Each first fusion gate 301 is configured to perform a first fusion on the respective second waveguide 418b and the respective third waveguide 418c of a respective 2-primate generator 412. The first fusion produces a first detection pattern for the respective 2-primate generator 412.

In some embodiments, multiplexer 502 is a switching network that receives classical information from the various 2-primate generators 412 indicating which 2-primate generators 412 have been successful in generating a 2-primate. The multiplexer 502 selects photons from a successful 2-primate generator and directs the photons from the successful 2-primate generator to the output of the multiplexer 502 (e.g., based at least in part on the detection pattern for the 2-primate generators 412, which herald success or failure for generating a 2-primate). Thus, the output state for the multiplexer 502 is, with a high probability, a 2-primate. Thus, the probabilistic 2-primate generators 412 described with reference to FIG. 4B can be used to form a nearly-deterministic 2-primate source through multiplexing.

Optical device 500 also includes a 1-primate generator 402, described above with reference to FIG. 4A. The 1-primate generator includes a first pair 406 of waveguides comprising a first waveguide 408a and a second waveguide 408b that are coupled together by a coupling 302c. The 1-primate generator is a deterministic device, and thus in some circumstances multiplexing is not needed.

FIG. 5 includes a fusion gate 301 that fuses the 2-primate (from the selected 2-primate generator 412) and the 1-primate (e.g., by acting on a single mode of the 2-primate and a single mode of the 1-primate). Since fusion gate 301 is a probabilistic device, the output state for device 500 is, with a probability less than one, a 3-primate.

V. GENERATION OF GHZ STATES FROM PRIMATES

Figure 6:
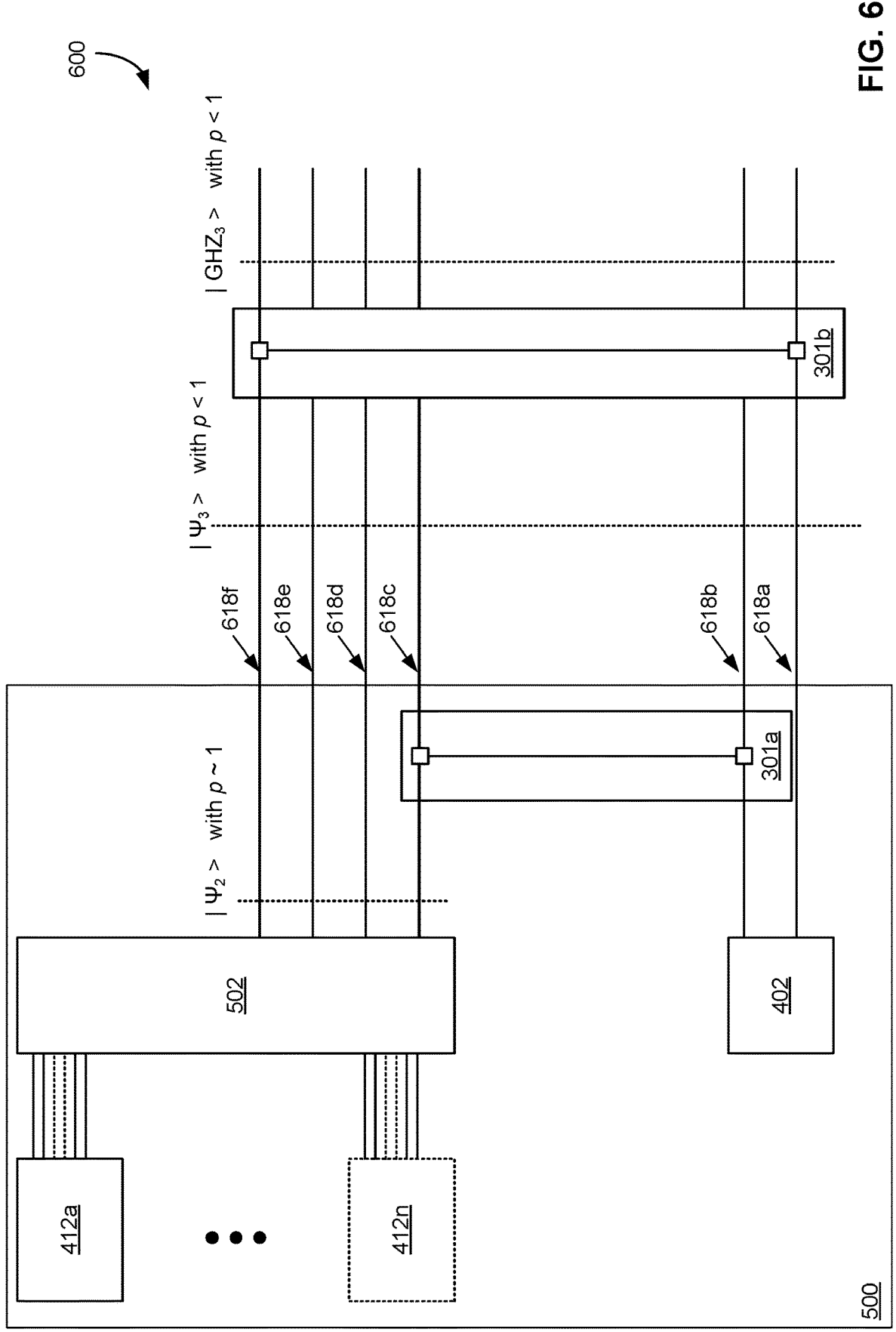
FIG. 6 shows an optical device for generating a 3-GHZ state from a 3-primate (e.g., a 3-GHZ generator), in accordance with some embodiments.

FIG. 6 shows an optical device 600 for generating a 3-GHZ state from a 3-primate (e.g., a 3-GHZ generator), in accordance with some embodiments. Optical device 600 includes a 3-primate generator 500 and an additional fusion gate 301b. In general, an n-primate can be transformed into an n-GHZ state by coupling a fusion gate to the two external modes of the n-primate (e.g., by performing an intra-primate fusion). External modes are modes that have not been input into the fusion gate during generation of the original n-primate (e.g., for primates generated as described herein, there are two external modes). For example, in FIG. 4B, waveguides 418a and 418d define modes that are not coupled to the fusion gate 301, whereas the modes in waveguides 418b and 418c are coupled to fusion gate 301 in FIG. 4B. Thus, in FIG. 6, the external modes correspond to waveguides 618a and 618f. In contrast, the modes corresponding to waveguides 618e and 618d were coupled to a preceding fusion gate to generate the 2-primate (in one of the 2-prime generators 412 as shown in FIG. 5) and the modes in waveguides 618b and 616c were coupled to the fusion gate 301a (as shown in FIG. 6) to generate the 3-primate, and thus are not external modes. Optical device 600 generates, with a probability less than one, a 3-GHZ state by coupling the external modes of the 3-primate generated by optical device 500 using fusion gate 301b.

Figure 7:
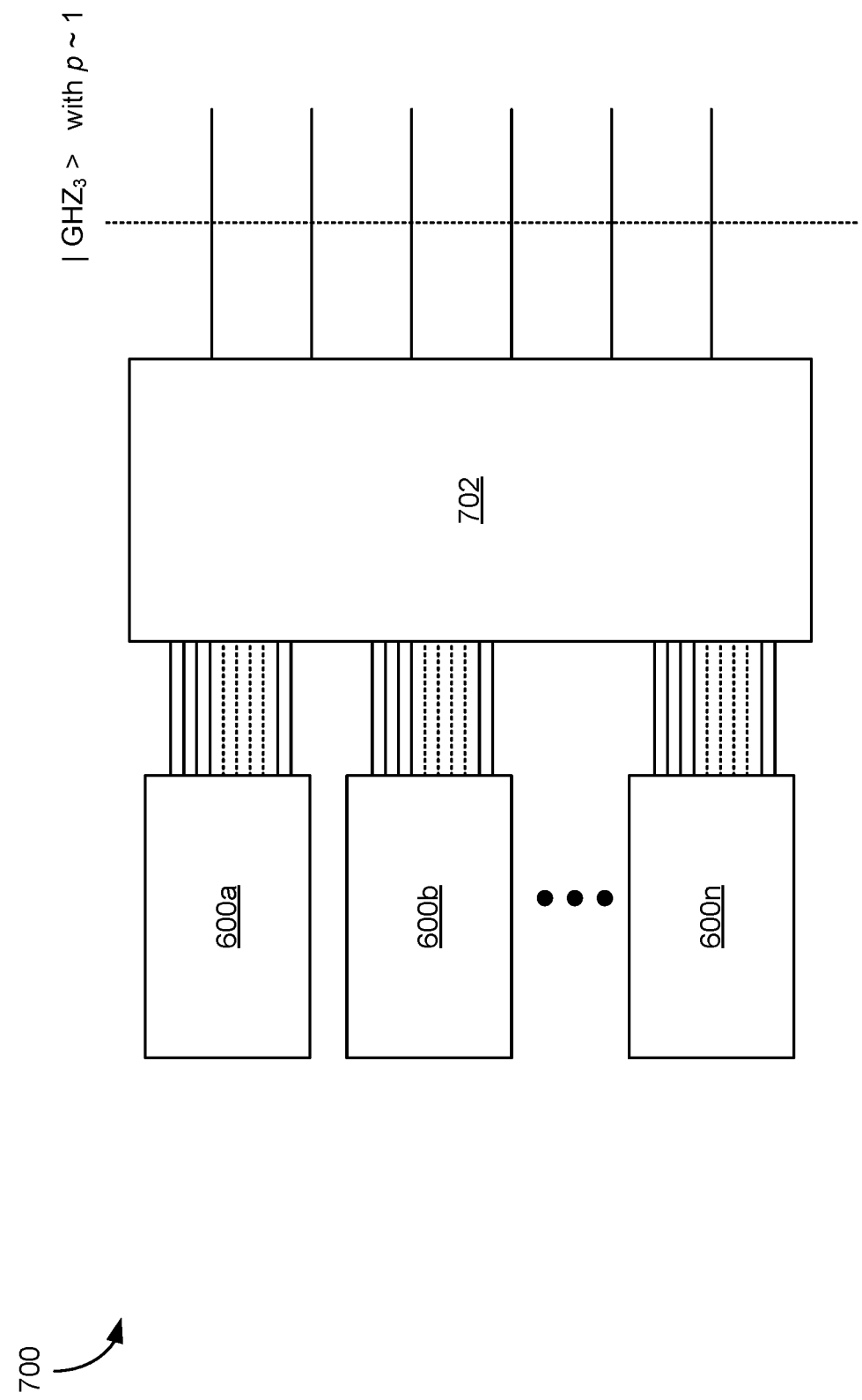
FIG. 7 shows an optical device for generating nearly-deterministic 3-GHZ states from a plurality of 3-GHZ generators, in accordance with some embodiments.

FIG. 7 shows an optical device 700 for generating 3-GHZ states from a plurality of 3-GHZ generators 600 (e.g., generators 600a-600n), in accordance with some embodiments. The outputs of probabilistic 3-GHZ generators 600 can be multiplexed by a multiplexer 702, which selects photons from a successful 3-GHZ generator 600 and routes those photons to the outputs of the multiplexer 702. (Multiplexer 702 is analogous to multiplexer 502, except that is configured to handle, with appropriate logic and waveguides, 3-GHZ inputs and outputs). Accordingly, the optical device 700 can generate 3-GHZ states with a higher success probability that would be possible without the multiplexer 702.

Figure 8:
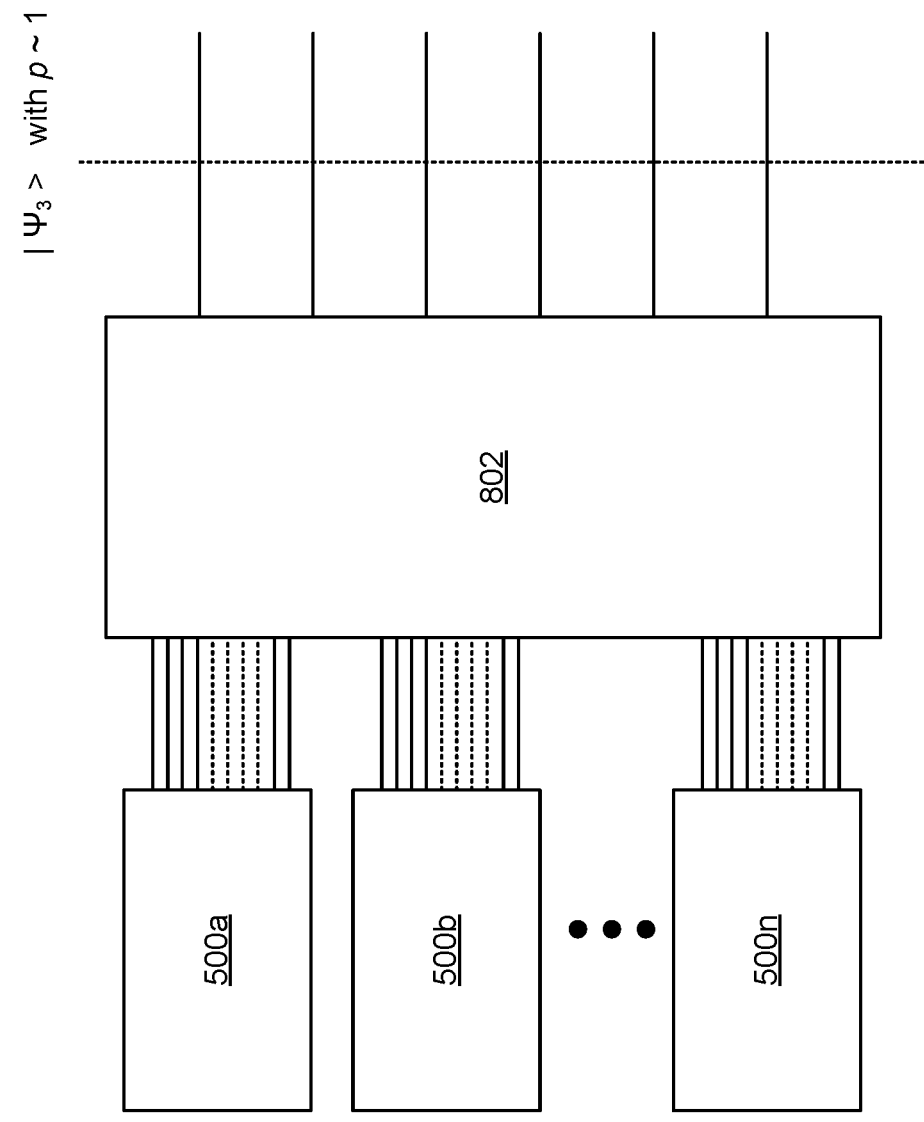
FIG. 8 shows an optical device for generating nearly-deterministic 3-primates from a plurality of probabilistic 3-primate generators, in accordance with some embodiments.

FIG. 8 shows an optical device 800 for generating 3-primates from a plurality of probabilistic 3-primate generators 500 (e.g., 500a-500n), in accordance with some embodiments. The outputs of probabilistic 3-primate generators 500 can be multiplexed by a multiplexer 802, which selects photons from a successful 3-primate generator 500 and routes those photons to the outputs of the multiplexer 802. (Multiplexer 802 is analogous to multiplexer 502, except that is configured to handle, with appropriate logic and waveguides, 3-primate inputs and outputs). Accordingly, the optical device 800 can generate 3-primates states with a higher success probability that would be possible without the multiplexer 802.

More generally, any of the devices described herein which generated entangled states of photons ("entangled states") probabilistically may be multiplexed by a multiplexer. Thus, any of the devices described herein which generated entangled states of photons ("entangled states") probabilistically can be used as a component in a generator for the same state through multiplexing in order to achieve in improved success probability.

Figure 9:
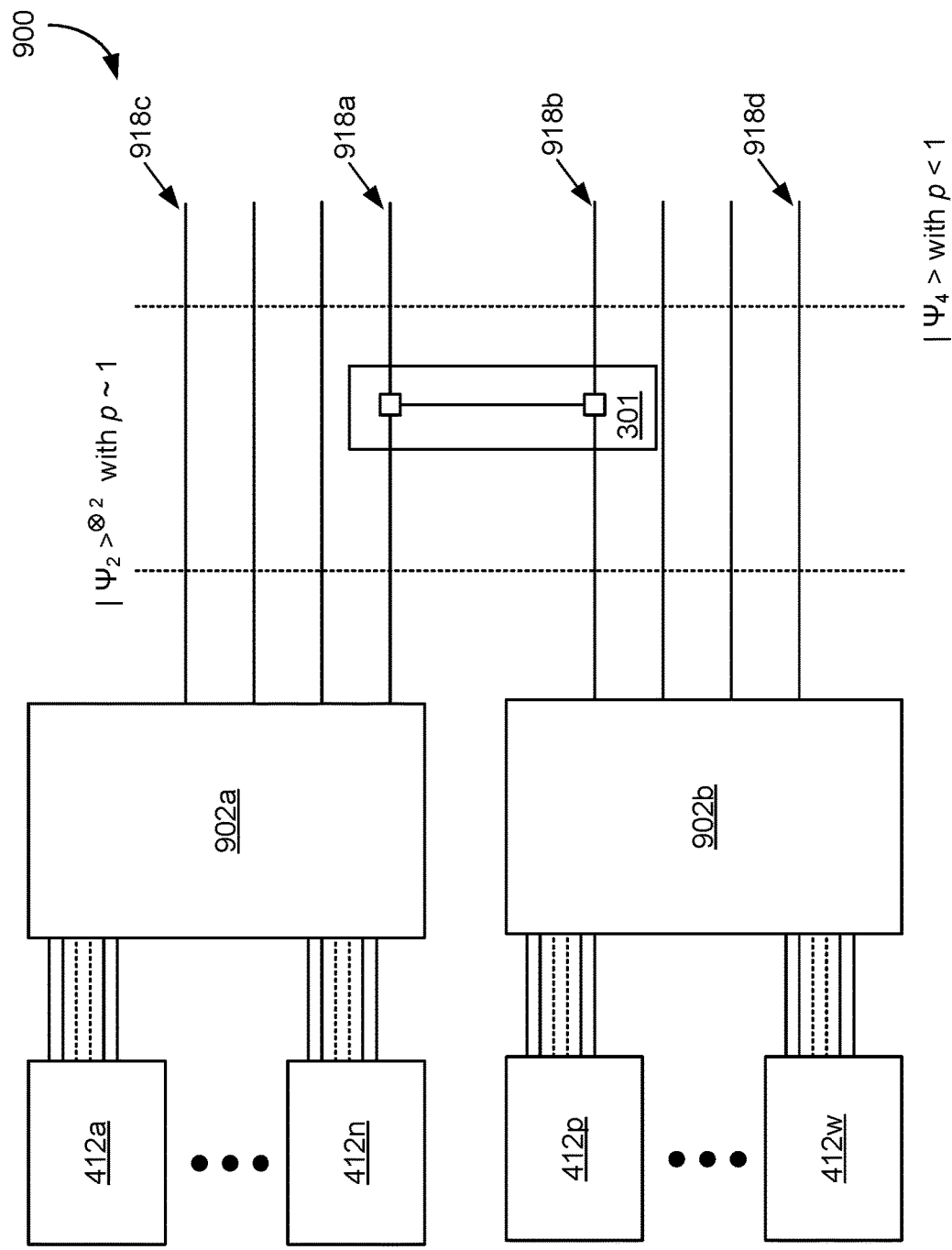
FIG. 9 shows an optical device for generating a 4-primate, in accordance with some embodiments.

FIG. 9 shows an optical device 900 for generating a 4-primate, in accordance with some embodiments. Note that a 4-primate can be generated from four 1-primates, two 2-primates, or one 3-primate and one 1-primate. Optical device 900 illustrates an example in which a 4-primate is generated from two 2-primates. Each of the two 2-primates is generated by a 2-primate source. To that end, a first 2-primate is generated by a first plurality of 2-primate sources 412a-412n. A multiplexer 902a selects photons from a respective 2-primate generator 412a-412n that was successful in generating a 2-primate. A second 2-primate is generated by a second plurality of 2-primate sources 412p-412w. A multiplexer 902b selects photons from a respective 2-primate generator 412p-412w that was successful in generating a 2-primate. Therefore, the state after the multiplexers 902a-902b is, with a probability nearly equal to one, two 2-primates, denoted $|\psi_2\rangle^{\otimes 2}$.

Optical device 900 includes a fusion gate 301 which couples the modes defined by waveguides 918a and 918b. Modes 918c and 918d are external modes. Since fusion gate 301 is a probabilistic gate, the state after fusion gate 301 is, with a probability less than one, a 4-primate, denoted $|\psi_4\rangle$.

Figure 10:
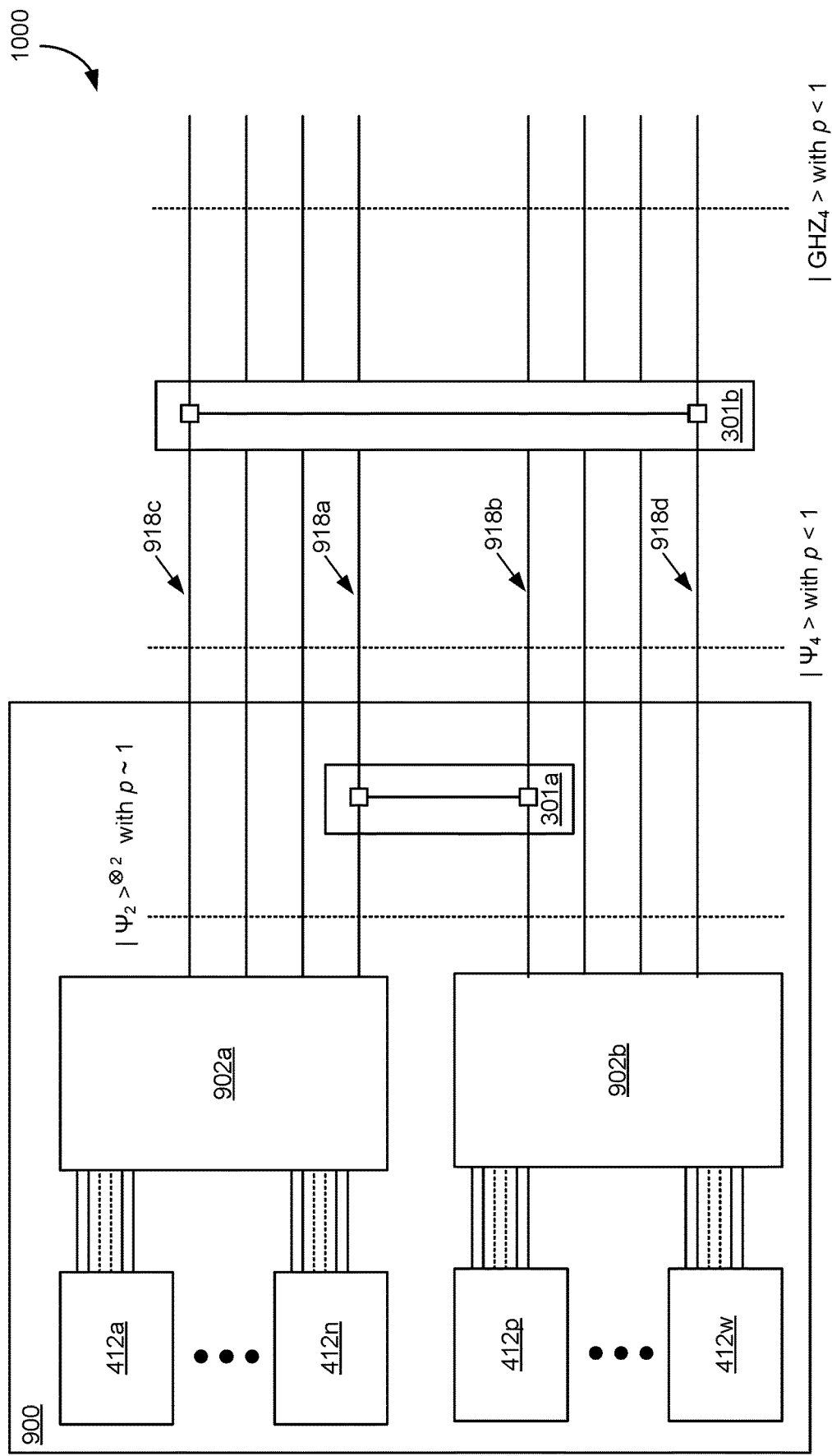
FIG. 10 shows an optical device for generating a 4-GHZ state from a 4-primate, in accordance with some embodiments.

FIG. 10 shows an optical device 1000 for generating a 4-GHZ state from a 4-primate, in accordance with some embodiments. Optical device 1000 includes a 4-primate generator 900 and an additional fusion gate 301b, which couples external modes 918c-918d (e.g., performs an intra-primate fusion). Since fusion gate 301b is a probabilistic gate, the state after fusion gate 301b is, with a probability less than one, a 4-GHZ state, denoted $|GHZ_4\rangle$.

Figure 11:
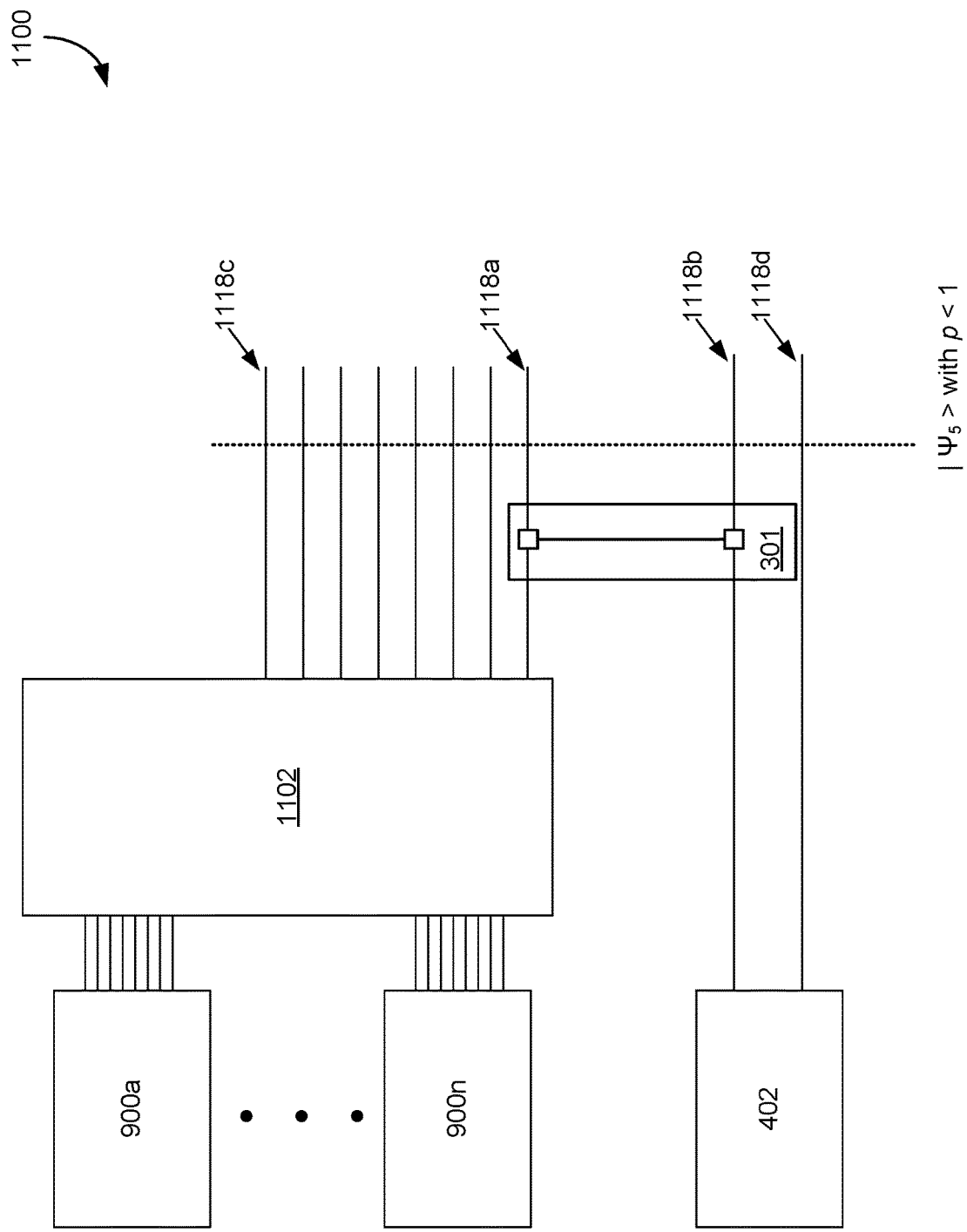
FIG. 11 shows an optical device for generating a 5-primate, in accordance with some embodiments.

FIG. 11 shows an optical device 1100 for generating a 5-primate, in accordance with some embodiments. Note that a 5-primate can be generated from five 1-primates, one 4-primate and one 1-primate, one 2-primate and one 3-primate, etc. Optical device 1100 illustrates an example in which a 5-primate is generated from one 4-primate and one 1-primate. The 4-primate is generated by a 4-primate generator. To that end, a multiplexer 1102 selects photons from a respective probabilistic 4-primate generator 900a-900n that was successful in generating a 4-primate. A 1-primate is generated by a 1-primate generator 402. Therefore, the state after the multiplexer 1102 is, with a probability nearly equal to one, $|\psi_4\rangle \otimes |\psi_1\rangle$.

Optical device 1100 includes a fusion gate 301 which couples the modes defined by waveguides 1118a and 1118b. Modes 1118c and 1118d are external modes. Since fusion gate 301 is a probabilistic gate, the state after fusion gate 301 is, with a probability less than one, a 5-primate, denoted $|\psi_5\rangle$.

Figure 12:
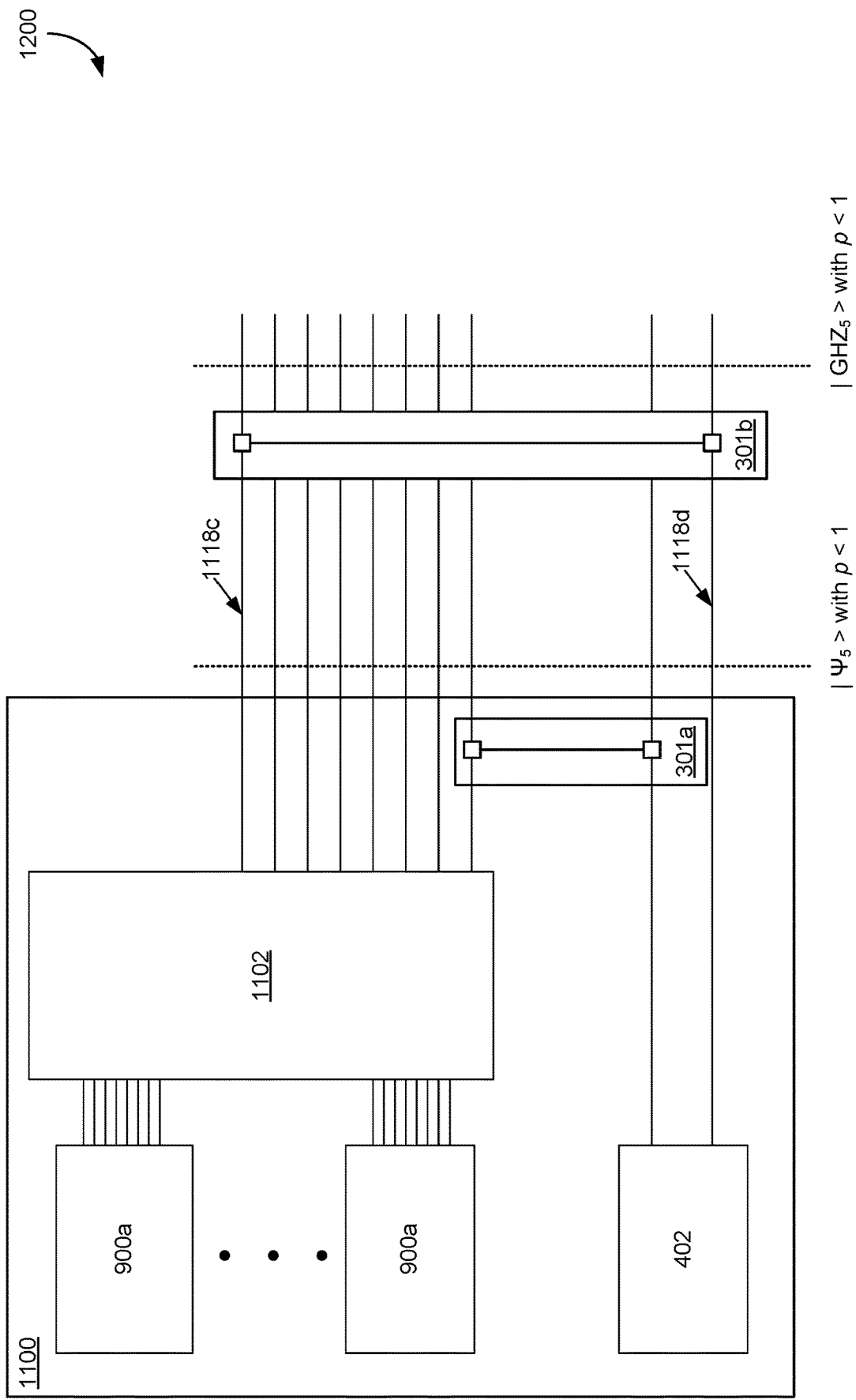
FIG. 12 shows an optical device for generating a 5-GHZ state from a 5-primate, in accordance with some embodiments.

FIG. 12 shows an optical device 1200 for generating a 5-GHZ state from a 5-primate, in accordance with some embodiments. Optical device 1200 includes a 5-primate generator 1100 and an additional fusion gate 301b, which couples external modes 1118c-1118d (e.g., performs an intra-primate fusion). Since fusion gate 301b is a probabilistic gate, the state after fusion gate 301b is, with a probability less than one, a 5-GHZ state, denoted $|GHZ_5\rangle$.

Figure 13:
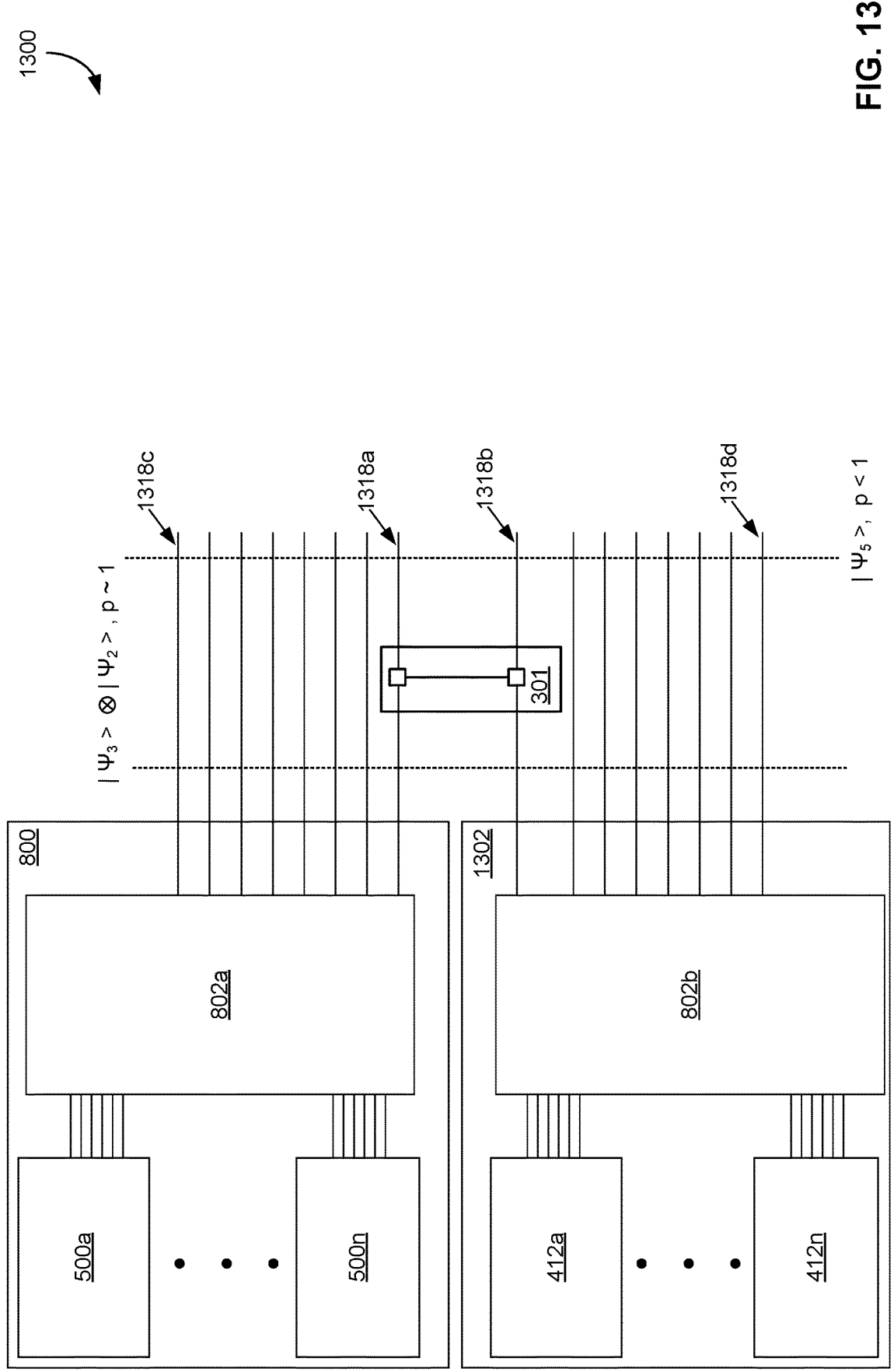
FIG. 13 shows another optical device for generating a 5-primate, in accordance with some embodiments.

FIG. 13 shows another optical device 1300 for generating a 5-primate, in accordance with some embodiments. Optical device 1300 illustrates an example in which a 5-primate is generated from one 3-primate and one 2-primate. To that end, optical device 1300 includes a 3-primate generator 800 (FIG. 8, e.g., which operates by multiplexing the outputs of a plurality of probabilistic 3-primate generators 500a-500n using a multiplexer 802a) and a 2-primate generator 802 (e.g., which operates by multiplexing the outputs of a plurality of probabilistic 2-primate generators 412a-412n, using a multiplexer 802b). Therefore, the state after the multiplexer 802 is, with a probability nearly equal to one, $|\psi_3\rangle \otimes |\psi_2\rangle$.

Optical device 1300 includes a fusion gate 301 which couples the modes defined by waveguides 1318a and 1318b. Modes 1318c and 1318d are external modes. Since fusion gate 301 is a probabilistic gate, the state after fusion gate 301 is, with a probability less than one, a 5-primate, denoted $|\psi_5\rangle$.

Figure 14:
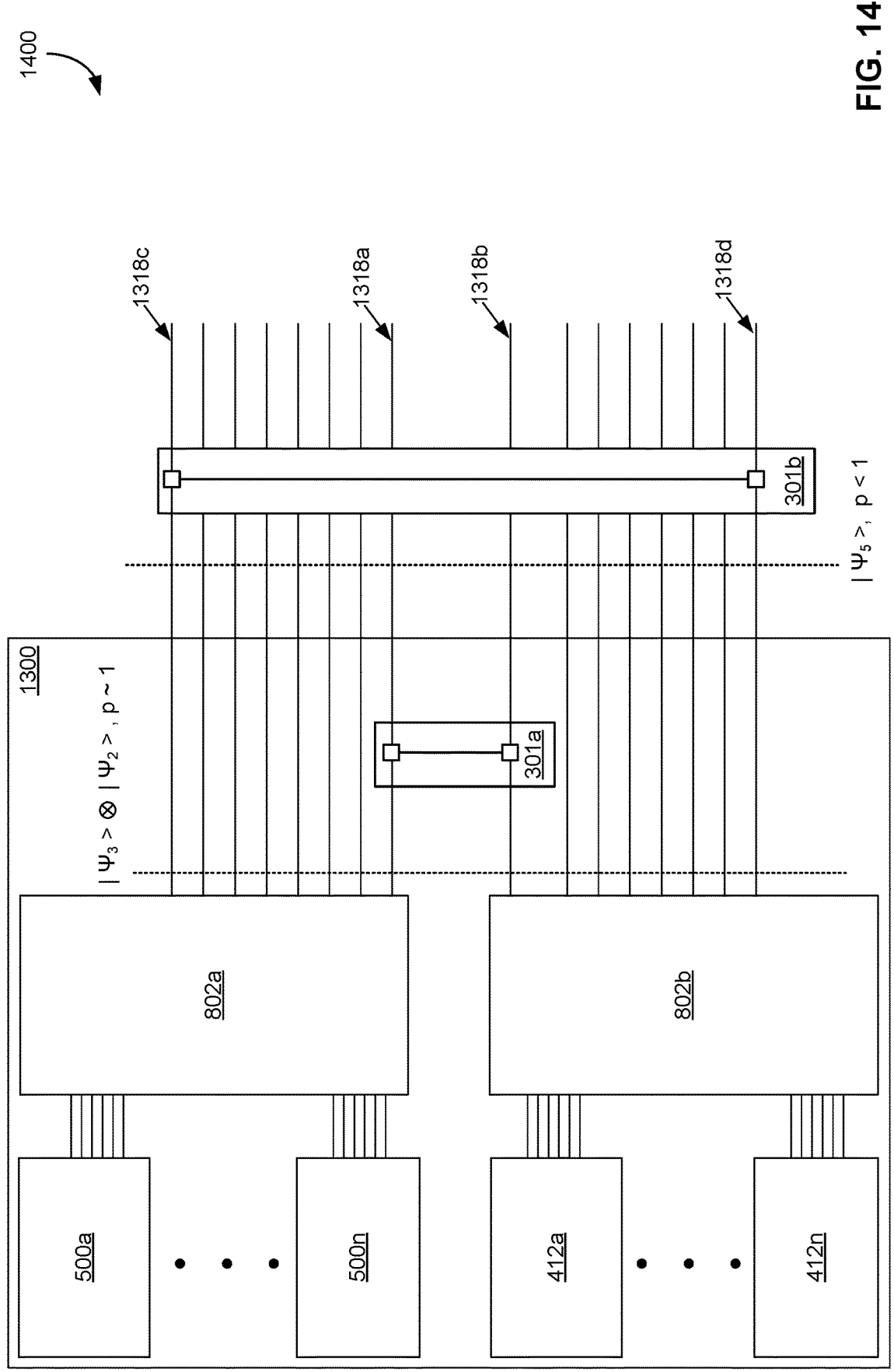
FIG. 14 shows an optical device for generating a 5-GHZ state from a 5-primate, in accordance with some embodiments.

FIG. 14 shows an optical device 1400 for generating a 5-GHZ state from a 5-primate, in accordance with some embodiments. Optical device 1400 includes a 5-primate generator 1300 and an additional fusion gate 301b, which couples external modes 1318c-1318d (e.g., performs an intra-primate fusion). Since fusion gate 301b is a probabilistic gate, the state after fusion gate 301b is, with a probability less than one, a 5-GHZ state, denoted $|GHZ_5\rangle$.

One of skill in the art having had the benefit of this disclosure will recognize how to generate higher order (e.g., larger) primates (e.g., 6-, 7-, 8-primates, etc., e.g., through inter-primate fusion of smaller primates) and the corresponding higher order (e.g., larger) GHZ states (e.g., 6-, 7-, 8-GHZ states, etc., e.g., through intra-primate fusion of a primate of a same order).

VI. EXAMPLE IMPLEMENTATIONS OF BEAM SPLITTERS

Figure 15A:
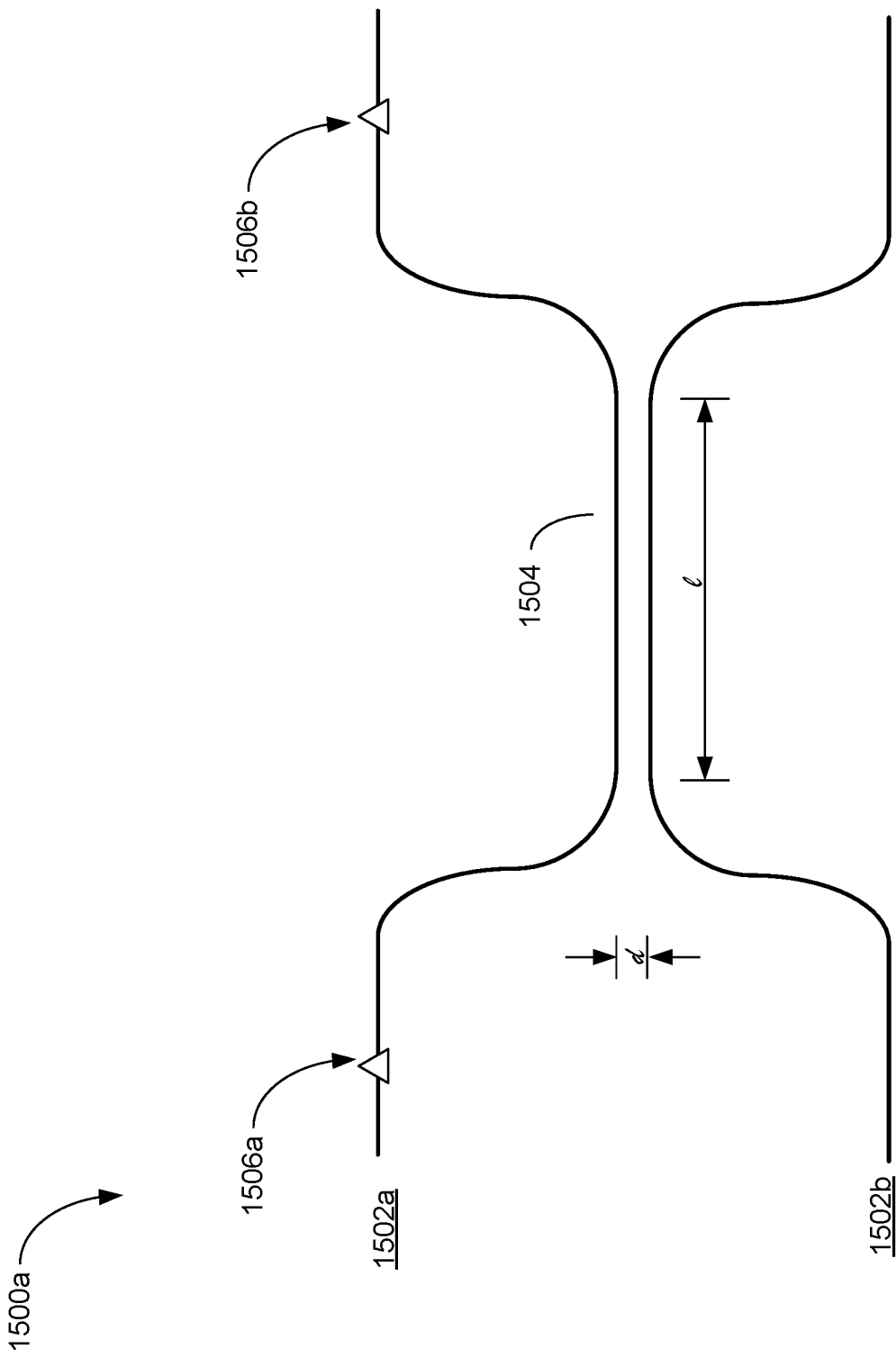
FIGS. 15A-15C illustrate schematic diagrams of waveguide beam splitters, in accordance with some embodiments.
Figure 15B:
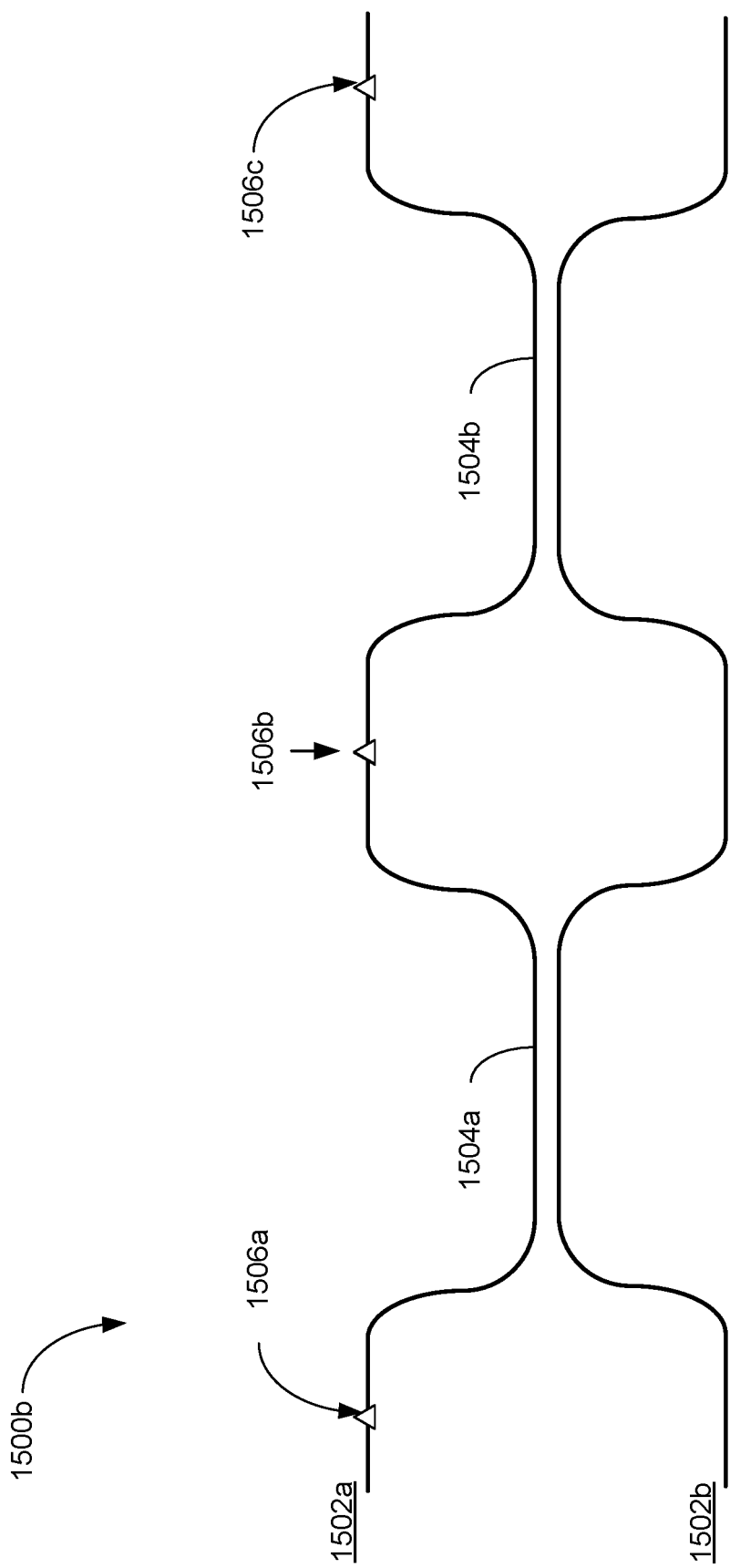
Figure 15C:
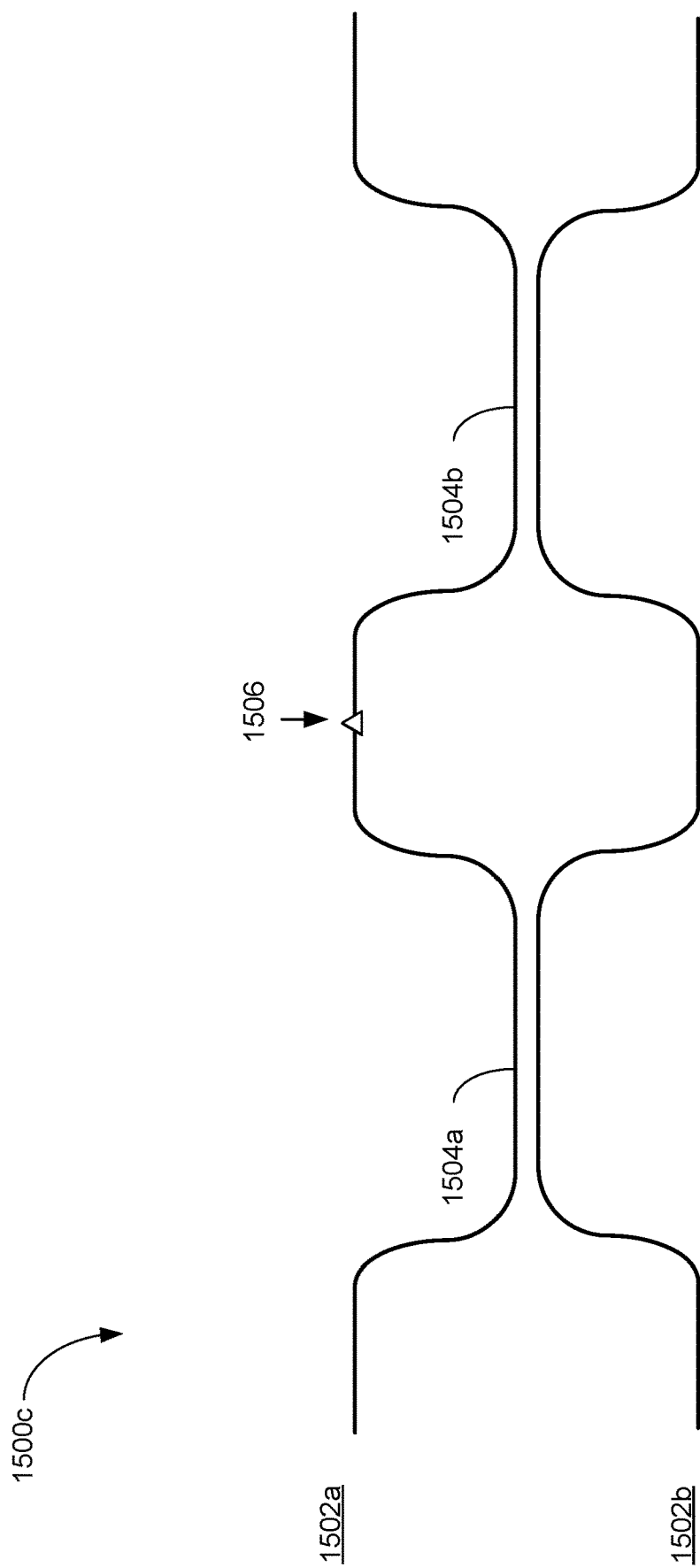

FIGS. 15A-15C illustrate schematic diagrams of waveguide beam splitters 1500 (e.g., 1500a, 1500b, and 1500c, respectively), in accordance with some embodiments. Such waveguide beam splitters are examples of couplings that can be used in any of the preceding photonic circuits for generating entangled photons. In some embodiments, beam splitters are implemented in integrated photonics via directional couplings, which are realized by bringing together the different waveguides (e.g., modes 1502a and 1502b) close enough so that the evanescent field of one of them can couple into the other one. By controlling the separation d between the waveguides 1502 and/or the length l of the coupling region 1504, different transmissivity can be obtained and therefore this implementation is equivalent to a beam-splitter in bulk optics. In this manner, wave guide beam splitter 1500 may be configured to have a transmissivity equal to 0.5 (i.e., a 50:50 beam splitter, greater than 0.6, greater than 0.7, greater than 0.8, or greater than 0.9).

In some embodiments, waveguide beam splitters 1500 include variable phase-shifters 1506. Variable phase-shifters can be implemented in integrated circuits, providing control over the relative phases of the state of a photon spread over multiple modes. For the silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide 1502 by an amount of the order of $10^{-5}$ K. One of skill in the art, however, having had the benefit of this disclosure, will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, barium borate (BBO), potassium titanyl phosphate (KTP), barium titanate (BTO), and the like and even doped semiconductors such as silicon, germanium, and the like.

Beam-splitters with variable transmissivity and arbitrary phase relationships between output modes can also be achieved by combining directional couplings and variable phase-shifters in a Mach-Zehnder Interferometer (MZI) configuration, e.g., as shown in FIG. 15B. Complete control over the relative phase and amplitude of the two paths in dual rail encoding can be achieved by varying the phases imparted by phase shifters 1506a, 1506b, and 1506c. FIG. 15C shows a slightly simpler example of a MZI that allows for a variable transmissivity between modes 1502a and 1502b by varying the phase imparted by the phase shifter 1506. FIGS. 15A-15C are only three examples of how one could implement a mode coupling in a physical device, but any type of mode coupling/beam splitter can be used without departing from the scope of the present disclosure.

For example, the waveguide beam splitter in FIG. 15C can be used to switch photons in mode 1502a into either mode 1502a or 1502b by adjusting the phase of phase shifter 1506b appropriately. Thus, a tunable waveguide beam splitter is a device for mode swapping and optical switching. In addition, these beam splitters, e.g., in a 50:50 configuration can be used to spread the quantum state of a single photon equally across multiple modes (waveguides).

VII. METHODS OF PRIMATE GENERATION

Figure 16:
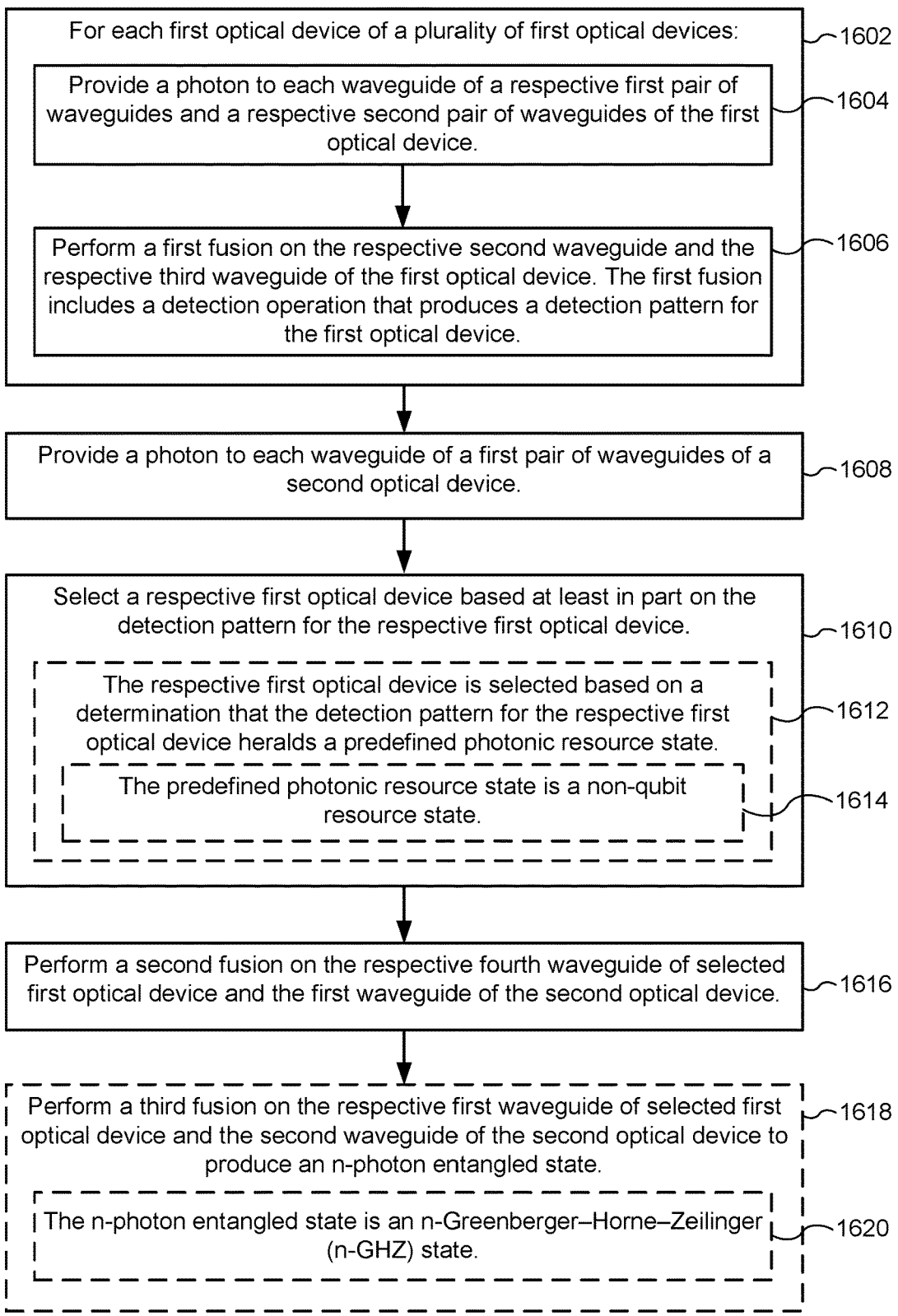
FIG. 16 is a flow chart illustrating a method of generating and multiplexing primates, in accordance with some embodiments.

FIG. 16 is a flow chart illustrating a method 1600 of generating and multiplexing primates, in accordance with some embodiments.

In some embodiments, method 1600 is performed at an apparatus (e.g., optical device 500, FIG. 5) that includes a plurality of first optical devices (e.g., 2-primate generators 412, FIG. 5) and a second optical device (1-primate generator 402, FIG. 5). Each first optical device includes a respective first pair of waveguides (e.g., pair 416a of waveguides, FIG. 5) comprising a respective first waveguide (e.g., waveguide 418a, FIG. 5) and a respective second waveguide (e.g., waveguide 418b, FIG. 5) that are coupled together (e.g., by coupling 302a, FIG. 5). Each first optical device also includes a respective second pair of waveguides (e.g., pair 416b of waveguides, FIG. 5) comprising a respective third waveguide (e.g., waveguide 418c, FIG. 5) and a respective fourth waveguide (e.g., waveguide 418d, FIG. 5) that are coupled together (e.g., by coupling 302b, FIG. 5).

The second optical device includes a first pair of waveguides (e.g., pair 406 of waveguides, FIG. 5) comprising a first waveguide (e.g., waveguide 408a, FIG. 5) and a second waveguide (e.g., waveguide 408b, FIG. 5) that are coupled together (e.g., by coupling 302c, FIG. 5).

Method 1600 includes, for each first optical device of a plurality of first optical devices (1602), providing (1604) a photon to each waveguide of the respective first pair of waveguides and the respective second pair of waveguides of the first optical device and performing (1606) a first fusion on the respective second waveguide and the respective third waveguide of the first optical device. The first fusion includes a detection operation that produces a detection pattern for the first optical device. In various embodiments, the first fusion can be performed using any of the fusion gates described herein. For example, in some embodiments, the first fusion is performed using a single stage fusion gate (e.g., fusion gate 301-1, FIG. 3B).

In some embodiments, the first fusion operation (e.g., an inter-primate fusion between two 1-primates) is performed using a multi-stage fusion gate (e.g., fusion gate 301-2, FIG. 3C). In such embodiments, the detection operation is a first detection operation and the detection pattern is a first detection pattern. In some circumstances, the first fusion includes, for the respective first optical device, after performing the first detection operation, performing a second detection operation. The second detection operation produces a second detection pattern for the respective first optical device. The respective first optical device is selected based further on the second detection pattern for the respective first optical device.

In some embodiments, the second detection operation is performed conditionally in accordance with a determination that the first detection pattern does not herald a predefined photonic resource state. In some embodiments, the second detection operation is performed conditionally in accordance with a determination that the first detection pattern heralds a photonic state capable of being converted to the predefined photonic resource state via the second detection operation. In some embodiments, the determination that the first detection pattern heralds a photonic state capable of being converted to the predefined photonic resource state via the second detection operation is based at least in part on a number of photons remaining, collectively, in the respective first pair of waveguides and the respective second pair of waveguides of the respective first optical device following the first detection operation (e.g., a determination that the first detection operation did not detect too many photons, such that the number of photons remaining, collectively, in the respective first pair of waveguides and the respective second pair of waveguides of the respective first optical device following the first detection operation is less than the number of photons in the predefined resource state).

Note that, as used herein, a "predefined photonic state" means a specific or intended photonic state, or one of a set of specific or intended photonic states. For example, in some embodiments, the predefined photonic state is a primate. In some embodiments, the predefined photonic state is any photonic state that can be converted deterministically to a primate.

In some embodiments, the first detection pattern does herald the predefined photonic resource state (e.g., a 2-primate) when a single photon is detected. In some embodiments, the first detection pattern does not herald the predefined photonic resource state when any number of photons other than one photon are detected. In some embodiments, the first detection pattern heralds a photonic state capable of being converted to the predefined photonic resource state when zero photons are detected (and thus there are still enough photons remaining in the first optical device to produce a 2-primate).

Method 1600 further includes providing (1608) a photon to each waveguide of a first pair of waveguides of a second optical device (e.g., a single photon). In some embodiments, providing a photon to each waveguide of a first pair of waveguides of a second optical device produces a 1-primate.

Method 1600 further includes selecting (1610) (e.g., using a multiplexer, such as multiplexer 502, FIG. 5) a respective first optical device based at least in part on the detection pattern for the respective first optical device. For example, with reference to FIG. 5, multiplexer 502 selects one of the 2-primate generators 412.

In some embodiments, the respective first optical device is (1612) selected based on a determination that the detection pattern for the respective first optical device heralds a predefined photonic resource state (e.g., a primate, such as a 2-primate). In some embodiments, the predefined photonic resource state is (1614) a non-qubit resource state (e.g., the predefined photonic resource state is not a state that can be written in terms of logical values). In some embodiments, the detection pattern heralds the predefined photonic resource state when the detectors, collectively, detect a single photon (e.g., exactly one photon).

In some embodiments, the photons in the waveguides of the selected first optical device are routed to output waveguides of the multiplexer (e.g., in accordance with a determination that the detection pattern for the respective first optical device heralds the predefined photonic resource state). In some embodiments, routing the photons in the waveguides of the selected first optical device to output waveguides of the multiplexer includes coupling at least one of the waveguides in the selected first optical device to a fusion gate (e.g., fusion gate 301b, FIG. 5).

Method 1600 further includes performing (1616) a second fusion (e.g., an inter-primate fusion) on the respective fourth waveguide of the selected first optical device and the first waveguide of the second optical device (or a continuation of the first waveguide of the second optical device, e.g., downstream of any intervening components). In some embodiments, when successful, the second fusion produces a 3-primate. In some embodiments, the second fusion is performed with fusion gate 301b in FIG. 5.

Note that, as used herein, the phrase "performing a fusion on waveguides" includes providing photons to waveguides that are coupled to a fusion gate. However, the phrase "performing a fusion on waveguides" does not necessarily imply that the waveguides are directly connected to the fusion gate that performs the fusion operation. Rather, in some circumstances, fusion is performed on waveguides when the outputs of the waveguides are coupled with the fusion gate. Note further that there may be one or more intervening components in the coupling of a waveguide and the fusion gate. For example, when the respective first optical device is selected, the second fusion is performed on the respective fourth waveguide of the selected first optical device through the multiplexer 502 (e.g., the multiplexer 502's output waveguides are connected to the fusion gate, and the multiplexer 502 routes the selected first optical device's waveguides to the multiplexer 502's output waveguides).

In some embodiments, method 1600 includes performing (1618) a third fusion on the respective first waveguide of the selected first optical device and the second waveguide of the second optical device to produce an n-photon entangled state. In some embodiments, the third fusion is an intra-primate fusion on the generated 3-primate. In some embodiments, the third fusion is performed on the external modes. In some embodiments, the n-photon entangled state is (1620) an n-Greenberger-Horne-Zeilinger (n-GHZ) state.

In some embodiments, method 1600 includes outputting photons in the n-photon entangled state.

It should be understood that the particular order in which the operations in FIG. 16 have been described is merely one example and is not intended to indicate that the described order is the only order in which the operations could be performed. One of ordinary skill in the art would recognize various ways to reorder the operations described herein. For example, operation 1608 may be performed before, after, or concurrently with, operation 1602. In some embodiments, one or more operations of methods 1600 are combined, supplemented, or replaced with one or more operations of other methods described herein (e.g., method 1700).

Figure 17:
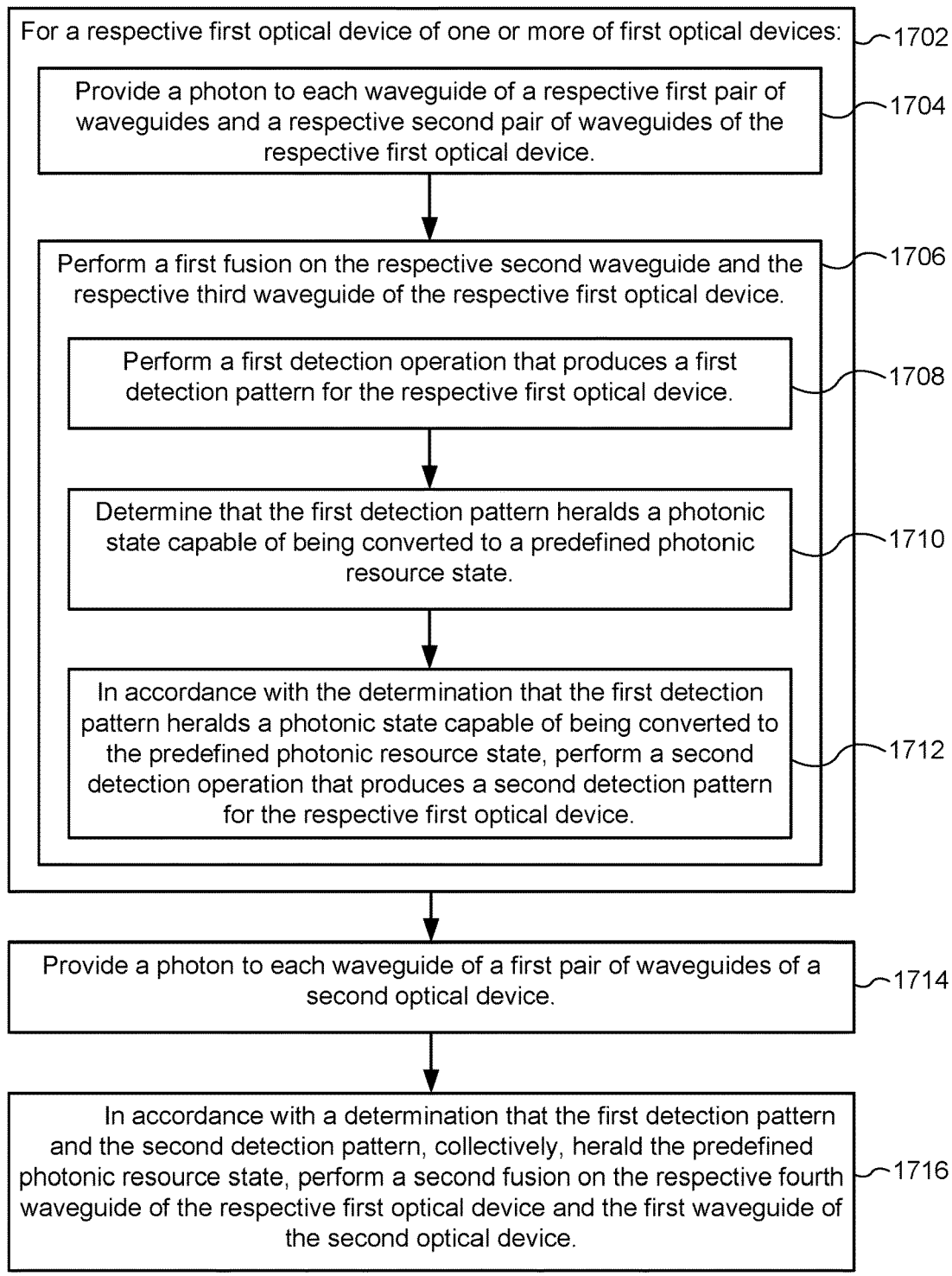
FIG. 17 is a flow chart illustrating a method of generating primates using bleeding, also known as thin-slicing, in accordance with some embodiments.

FIG. 17 is a flow chart illustrating a method of generating primates using bleeding, also known as thin-slicing, in accordance with some embodiments. Bleeding is described in greater detail with reference to Section IX.

In some embodiments, method 1700 is performed at an apparatus (e.g., optical device 500, FIG. 5) that includes one or more first optical devices (e.g., 2-primate generators 412, FIG. 5) and a second optical device (1-primate generator 402, FIG. 1). Each first optical device includes a respective first pair of waveguides (e.g., pair 416a of waveguides, FIG. 5) comprising a respective first waveguide (e.g., waveguide 418a, FIG. 5) and a respective second waveguide (e.g., waveguide 418b, FIG. 5) that are coupled together (e.g., by coupling 302a, FIG. 5). Each first optical device also includes a respective second pair of waveguides (e.g., pair 416b of waveguides, FIG. 5) comprising a respective third waveguide (e.g., waveguide 418c, FIG. 5) and a respective fourth waveguide (e.g., waveguide 418d, FIG. 5) that are coupled together (e.g., by coupling 302b, FIG. 5).

The second optical device includes a first pair of waveguides (e.g., pair 406 of waveguides, FIG. 5) comprising a first waveguide (e.g., waveguide 408a, FIG. 5) and a second waveguide (e.g., waveguide 408b, FIG. 5) that are coupled together (e.g., by coupling 302c, FIG. 5).

Method 1700 includes, for a respective first optical device of one or more of first optical devices (1702), providing (1704) a photon to each waveguide of the respective first pair of waveguides and the respective second pair of waveguides of the respective first optical device (e.g., to generate 1-primates) and performing (1706) a first fusion on the respective second waveguide and the respective third waveguide of the respective first optical device (e.g., to fuse the two 1-primates into a 2-primate). In some embodiments, the first fusion is performed using a multi-stage fusion gate (e.g., fusion gate 301-2, FIG. 3C). In some embodiments, the first fusion operation uses "bleeding," also referred to as "thin-slicing." In some embodiments, each stage of the multi-stage fusion gate has a transmissivity greater than 0.5 (or greater than 0.6, 0.7, 0.8, or 0.9).

To that end, performing the first fusion includes performing (1708) a first detection operation that produces a first detection pattern for the respective first optical device. In some circumstances, the first detection pattern indicates that the first detection operation detected zero photons.

Performing the first fusion further includes determining (1710) that the first detection pattern heralds a photonic state capable of being converted to a predefined photonic resource state (e.g., that zero photons were detected in the first detection operation). In some embodiments, the determination that the first detection pattern heralds a photonic state capable of being converted to the predefined photonic resource state via the second detection operation is based at least in part on a number of photons remaining, collectively, in the respective first pair of waveguides and the respective second pair of waveguides of the respective first optical device following the first detection operation (a zero photons detected in the first detection operation leaves a sufficient number (e.g., four) photons on the first optical device's waveguides to attempt to generate a 2-primate again).

Note that, as used herein, a "predefined photonic state" means a specific or intended photonic state, or one of a set of specific or intended photonic states. For example, in some embodiments, the predefined photonic state is a primate (e.g., a 2-primate). In some embodiments, the predefined photonic state is any photonic state that can be converted deterministically to a primate.

Performing the first fusion further includes, in accordance with the determination that the first detection pattern heralds a photonic state capable of being converted to the predefined photonic resource state, performing (1712) a second detection operation that produces a second detection pattern for the respective first optical device. In some embodiments, the second detection operation is performed conditionally in accordance with a determination that the first detection pattern does not herald the predefined photonic resource state.

Method 1700 includes providing (1714) a photon to each waveguide of a first pair of waveguides of a second optical device. In some embodiments, providing a photon to each waveguide of a first pair of waveguides of a second optical device produces a 1-primate.

Method 1700 includes, in accordance with a determination that the first detection pattern and the second detection pattern, collectively, herald the predefined photonic resource state, performing (1716) a second fusion on the respective fourth waveguide of the respective first optical device and the first waveguide of the second optical device (e.g., an inter-primate fusion to generate a 3-primate). In some embodiments, the first detection pattern does herald the predefined photonic resource state (e.g., a 2-primate) when a single photon is detected.

In some embodiments, the predefined photonic resource state is heralded the first time a stage of the multi-stage fusion gate detects a photon. Thus, in some embodiments, the first detection pattern and the second detection pattern, collectively, herald the predefined photonic resource state when the first detection pattern indicates that zero photons were detected and the second detection pattern indicates that one photon was detected.

In some embodiments, method 1700 includes performing a third fusion on the respective first waveguide of the respective first optical device and the second waveguide of the second optical device to produce an n-photon entangled state (e.g., an intra-primate fusion between the external modes of the 3-primate to produce a 3-GHZ state).

In some embodiments, method 1700 includes outputting photons in the n-photon entangled state.

It should be understood that the particular order in which the operations in FIG. 17 have been described is merely one example and is not intended to indicate that the described order is the only order in which the operations could be performed. One of ordinary skill in the art would recognize various ways to reorder the operations described herein. In some embodiments, one or more operations of methods 1700 are combined, supplemented, or replaced with one or more operations of other methods described herein (e.g., method 1600).

VIII. FORMALISMS

The structure of this section is as follows: first, generation of primates using fusion is described and the post fusion states are computed. Next, fusion success probabilities are calculated and the effect of bleeding on this scheme is discussed. Then finally, schemes for generating 4-GHZ and 6-GHZ from Bell-states are compared to the primate-based schemes of the present disclosure.

Primates

In some embodiments, an n-primate is formed by fusing n copies of 1-primates which are defined as:

$$|\psi_1\rangle = \frac{|20\rangle + |02\rangle}{\sqrt{2}} \qquad (10)$$

The 1-primate can be formed deterministically by transforming two single photons with a linear optical transfer matrix T:

$$T = e^{\frac{3\pi}{4}i}/\sqrt{2}\begin{pmatrix} 1 & i \\ i & 1 \end{pmatrix} \quad (11)$$

Fusion then occurs by subtracting a photon from a pair of modes, each from a different primate. The photon subtraction should be performed such that no information about which mode the subtracted photon has come from remains by the time the photons reach the detectors. Linear optical circuits for performing fusion, so-called "fusion gates 301" are shown in FIGS. 3B-3D.

The post fusion state and the probability with which it is obtained are described below. An un-normalized state following a successful fusion between modes i and j can be obtained by the applying the operator:

$$\hat{A}_{ij}^{\pm} = \hat{a}_i \pm \hat{a}_j \quad (12)$$

where $$\hat{a}_i | n_i, n_j \rangle = \sqrt{n_i} | n_i - 1, n_j \rangle$$

$$\hat{a}_j | n_i, n_j \rangle = \sqrt{n_j} | n_i, n_j - 1 \rangle$$

$$\hat{a}_i^{\dagger} | n_i, n_j \rangle = \sqrt{n_j + 1} | n_i, n_j + 1 \rangle$$

$$\hat{a}_i^{\dagger} \hat{a}_i = \hat{n}_i$$

followed by a damping $\eta^{(\hat{n}_i + \hat{n}_j)/2}$ which acts upon the basis state as $$\eta^{(\hat{n}_i + \hat{n}_j)/2} |n_1, n_2\rangle_{i,j} = \eta^{(n_i + n_j)/2} |n_1, n_2\rangle_{i,j} \quad (13)$$

where $\eta$ is the transmissivity of the fusion gate.

This is true for any state subjected to this photon-subtraction-type fusion and can be arrived at in the following way: first, one can show that if the ancilla modes are split into infinitely many modes, it is only the total number of photons detected across a split mode which determines the post measurement state, therefore one can consider all photons to be detected in a specific and infinitesimal part of the ancilla mode. This is equivalent to performing photon subtraction in the limit of $\eta \rightarrow 1$ and then projecting the rest of the ancilla mode onto the vacuum. Since performing photon subtraction in the limit of $\eta \rightarrow 1$ simply applies an operation proportional to $\hat{a}_i \pm \hat{a}_j$ and coupling with a transmissivity of $\eta$ into a vacuum state and projecting back onto the vacuum applies the damping denoted previously.

Figure 18A:
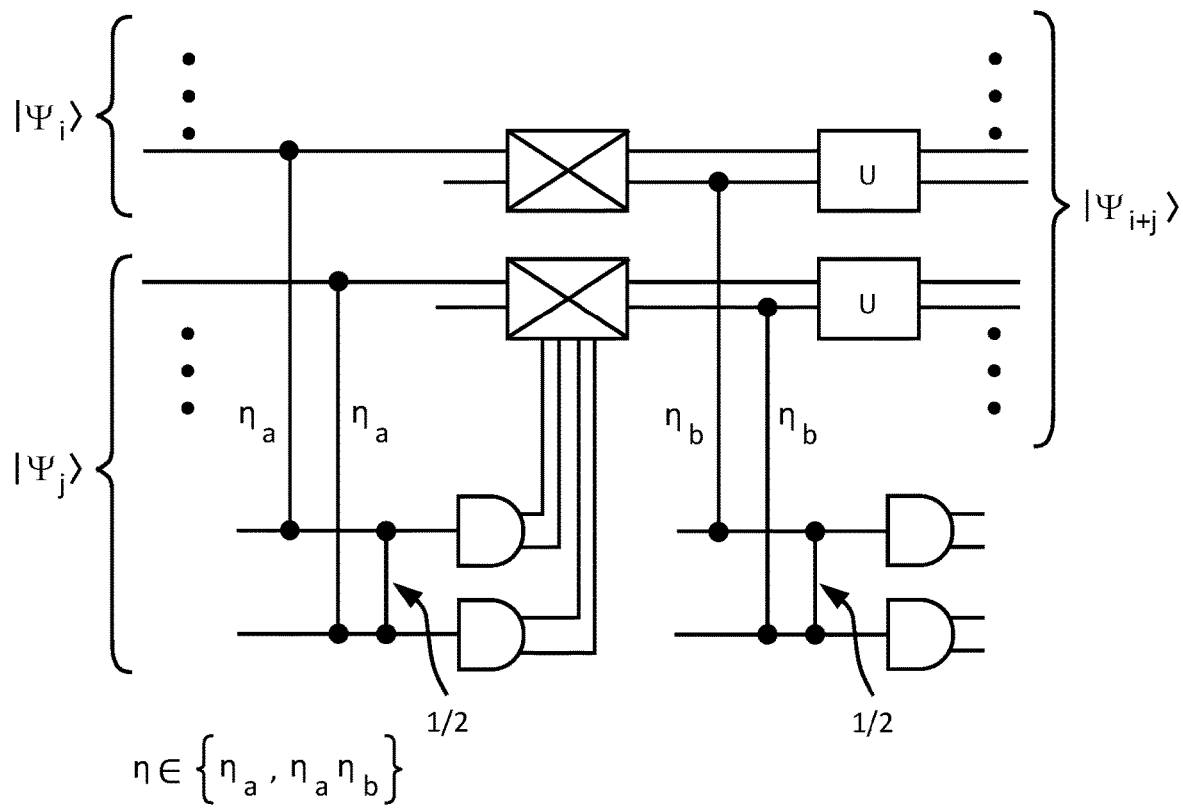
FIGS. 18A-18B are schematic diagrams illustrating transmissivity of a fusion gate, in accordance with some embodiments.
Figure 18B:
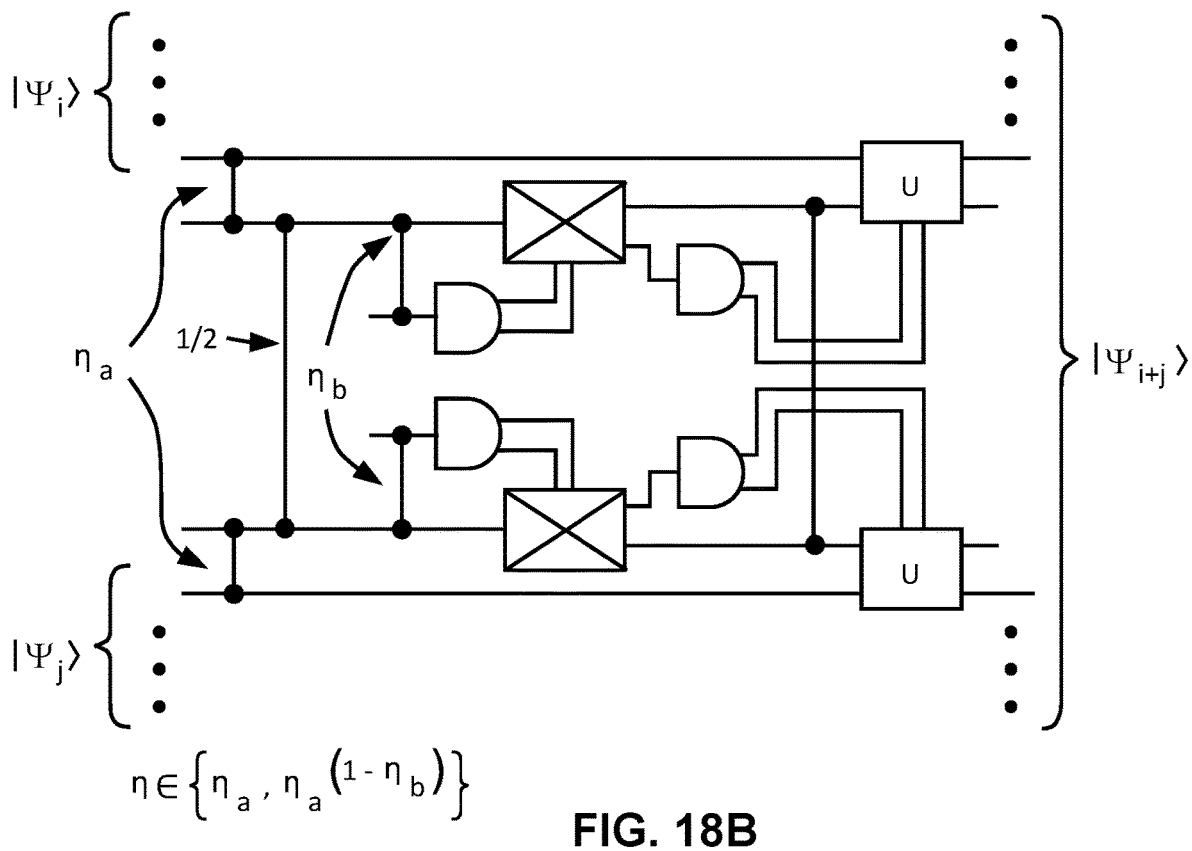

Note that if the fusion is attempted multiple times, or by detecting only a fraction of the ancilla mode as in bleeding, the post-fusion state (up to a possible spreading operation) can found by these same operators, where $\eta$ takes the value of the amount of the mode which remains undetected. This is illustrated with two examples in FIGS. 18A-18B. With reference to FIG. 18A, the overall fusion transmissivity $\eta$ is either $\eta_a$ or $\eta_b$ depending on whether the photon was detected at the first or second stage. With reference to FIG. 18B, the fusion transmissivity is either $\eta_a$ or $\eta_a + \eta_a \eta_b$. It is the overall fusion transmissivities which determine the post fusion state, and not related to the way the photon subtraction network is constructed.

Note further that the probabilities of subtracting different numbers of photons for some $\eta$ are given by a binomial distribution with a random number of trials and a success probability of $1-\eta$. The probability of a having N trials is the probability of having a total of N photons in the two modes being fused, i.e., $$\wp_{ij}^{tot}(N) = tr\left(\varrho \sum_\nu |N-\nu, \nu\rangle\langle N-\nu, \nu|_{i,j}\right) \quad (14)$$

such that the probability of subtracting k photons from a state $\varrho$ is $$\wp_{ij}^{sub}(k) = tr\left(\sum_N \wp_{ij}^{tot}(N)\binom{N}{k}(1-\eta)^k \eta^{N-k}\right). \quad (15)$$

The class of 2-primate states which results from fusing two 1-primates with a fusion transmissivity of $\eta$ can be computed to be:

$$|\psi_2\rangle \propto \eta^{\frac{\hat{n}_2 + \hat{n}_3}{2}} \hat{A}_{23}^{\pm} |\psi_1\rangle^{\otimes 2} \quad (16)$$

$$\propto \eta^{\frac{\hat{n}_2 + \hat{n}_3}{2}} (|0120\rangle \pm |0210\rangle \pm |2010\rangle \pm |0102\rangle) \quad (17)$$

$$= \sqrt{n}(|0\rangle|1,0\rangle|2\rangle \pm |2\rangle|0,1\rangle|0\rangle + \eta|0\rangle(|1,2\rangle \pm |2,1\rangle)|0\rangle) \quad (18)$$

Figure 19A:
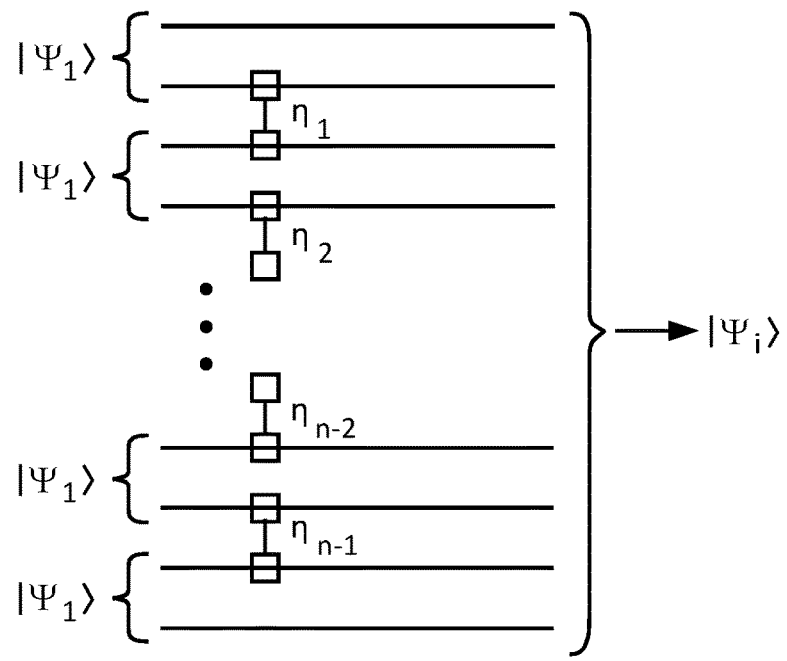
FIGS. 19A-19B are schematic diagrams illustrating fusion of a plurality of primates into a larger primate, and conversion of the larger primate to a GHZ state, in accordance with some embodiments.

FIG. 19A illustrates fusion of i 1-primates into an i-primate. The class of i-primate states formed by fusing i 1-primates with fusion transmissivities $\eta_1, \eta_2, \ldots, \eta_n$ can be computed to be:

$$|\psi_i\rangle = N(|2\rangle|0,1\rangle^{\otimes i-1}|0\rangle \pm |0\rangle|1,0\rangle^{\otimes i-1}|2\rangle + \quad (19)$$

$$\sum_{j=1}^{i-1} \eta_j |0\rangle|1,0\rangle^{\otimes i-2-j}(|1,2\rangle \pm |2,1\rangle)|0,1\rangle^j|0\rangle)$$

$$(20)$$

$$= \sqrt{\frac{\lambda}{2}} |2\rangle|0,1\rangle^{\otimes i-1}|0\rangle \pm |0\rangle|1,0\rangle^{\otimes i-1}|2\rangle + \sqrt{1-\lambda}|0\rangle|\zeta_\eta\rangle|0\rangle$$

where:

$$N = \frac{1}{\sqrt{2 + 2\sum_j \eta_j^2}} \quad (21)$$

$$\lambda = \frac{1}{1 + 1\sum_j \eta_j^2} \quad (22)$$

Figure 19B:
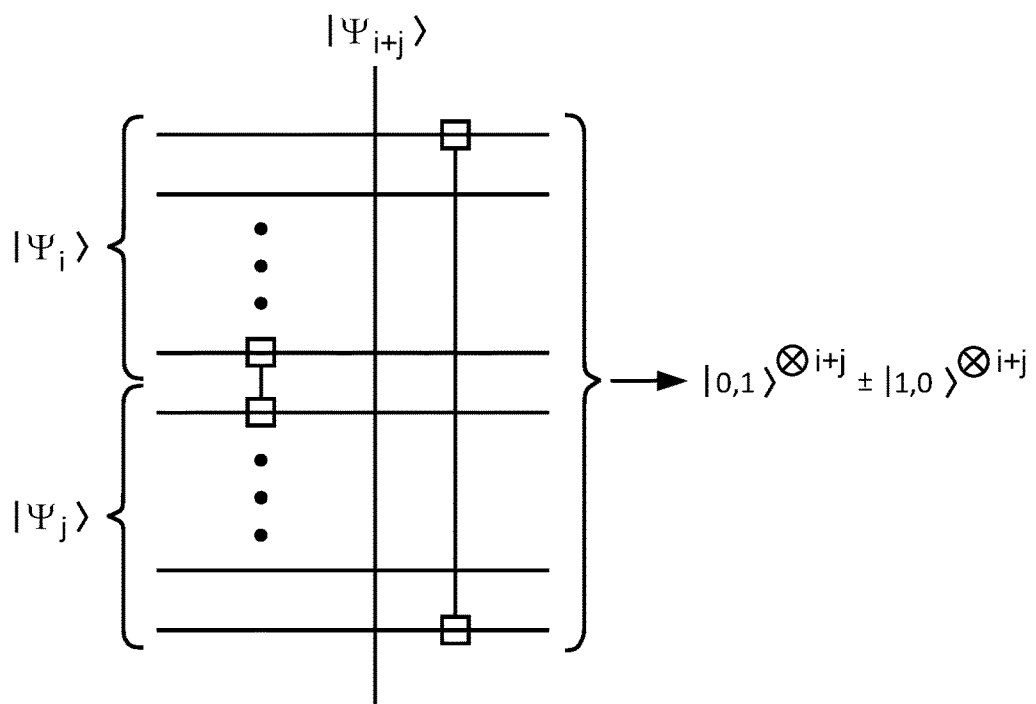

FIG. 19B illustrates fusion of i- and j-primates into an (i+j)-primate followed by conversion into an (i+j)-GHZ state via the same photon subtraction mechanism. An n-primate can be converted into an n-GHZ state (e.g., comprising n qubits in a GHZ state, which is an entangled state of qubits) by fusing its external modes together as shown in the later part of FIG. 19B (e.g., performing intra-primate fusion). A few things can be observed from the expression of the i-primate above. First, the fusion probabilities will be determined by $\lambda$ alone. Second, the term proportional to $\sqrt{\lambda}$ is the only one which contributes to the success probability of the intra-primate fusion. Additionally, it can be seen that for uniform fusion transmissivities, $\eta_j = \eta$ the probability associated with this term decays with increasing $\eta$. $\lambda$ decreases with increasing $\eta_j$'s such that it may be beneficial to choose low transmission values. After fusing two primates with $\lambda_1$ and $\lambda_2$ the new primate will have a new $\lambda$:

$$\lambda' = \frac{\lambda_1 \lambda_2}{\lambda_1 + \lambda_2 + (1 - \eta^2)\lambda_1 \lambda_2} \quad (23)$$

Fusion Success Probabilities

From the description above, it can be seen that the success probability for fusing two primates with $\lambda_1$ and $\lambda_2$ in the limit of infinite bleeding, will be:

$$\frac{(\lambda_1 - 2)(\lambda_2 - 2)}{4} \leq \frac{3}{4} \quad (24)$$

which is the probability that there is at least one photon in the modes being fused. Similarly, the probability of successful intra-primate fusion is $\lambda$ in the infinite bleeding limit. When two primates are turned into a GHZ state as shown in FIG. 19B, no multiplexing can occur between the final two fusions. Therefore, the properties of these two fusions are best considered one operation, herein referred to as "encircling fusion." The maximum success probability of the encircling fusion with infinite bleeding is $$\frac{\lambda_1 \lambda_2}{2},$$

which, again, is the probability of there being at least on photon in each of the pairs of modes being bled. Note the optimal bleeding strategy when using m−1 detection stages for fusions at the final stage is to split the modes undergoing fusion into m equal parts.

Another property of the i-primate state is that performing bleeding will produce a primate with a lower average $\lambda$ than using a single $\eta$ beam-splitter. Only when there are two or four photons in the modes undergoing fusion can there be a successful photon subtraction event. When bleeding is performed to maximize the photon subtraction probability, it is more likely the first subtracted photon will be found in the first parts of the mode being detected. This is true whenever the original number of photons in a mode undergoing photon subtraction is greater than one.

To remedy this problem associated with bleeding, a minimum could be placed on the fusion transmissivity such that only after enough of the mode has been detected will the detection of a single photon be considered a success. One implementation of a single bleeding stage (splitting the mode undergoing fusion into three) is as follows: split the detected modes into two parts, and if a photon is seen at the first detection stage, consider this event to be a failure. This is not a good strategy since the post fusion state depends only on the total amount of the mode which is detected. Therefore, the success cases when a photon is only detected at the second stage will produce the same post fusion state as not doing bleeding and just detecting the total amount of the mode which is heading toward the detector. This leads to the following conclusion: the first detected mode should be large enough to be considered a success else it is a wasted stage. A less naive strategy is the following: Send a larger proportion of the modes undergoing fusion to the detector in the first stage of bleeding and then the rest of the mode is split evenly amongst the rest of the stages. This will place a maximum on the fusion transmissivity without being wasteful. The success probability can be computed for this strategy and is provided in Equation A1 where m is the number of modes which the fused modes are split into, e.g., m=2 would be without bleeding and $r_1$ is the amount of the fused modes which goes to the first detector, more precisely, if there was one photon in the modes undergoing fusion, then $r_1$ would be the probability that it is detected at the first stage and the probability it would be detected at any subsequent stage would be $$\frac{1 - r_1}{m - 1}.$$

The table below summarized the expressions related to primate fusion.

TABLE 1

A summary of the properties of primate fusion presented in section I and section II. The expressions for fusing two primates with $\lambda 1$ and $\lambda 2$ are shown. m = 2 refers to the conventional strategy without bleeding and m-1 is the number of detection stages.

Equation A1

$$\frac{1 - r_1}{4(m-1)^2}\{2\lambda_2(m-1)(m+(m-2)r_1) + \lambda_1[4r_1(1+\lambda_2(-2+r_1)r_1) - 2m(1 + 3r_1 + \lambda_2(-1+r_1+4(-2+r_1)r_1^2 + m^2(2(1+r_1) - \lambda_2(1+r_1+r_1^2+3r_1^3)))\}$$

| | $|\psi_i\rangle|\psi_j\rangle \to |\psi_{i+j}\rangle$ | $|\psi_i\rangle|\psi_j\rangle \to |0,1\rangle^{\otimes i+j} \pm |1,0\rangle^{\otimes i+j}$ |
|---|---|---|
| Prob w/o Bleed | $\eta(1-\eta)[\lambda_1 + \lambda_2 - \lambda_1\lambda_2(1 - \lambda_1\lambda_2/8 \eta^2)]$ | |
| Prob w/Bleed | Equation A1 | $\lambda_1\lambda_2(1 - 1/m)^2/2$ |
| Max Prob, | $1 - (2 - \lambda_1)(2 - \lambda_2)/4 \leq 3/4$ | $\lambda_1\lambda_2/2 \leq 1/2$ |
| $\lambda'$ | $\lambda_1\lambda_2/[\lambda_1 + \lambda_2 - (1 - \eta^2)\lambda_1\lambda_2]$ | N/A |

Multiplexing

By breaking GHZ generation schemes up into fusions between primates, some embodiments provide multiplexing in previously un-multiplexable schemes. In this section two primate multiplexing strategies for producing a GHZ states are compared against two strategies using Bell-pairs. One comparison is made with respect to a 4-GHZ target state and the comparison is made with respect to a 6-GHZ target state. To create a 4-GHZ state using primates, four single photons are multiplexed into 2-primate generators where one stage of bleeding may be used. Then pairs of these 2-primates are multiplexed and turned into 4-GHZ states before a final stage of multiplexing to get a 4-GHZ state with some desired probability. To create the 4-GHZ via Bell states, four single photons are multiplexed into a Bell state generator which succeeds with a probability of 3/16 where the cost of using the 1/16 outcome is equated with the one stage of bleeding used in the primate scheme. Then three Bell pairs are multiplexed into a boosted type-I fusion which produces a 4-GHZ state with a probability of 1/4.

Figure 20A:
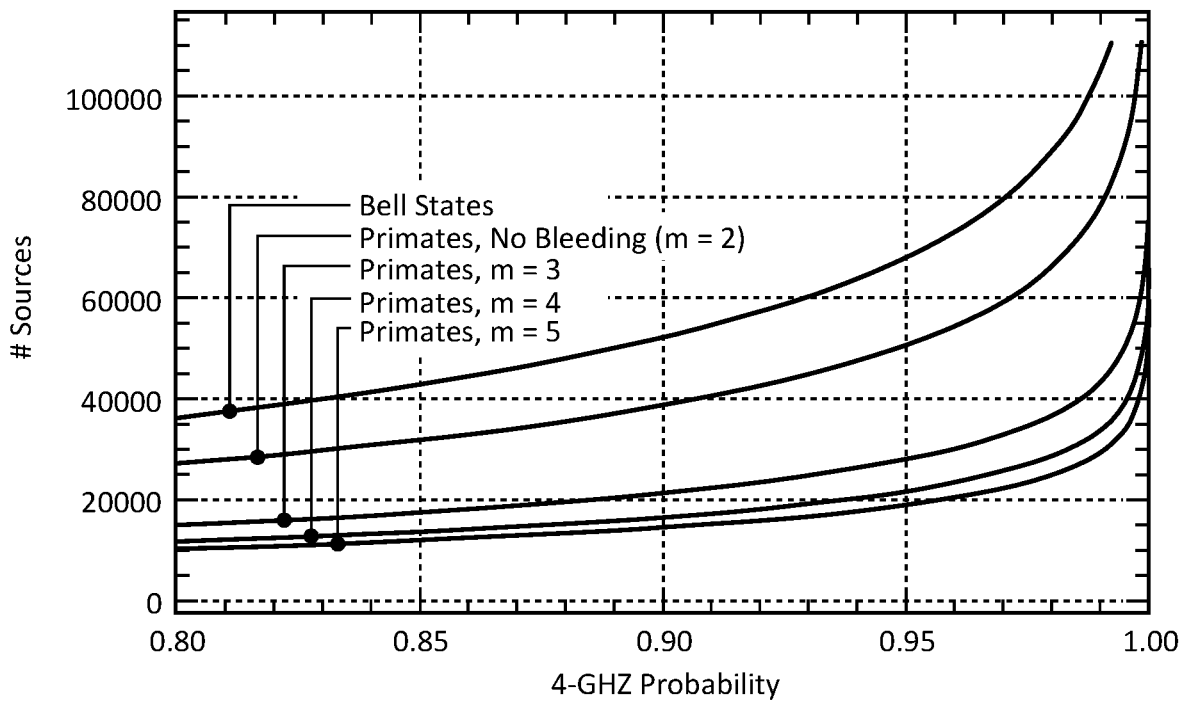
FIGS. 20A-20B are graphs of simulation results showing numbers of photon sources needed to generate 4-GHZ states and 6-GHZ states, in accordance with some embodiments.

The type of multiplexing may include that of chain-mux or equivalently any scheme where a set of photons or modes are switched to a single output at each stage. An optimization may be performed to maximize the probability of obtaining a 4-GHZ state after the final stage of multiplexing. The number of inputs being multiplexed at each stage may vary continuously. In the primate scheme, the coupling into the detectors at the first bleeding stage as well as the number of generators at each stage are optimized whilst keeping the number of sources fixed. Performing this optimization and setting the source probability to 0.1 yields the curves shown in FIG. 20A. In order to calculate the success probability of this scheme it is helpful to note that the probability of success of the final fusion stage is linear in both $\lambda_1$ and $\lambda_2$ such that an average lambda can be used instead.

Boosted type-I fusion (described below in Section XI) requires one of the Bell states to be in a specific state which requires a switch so the most direct comparison is between the Bell state strategy and the m=3 primate strategy. As can be seen in the number of sources required is much lower for this strategy, specifically in order to get a final probability of 0.95 the Bell state strategy requires 68,000 sources whereas the m=3 primate strategy requires only 28,000 sources to get the same final probability. A similar ratio between the number of sources needed if the Bell state generator is considered to work with a probability of 1/8 and the stage of bleeding is omitted from the 2-primate generation.

Figure 20B:
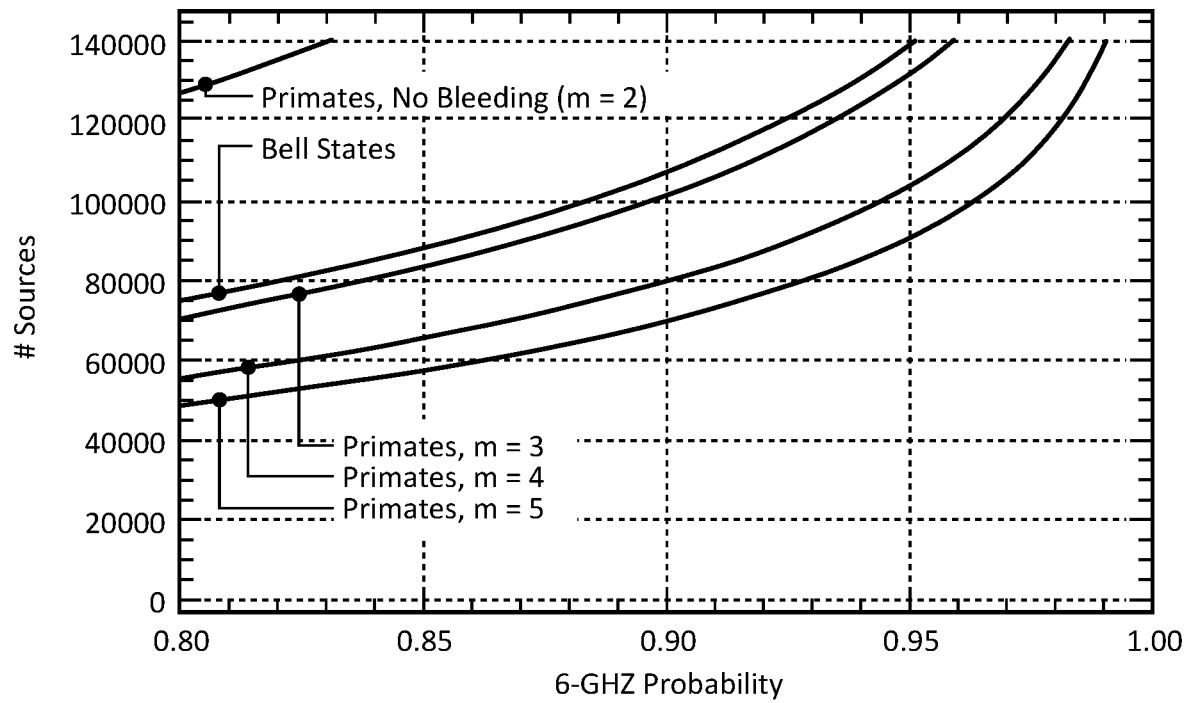

The primate strategy for producing 6-GHZ states is the same as for the 4-GHZ state except an additional 2-primate is needed at the final fusion stage which is then a triple fusion between three 2-primates. Similarly to the 4-GHZ scheme using primates, it is helpful to note that the final triple fusion stage is linear in the $\lambda$'s of the primates so only the average 2 needs be considered. The Bell state strategy for the 6-GHZ state uses the four Bell pair to generate a 6-GHZ as is in the linear optics end-to-end. Again, the success probability of the Bell state circuit is considered to be 3/16 as is the 4 Bell pair to 6-GHZ fusion. The m=3 primate strategy is compared to the Bell state strategy since both require a switch to get a 6-GHZ state on a predetermined set of modes. To produce a 6-GHZ state using the m=3 primate scheme requires 138,000 sources compared to 140,000 for the Bell state strategy. The results for these schemes are shown in FIG. 20B.

Also the simulation results indicate that the primate strategy has a better loss tolerance than the Bell state strategy.

The performance of creating 3-primates and then fusing these into a 6-GHZ showed that it was much worse than using three 2-primates regardless of whether a stage of bleeding was used in the primate generation. Another numerical observation is that allowing the coupling into the first detection stage (with or without bleeding) does make a difference for primate generation, altering the success probabilities by a few percent. Whereas, altering the amounts sent to subsequent detection stages of bleeding made only a minuscule difference. Altering the splittings does not help in the final fusion stage since only the success probability is important such that equal splittings are optimal (e.g., the probability a single photon would go to any of the detection stages or not be detected at all should be equal).

IX. ADAPTIVE RESOURCE STATE GENERATION (ALSO REFERRED TO AS "BLEEDING" OR "THIN-SLICING")

Figure 21:
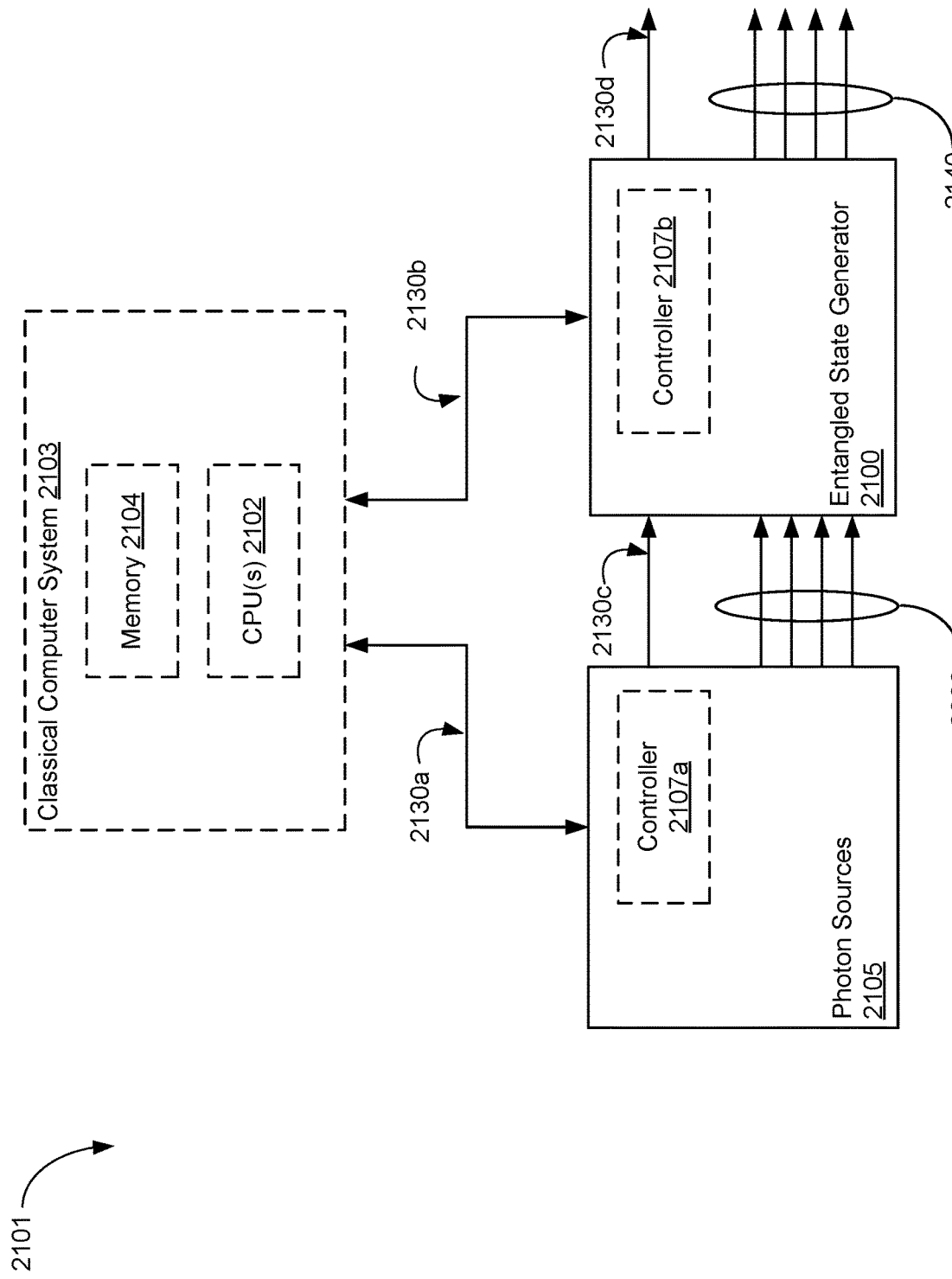
FIG. 21 illustrates a schematic diagram of a system for obtaining a pair of photons in an entangled state, e.g., a Bell state (also referred to herein as a "Bell pair"), in accordance with some embodiments.

FIG. 21 illustrates a schematic diagram of a system 2101 for obtaining photons in an entangled state (e.g., a GHZ state, Bell pair, and the like), in accordance with some embodiments. System 2101 includes a photon source module 2105 that is optically connected to entangled state generator 2100. Both photon source module 2105 and entangled state generator 2100 can be coupled (e.g., electrically coupled via a classical channel 2130) to a classical computer system 2103 such that the classical computer system 2103 can communicate and/or control the photon source module 2105 and/or the entangled state generator 2100. Photon source module 2105 can include a collection of single-photon sources that can provide output photons to entangled state generator 2100 by way of interconnecting waveguides 2302. The precise type of photon source used within photon source module 2105 is not critical and any type of source, employing any process, such as SPFW, spontaneous parametric down-conversion (SPDC), or any other process can be used. Other classes of sources that do not necessarily require a nonlinear material can also be employed, such as those that employ atomic and/or artificial atomic systems can be used, e.g., quantum dot sources, color centers in crystals, and the like. As an example, in some embodiments, a MUX photon source employs spatial multiplexing (MUX) of several non-deterministic photon sources. However, many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with pump switching schemes, asymmetric multi-crystal single photon sources, or any other type of MUX architecture can be used. In some embodiments, the photon source can employ a MUX scheme with quantum feedback control and the like.

Entangled state generator 2100 can receive the output photons and convert them to one or more entangled photonic states and then output these entangled photonic states into output waveguides 2140 to some downstream circuit that can use the entangled states. In some examples, the entangled states generated by the entangled state generator 2100 can be used as resources for a downstream quantum optical circuit (not shown), e.g., they can be fused together to build a larger entangled states, e.g., cluster states. In some embodiments, the entangled states generated by the entangled state generator 2100 can be used in any system that uses entanglement shared by multiple parties, e.g., in quantum key distribution, quantum computing protocols based on teleportation, quantum communication, and the like.

In terms of the Fock state description of quantum states described above, in one example, the photon source module 2105 can output one photon per waveguide thereby generating the quantum state denoted by $|1111\rangle_{1,2,3,4}$. The action of the entangled state generator 2100 is to convert this input state $|1111\rangle_{1,2,3,4}$ to an entangled state such as a Bell state, e.g., a state described by any one of Equations (1)-(4) described above, with some success probability P. The entangled state is output into output waveguides 2140 with a probability P that is high compared to current methods for generating Bell states or GHZ states. In some embodiments, the entangled state generator 2100 can have P>20%, P>50%, e.g., P=67%.

In some embodiments, system 2101 includes classical channels 2130 (e.g., classical channels 2130a through 2130b) for interconnecting and providing classical information between components. It should be noted that classical channels 2130 need not all be the same. For example, classical channel 2130a through 2130c may comprise a bi-directional communication bus carrying one or more reference signals, e.g., one or more clock signals, one or more control signals, or any other signal that carries classical information, e.g., heralding signals, photon detector readout signals, and the like.

In some embodiments, system 2101 includes classical computer system 2103 that communicates with and/or controls the photon source module 2105 and/or the entangled state generator 2100. For example, in some embodiments, classical computer system 2103 is used to configure one or more circuits, e.g., using system clock that may be provided to photon sources 2105 and entangled state generator 2100 as well as any downstream quantum photonic circuits used for performing quantum computation (e.g., quantum computation circuits, which may include optical circuits, electrical circuits, or other types of circuits). In some embodiments, classical computer system 2103 includes memory 2104, one or more processors 2102, a power supply, an input/output (I/O) subsystem, and a communication bus or interconnecting these components. The processors 2102 can execute modules, programs, and/or instructions stored in memory 2104 and thereby perform processing operations.

In some embodiments, memory 2104 stores one or more programs (e.g., sets of instructions) and/or data structures. For example, in some embodiments, as described below, entangled state generator 2100 attempts to produce an entangled state over successive stages, any one of which may be successful in producing an entangled state. In some embodiments, memory 2104 stores one or more programs for determining whether a respective stage was successful and configuring the entangled state generator 2100 accordingly (e.g., by configuring entangled state generator 2100 to switch the photons to an output if the stage was successful, or pass the photons to the next stage of the entangled state generator 2100 if the stage was not yet successful). To that end, in some embodiments, memory 2104 stores detection patterns (described below) from which the classical computing system 2103 can determine whether a stage was successful. In addition, memory 2104 can store settings that are provided to the various configurable components (e.g., switches) described herein that are configured by, e.g., setting one or more phase shifts for the component. For example, FIG. 15B illustrates a schematic diagram of a switch that can be configured to output a photon into either of two waveguides based on a configurable phase shift.

In some embodiments, some or all of the above-described functions may be implemented with hardware circuits on photon source module 2105 and/or entangled state generator 2100. For example, in some embodiments, photon source module 2105 includes one or more controllers 2107a (e.g., logic controllers) (e.g., which may comprise field programmable gate arrays (FPGAs), application specific integrated circuits (ASICs), a "system on a chip" that includes classical processors and memory, or the like). In some embodiments, controller 2107a determines whether photon source module 2105 was successful (e.g., for a given attempt on a given clock cycle, described below) and outputs a reference signal indicating whether photon source module 2105 was successful. For example, in some embodiments, controller 2107a outputs a logical high value to classical channel 2130a and/or classical channel 2130c when photon source module 2105 is successful and outputs a logical low value to classical channel 2130a and/or classical channel 2130c when photon source module 2105 is not successful. In some embodiments, the output of controller 2107a is used to configure hardware-based in controller 2107-b.

Similarly, in some embodiments, entangled state generator 2100 includes one or more controllers 2107b (e.g., logical controllers) (e.g., which may comprise field programmable gate arrays (FPGAs), application specific integrated circuits (ASICS), or the like) that determine whether a respective stage of entangled state generator 2100 has succeeded, perform the switching logic described above, and output a reference signal to classical channels 2130b and/or 2130d to inform other components as to whether the entangled state generator 2100 has succeeded.

In some embodiments, classical computing system 2103 generates a system clock signal and provides the system clock signal to photon source module 2105 and entangled state generator 2100 via classical channels 2130a and/or 2130-b. In some embodiments, the system clock signal provided to photon source module 2105 triggers photon source module 2105 to attempt to output one photon per waveguide thereby attempting to generate the quantum state denoted by $|1111\rangle_{1,2,3,4}$. In some embodiments, the system clock signal provided to entangled state generator 2100 triggers, or gates, sets of detectors in entangled state generator 2100 to attempt to detect photons (e.g., as described below with reference to operations 2206 and 2215, FIG. 22, and detectors 2312 (FIG. 23A), 2414 (FIG. 24), 2612 (FIG. 26)). For example, in some embodiments, triggering a set of detectors in entangled state generator 2100 to attempt to detect photons includes gating the set of detectors.

It should be noted that, in some embodiments, photon source module 2105 and entangled state generator 2100 can have internal clocks. For example, photon source module 2105 can have an internal clock generated and/or used by controller 2107a and entangled state generator 2100 has an internal clock generated and/or used by controller 2107-b. In some embodiments, the internal clock of photon source module 2105 and/or entangled state generator 2100 is synchronized to an external clock (e.g., the system clock provided by classical computer system 2103) (e.g., through a phase-locked loop). In some embodiments, any of the internal clocks and themselves be used as the system clock, e.g., an internal clock of the photon source can be distributed to other components in the system and used as the master/system clock.

In some embodiments, photon source module 2105 includes a plurality of probabilistic photon sources that can be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) can generate zero, one, or more photons. As used herein, the term "attempt" is used to refer to the act of driving a photon source with some sort of driving signal, e.g., a pump pulse, that may produce output photons non-deterministically (i.e., in response to driving signal, the probability that the photon source will generate one or more photons is less than 1). In some embodiments, a respective photon source is most likely to, on a respective attempt, produce zero photons (e.g., there is a 90% probability of producing zero photons per attempt to produce a single-photon). The second most likely result for an attempt is production of a single-photon (e.g., there is a 9% probability of producing a single-photon per attempt to produce a single-photon). The third most likely result for an attempt is production of two photons (e.g., there is a 1% probability of producing two photons per attempt to produce a single-photon). In some circumstances, there is less than 1% probability of producing more than two photons.

In some embodiments, the apparent efficiency of the photon sources is increased by using a plurality of single-photon source (e.g., a redundant number of single-photon sources) and multiplexing the outputs of the plurality of photon sources.

In some embodiments, the photon sources are faint lasers (e.g., a single-photon source 2105 can be produced by attenuating a conventional laser beam to reduce its intensity and thereby reduce a mean photon number per pulse to less than one). In some embodiments, photon sources 2105 are faint light-emitting diodes (LEDs).

The photon sources of photon source module 2105 output photons (e.g., single photons) to Bell state generator 2100 via waveguides 2302. Various embodiments of Bell state generator 2100 and waveguides 2302 are described in greater detail below.

FIG. 22 is a flowchart of a method 2200 of generating an m photon entangled state, e.g., a Bell state or a GHZ-state, in accordance with some embodiments. In some embodiments, method 2200 is performed at system (e.g., system 2101, FIG. 21) that includes a classical computer (e.g., that includes one or more processors and memory), a plurality of photon sources (e.g., single-photon sources) and a Bell state generator.

Figure 23A:
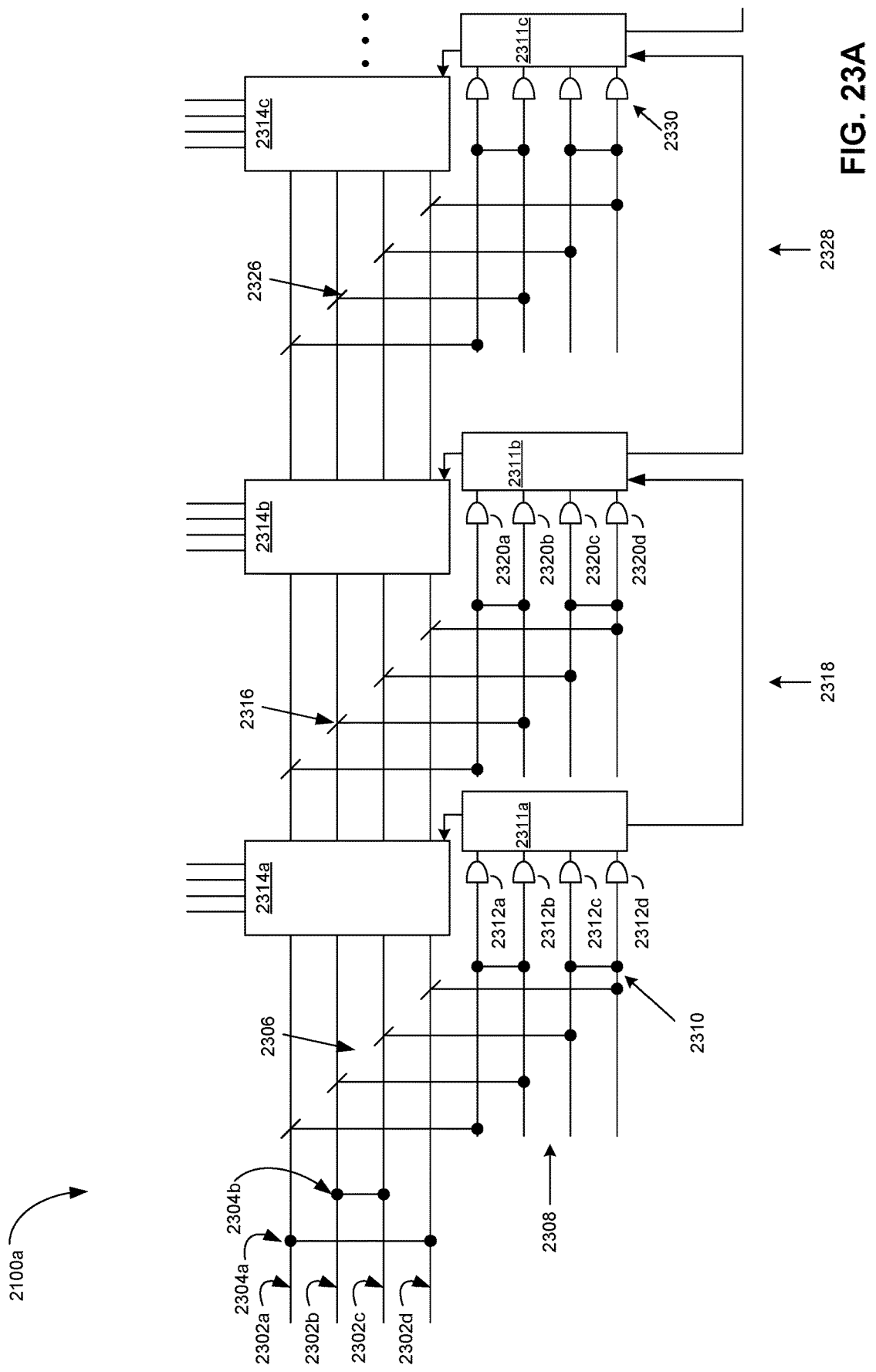
FIGS. 23A-23B illustrate schematic diagrams of devices for obtaining a pair of photons in a Bell state, in accordance with some embodiments.
Figure 23B:
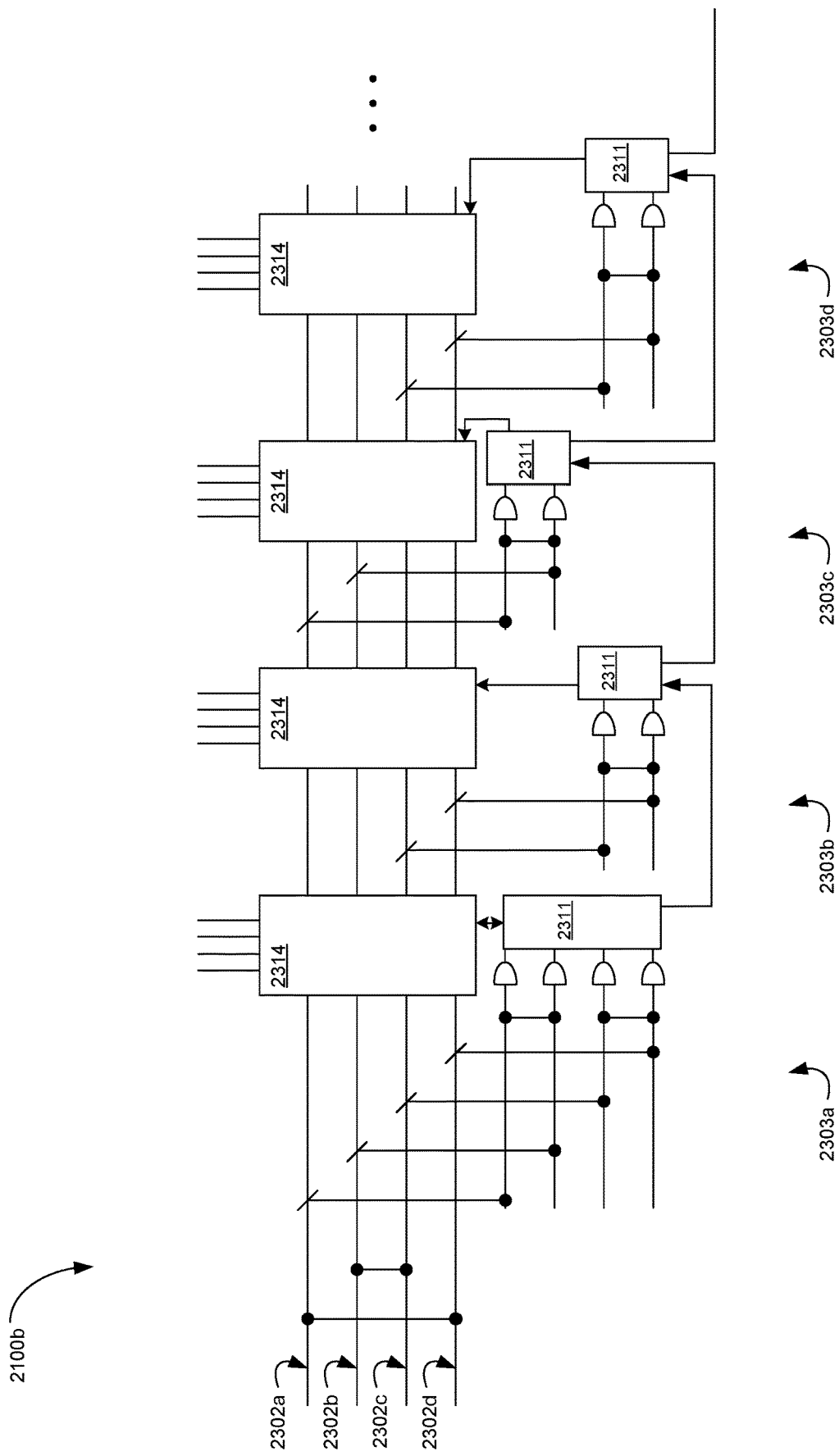

Method 2200 includes inputting (2202) a respective photon into each mode of a first plurality of modes (e.g., using photon sources 2105, FIG. 21). In some embodiments, the modes are spatial modes defined by waveguides (e.g., waveguides 2302, FIGS. 21 and 23A-23B). The plurality of modes includes at least a first pair of modes and a second pair of modes (e.g., as shown in FIGS. 23A-23B, waveguides 2302*a* and 2302*b* define a first pair of modes, waveguides 2302*c* and 2302*d* define a second pair of modes).

The first plurality of modes is coupled with a second plurality of modes (e.g., using beam splitters, such as beam splitter 1500, FIG. 15A). In some embodiments, the second plurality of modes are vacuum modes. In some embodiments, the coupling between the first plurality of modes with the second plurality is a weak coupling (as described below).

Method 2200 includes performing (2204) a first detection operation that includes detecting zero or more photons in the second plurality of modes that is coupled with the first set of modes. In some embodiments, performing the first detection operation includes reading out a set of detectors (e.g., detectors 2312) to determine which, if any, of the detectors detected photons.

In some embodiments, the method 2200 includes determining based on a number of photons detected in the first detection operation (e.g., using a classical computer processor, such as controller(s) 2107*b*, FIG. 21), whether more than m photons remain in the first plurality of modes after the first detection operation (e.g., by inferring the number of photons remaining in the first plurality of modes by subtracting the number of photons detected in the first detection operation from the number of photons provided to the inputs of the first plurality of modes). In some embodiments, the method can be employed for generating photons in a Bell state, in which case m=2. In some embodiments, the method can be employed for generating photons in a 3-GHZ state, in which case m=3. In some embodiments, when fewer than m photons remain in the first plurality of modes after the first detection operation, the attempt is labeled by the system as a failure and is discarded, e.g., classical information, e.g., a bit, that encodes a failure during the associated clock cycle can be output via channel 2130*d*. In some embodiments, when exactly m photons remain in the first plurality of modes after the first detection operation, the method 2200 includes determining whether the photons remaining in the first plurality of modes are in an entangled state (e.g., a predefined, desired, entangled state, such as a specific Bell state or GHZ state). In some embodiments, determining (e.g., using controller(s) 2107*b*, FIG. 21) whether the photons remaining in the first plurality of modes are in an entangled state includes determining whether a detection pattern in the first detection operation heralds an entangled state (or, alternatively, heralds a state that is not an entangled output state).

In some embodiments, when there are exactly m photons remaining in the first plurality of modes after the first detection operation, but the photons are not in an entangled state (e.g., any of the desired GHZ- or Bell-states), the method 2200 includes performing a remedial operation, such as performing a mode-swap to deterministically convert the photons into an entangled state (if that is possible, given the photons' state) or performing a distillation process to stochastically convert the photons to an entangled state. In some embodiments, performing the remedial operation includes outputting the photons remaining in the first plurality of modes to a remedial circuit (e.g., a mode-swap circuit or a distillation circuit).

Operations 2208-2212, described below, are performed conditionally in accordance with a determination (2206), based on a number of photons detected in the first detection operation, that more than m photons remain in the first plurality of modes after the first detection operation. In some embodiments, when fewer than m photons remain in the first plurality of modes after the first detection operation, the attempt is a failure and is discarded.

Method 2200 includes performing (2208) a second detection operation that includes detecting zero or more photons in a third plurality of modes that is coupled with the first plurality of modes (e.g., using detectors 2320, FIGS. 23A-23B).

Method 2200 includes determining (2212) (e.g., using classical processors 2102, FIG. 21), based at least in part on a number of photons detected in the second detection operation, whether the photons remaining in the first plurality of modes after the second detection operation are in the entangled state or a state convertible to the entangled state (e.g., based on detection patterns in the first detection operation and the second detection operation). In some embodiments, determining whether the photons remaining in the first plurality of modes after the second detection operation are in the entangled state or a state convertible to the entangled state includes determining that there are exactly m photons remaining in the first plurality of modes (by inferring the number of photons remaining in the first plurality of modes by subtracting the number of photons detected in the first detection operation and the number of photons detected in the second detection operation from the number of photons provided to the inputs of the first plurality of modes).

Method 2200 includes, in accordance with a determination that the photons remaining in the first plurality of modes after the second detection operation are in the entangled state or a state convertible to the entangled state, outputting (2212) the photons remaining in the first plurality of modes (e.g., onto output waveguides 2140, FIG. 21).

In some embodiments, when there are exactly m photons remaining in the first plurality of modes after the second detection operation, but the photons are not in an entangled state, the method 2200 includes performing a remedial operation, such as performing a mode-swap to deterministically convert the photons into an entangled state (if that is possible, given the photons' state) or performing a distillation process to stochastically convert the photons in an entangled state. In some embodiments, performing the remedial operation includes outputting the photons remaining in the plurality of modes to a remedial circuit (e.g., a mode-swap circuit or a distillation circuit).

FIG. 23A illustrates a schematic diagram of a device 2100*a* (e.g., an example of a device 2100, FIG. 21) for obtaining a pair of photons in a Bell state (also referred to herein as a "Bell pair"), in accordance with some embodiments is shown. Device 2100*a* is sometimes referred to as a Bell state generator and can correspond to entangled state generator 2100 described above in reference to FIG. 21.

Device 2100*a* includes a first plurality of waveguides 2302 (e.g., photonic waveguides). In some embodiments, any of the waveguides described herein may be microphotonic (e.g., integrated) waveguides fabricated on a chip (e.g., a silicon chip).

In the example shown in FIG. 23A, the first plurality of waveguides 2302 includes four waveguides (e.g., waveguides 2302*a* through 2302*d*). In some embodiments, the first plurality of waveguides 2302 include a first pair of waveguides (e.g., waveguide 2302*a* and waveguide 2302*b*) and a second pair of waveguides (e.g., waveguide 2302*c* and waveguide 2302*d*). Each pair of waveguides is capable of housing one or more photons. For example, a single-photon can be present in waveguide 2302*a* and zero photons can be present in waveguide 2302*b* (referred to as a logical 1 state above). Likewise, a single-photon can be present in waveguide 2302*c* and zero photons can be present in waveguide 2302*d* (referred to as a logical 0 state above). In general, any group of photons in the first plurality of waveguides 2302 may be prepared in an entangled quantum state, e.g., in a Bell state, i.e., it is possible for the two-photon state of the system to be any of the Bell states shown in Equations (1)-(4) above.

In some embodiments, in operation (e.g., during an attempt to produce a pair of photons in a Bell state), a single-photon is input into each waveguide of the first plurality of waveguides 2302. In some embodiments, the state of the photons upon being input into the first plurality of waveguides 2302 can be written:

$$|\psi_1\rangle = |1111\rangle_{a,b,c,d}$$

where the subscripts a, b, c, d refer to the photon occupation number in waveguides 2302*a*, 2302*b*, 2302*c*, and 2302*d*, respectively.

Device 2100*a* includes a set of couplers 2304 (e.g., couplers 2304*a* and 2304*b*). In some embodiments, the couplers 2304 are beam splitters. For example, a photon incident upon coupler 2304*a*, which couples waveguide 2302*a* and waveguide 2302*d*, has some portion of the amplitude of its wave function in both waveguide 2302*a* and waveguide 2302*d* after being acted on by coupler 2304*a*. In some embodiments, couplers 2304 are 50:50 beam splitters (e.g., have a 50% transmissivity, meaning that a photon incident upon coupler 2304*a* is equally split between waveguide 2302*a* and waveguide 2302*d* after being acted upon by coupler 2304*a*). Note that, in various embodiments, set of couplers 2304 may be positioned at different locations in device 2100*a*. For example, set of couplers 2304 may be positioned on the first set of waveguides downstream of set of couplers 2306 or on the second set of waveguides downstream of set of couplers 2306.

In general throughout this disclosure, couplers represented by two solid circles connected by a vertical line represent 50:50 beam splitters (e.g., coupler 2304*a*), while couplers represented by a diagonal slash connected to a solid circle by a vertical line represent weak beam splitters (e.g., a respective coupler 2306). As used herein the term weak includes couplers having a transmissivity of 0.5, greater than 0.5, 0.6, greater than 0.7, greater than 0.8, or greater than 0.9.

In some embodiments, couplers 2304 couple the respective waveguides to produce a predefined photonic state of the respective photons in the first plurality of waveguides. In some embodiments, the photonic state, after having a single-photon input into each waveguide 2302 and having said photons acted upon by the set of couplers 2304 (e.g., beam splitters) which can be written as follows:

$$|\Psi_2\rangle = \frac{1}{2}(|2020\rangle + |0202\rangle + |2200\rangle + |0022\rangle)$$

In the equation above, the subscripts have been omitted, as it should be understood by now that the states shown above indicate photon occupation numbers in respective waveguides of the first plurality of waveguides 2302.

Device 2100*a* includes a second set of couplers 2306 that weakly couple the first plurality of waveguides 2302 to a second plurality of waveguides 2308. For example, second set of couplers 2306 can be weak beam splitters that have a transmissivity greater than 0.5 (e.g., a photon acted upon a coupler 2306 maintains more than 50% of its wave function the first waveguide and transfers less than 50% of its wave function in the second waveguide). In some embodiments, the transmissivity of the couplers in the second set of couplers is greater than 0.6, greater than 0.7, greater than 0.8, or greater than 0.9.

The second set of couplers 2306 "slice off" some of the amplitude of the wave function of the photons in the first set of waveguides 2302 and move the "sliced off" portion of the wave function to the second set of waveguides 2308, which are coupled with a first set of detectors 2312 (e.g., photon detectors 2312*a* through 2312*d*). Device 2100*a* is successful when two photons are detected in a "detection pattern" that indicates that the remaining photons in the first set of waveguides are either in a Bell state (e.g., any Bell state) or a state that is deterministically convertible to a Bell state. Device 2100*a* is also successful when two photons are detected in a detection pattern that indicates that the remaining photons in the first set of waveguides are in a state that can be probabilistically converted to a Bell state (e.g., through distillation), and that probabilistic conversion is itself successful. In some embodiments, determining that the remaining photons are in a Bell state or a state convertible to a Bell state includes determining that there are two photons remaining in the first set of waveguides. As used herein, a detection pattern refers to which detectors of a set of detectors detected a photon, and optionally how many photons were detected by each detector (e.g., when the detector is capable of resolving a number of photons detected).

In some embodiments, the devices described herein include photon delay components (e.g., photon delay component 2918, FIG. 29) wherever necessary (e.g., to allow for processing time following the detection operations described herein). For example, in some embodiments, device 2100*a* includes photon delay components on each of the first set of waveguides 2302 positioned downstream of couplers 2306.

Device 2100*a* also includes a set of scrambling couplers 2310. In some embodiments, each of the scrambling couplers 2310 is a 50/50 beam splitter. The effect of the scrambling couplers 2310 is that detectors 2312 can determine which pair of waveguides 2302 a photon came from but not which waveguide, which in some circumstances is necessary to generate the entanglement of a Bell pair.

In some embodiments, detectors 2312 are coupled to a digital logic module 2311a (e.g., which may be implemented as field programmable digital logic using, for example, a field programmable gate array (FPGA) or an on-chip hard-wired circuit, such as an application specific integrated circuit (ASIC)). Alternatively, in some embodiments, the detectors 2312 are coupled to an off-chip classical computer (e.g., classical computer system 2103, FIG. 21). In some embodiments, the digital logic module 2311 and/or the classical computer receives information from each detector 2312 indicating whether the detector 2312 detected a photon (and optionally how many). Stated another way, the digital logic module 2311 and/or the classical computer receives the detection pattern for a detection operation from the detectors 2312 (e.g., in the form of analog detection signals). The digital logic module 2311 and/or the classical computer executes logic that configures a switch 2314a to either output the photons, pass the photons to a subsequent Bell pair generation stage of the device 2100a, or pass the state onto a distillation circuit, or pass the state onto a mode swap circuit. In some embodiments, the digital logic module 2311 and/or the classical computer does so by referencing a look-up table (e.g., stored in the memory) to determine whether the detection pattern indicates that the photons remaining in the first set of waveguides 2302 are in a Bell pair state or a state that can be converted to a Bell pair state.

In some embodiments, each set of detectors (e.g., the detectors for each stage of device 2100a) is coupled to a respective digital logic module 2311. For example, set of detectors 2312 is coupled to digital logic module 2311a, set of detectors 2320 is coupled to digital logic module 2311b, and set of detectors 2330 is coupled to digital logic module 2311c. Each digital logic module 2311 performs an analogous set of operations (e.g., determining whether the detection pattern at the respective stage is indicative of a state that should be output). Note, however, that whether a detection pattern heralds an output state (e.g., a Bell pair or a two-photon state convertible to a Bell pair) may depend on the detection pattern or patterns from the previous stages. To that end, in some embodiments, the respective digital logic modules 2311 are coupled with a subsequent digital logic module 2311 to pass information (e.g., previous detection patterns) to the subsequent digital logic module 2311. For example, digital logic module 2311a is coupled with digital logic module 2311b to pass the detection pattern from set of detectors 2312 to digital logic module 2311-b; digital logic module 2311b is coupled with digital logic module 2311c to pass the detection patterns from sets of detectors 2312 and 2320. This way, each digital logic module 2311 has the information needed to determine if a detection pattern on its stage heralds a state that should be output (e.g., a Bell pair state, or a state that should be output to a corrective circuit such as a distillation circuit or mode swap circuit).

Table 1 below provides an example of the logic performed by the digital logic module 2311 and/or the classical computer. In particular, Table 1 below provides examples of possible outcomes over the first two stages of device 2300, as determined by the detection patterns detected at the first two stages. In table 1, a check mark (✓) indicates successful generation of a Bell state, an "X" indicates a failure (i.e., no possibility of generating a Bell state with the remaining photons), and a dash (-) represents that the remaining photons are to be routed to a subsequent stage (i.e., a Bell state has not been produced, but there is a still a possibility of generating a Bell state with a subsequent stage). Further, in Table 1, the detection patterns are written, e.g., 1-0-1-0, which means that one photon is detected by a first detector (e.g., detector 2312a or 2320a, depending on the stage); zero photons are detected by a second detector (e.g., detector 2312b or 2320b, depending on the stage); one photon is detected by a third detector (e.g., detector 2312c or 2320c, depending on the stage); and zero photons are detected by a fourth detector (e.g., detector 2312d or 2320d, depending on the stage). "N/A" is used to signify that the stage is unnecessary, and therefore no detection pattern or outcome is obtained for that stage.

TABLE 1

| First Stage Detection Pattern | Second Stage Detection Pattern | First Stage Outcome | Second Stage Outcome | Overall Outcome |
|---|---|---|---|---|
| 1-0-1-0 | N/A | ✓ | N/A | ✓ |
| 1-0-0-0 | 1-1-1-0 | — | X | X |
| 0-0-0-0 | 1-0-1-0 | — | ✓ | ✓ |
| 0-0-0-0 | 0-0-0-0 | — | — | — |

Note that the last row represents a failure when the device 2300 includes only two stages, but has the possibility of being successful if the device has more than two stages.

As an example with greater detail, when zero photons are detected by the first set of detectors 2312, the process is repeated. In some embodiments, the process is repeated by configuring a switch 2314a to send the photons in the first set of waveguides 2302 to a second stage of the device which includes a third set of couplers 2316 analogous to the set of couplers 2306. The couplers 2316 once again "slice off" some of the wave function of the photons in the first set of waveguides 2302 and move the "sliced off" portion of the wave function to the third set of waveguides 2318, where a set of detectors 2320 (e.g., photon detectors 2320a through 2320d) attempts an analogous detection operation.

When one photon is detected by the set of detectors 2312, the process is also repeated (e.g., by configuring switch 2314a to send the photons in the first set of waveguides 2302 to the third set of couplers 2316). However, when one photon is detected by the set of detectors 2312, the success criteria for the successive stages of the device change. Namely, when one photon is detected by the set of detectors 2312, three photons remain in the first set of waveguides 2302, so detection of a single additional photon (e.g., by the second set of detectors 2320) is necessary to produce a pair of photons in a Bell state. When, in the subsequent attempt, zero photons are detected (e.g., by the second set of detectors 2320), the process is repeated by configuring a switch 2314b to send the photons in the first set of waveguides 2302 to a third stage of the device which includes a fourth set of couplers 2326 analogous to the set of couplers 2306. The couplers 2326 once again "slice off" some of the wave function of the photons in the first set of waveguides 2302 and move the "sliced off" portion of the wave function to a fourth set of waveguides 2328, where a set of detectors 2330 attempts an analogous detection operation.

Note that the various stages of device 2100a may be physically embodied by the same hardware or a single set of hardware. For example, device 2100a may be configured in a loop such that a switch 2314 sends the photons in the set of waveguides 2302 back through a detection stage (comprising a set of weak couplers 2306, a set of waveguides

2308 carrying vacuum modes, a set of scrambling couplers 2310, and a set of detectors 2312) and outputs the photons when the device 2100a is successful.

Returning to the case where one photon is detected by the set of detectors 2312, when, in the subsequent attempt (e.g., a detection operation using detectors 2320), a single photon is detected, the detection pattern is used to determine whether the photons remaining in the first set of waveguides 2302 are in a Bell pair state or a state that can be converted to a Bell pair state. Here, the detection pattern includes information indicating which detector of the set of detectors 2312 detected a photon in the first stage and which detector of the set of detectors 2320 detected a photon in the second stage.

For example, when the photon detected in the second stage is detected in the same waveguide as was a photon in the first stage, the result is that the photons remaining in the first set of waveguides 2302 are in a state that can be "distilled" into a Bell state with a predefined success probability (e.g., a success probability of p=1/3). (Here, same waveguide means corresponding waveguides in different stages, not necessarily the same physical waveguide). In this case, switch 2314b is configured to output the photons in the first set of waveguides 2302 to a distillation circuit.

When the photon detected in the second set of waveguides is detected from the same pair of waveguides, but in the other waveguide, or when the photon is detected in the other pair of waveguides, the attempt is successful, meaning that the photons remaining in the first set of waveguides 2302 are either in a Bell state or a state that can be deterministically converted to a Bell state. The switch 2314b is then configured (e.g., by the classical computer) to output the photons remaining in the first set of waveguides (e.g., either to an output of the Bell pair generator or a correction circuit that deterministically converts the photons to a Bell pair).

When more than 1 photon is detected in the second stage after detecting a single photon in the first stage, or when more than two photons are detected in any stage (including the first stage), the attempt is a failure because there are simply not enough photons (e.g., less than 2) remaining in the first set of waveguides 2302 to construct a Bell pair.

When two photons are detected by the set of detectors 2312 (e.g., in the first/initial stage), the determination of whether the attempt was successful depends on the detection pattern. Namely, when the two photons are detected in different waveguides (e.g., using different detectors), the attempt is successful. On the other hand, when the two photons are detected in the same waveguide, the photons remaining in the first set of waveguides 2302 are in a state that can be "distilled" into a Bell state with a predefined success probability (e.g., a success probability of p=1/3). In this case, switch 2314a is configured to output the photons in the first set of waveguides 2302 to a distillation circuit.

It will be apparent to one of skill in the art that the process described above may be repeated until the device succeeds or fails, or the device runs out of stages, the number of which can be arbitrarily high.

In the limit of an infinite number of stages, with the transmissivity of the beam splitters (e.g., couplers 2306, 2316, etc.) approaching 1 (e.g., extremely weak coupling such that only a small part of the wave function is sliced off for each detection attempt), and assuming a distillation technique with a success probability of 1/3, device 2100a is capable of producing a Bell pair in 2/3 (66.6%) of attempts.

FIG. 23B illustrates a schematic diagram of a device 2100b for obtaining a pair of photons in a Bell state, in accordance with some embodiments. Device 2100b is sometimes referred to as a Bell state generator. Device 2100b is analogous to device 2100a except as described below. Device 2100b includes an initial stage 2303a in which all four waveguides of a first set of waveguides 2302 (e.g., input waveguides) are coupled to vacuum modes and a set of detectors, as was the case for device 2100, discussed above. In some embodiments, the initial stage 2303a is repeated until at least one photon is detected. However, if a single photon is detected, device 2100b routes the remaining photons to a plurality of stages 2303 in which only one respective pair of waveguides 2302 is coupled to vacuum modes and a set of detectors. This "pair-wise" slicing reduces the probability of detecting too many photons, which results in failure (e.g., leaves fewer than 2 photons in the first set of waveguides 2302). In some embodiments, successive stages 2303 of device 2100b (after the initial stage 2303a) alternate between coupling the first pair of the first set of waveguides 2302 (e.g., waveguides 2302a and 2302b) to detectors and coupling the second pair of the first set of waveguides 2302 (e.g., waveguides 2302c and 2302d) to detectors.

Figure 24:
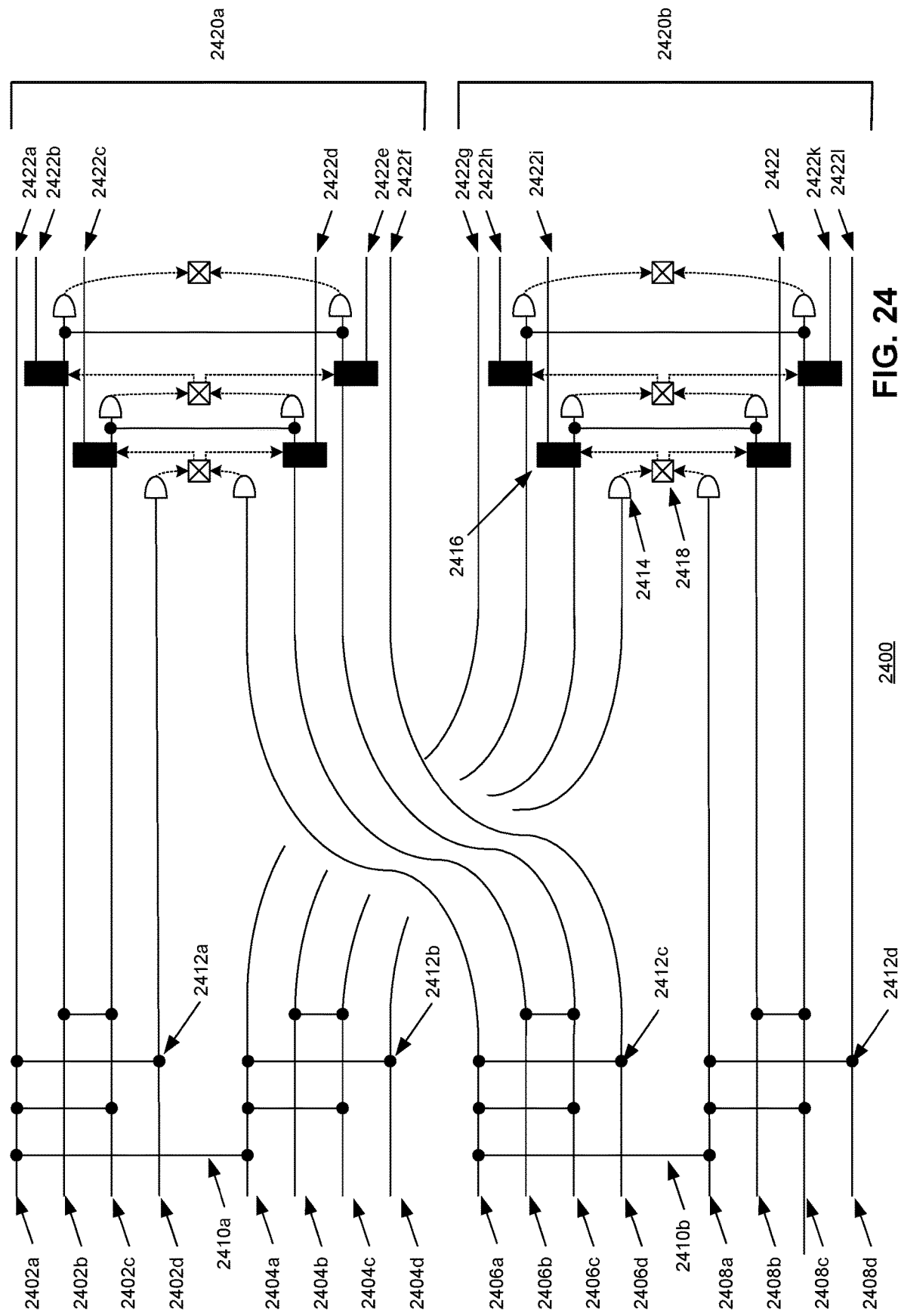
FIG. 24 illustrates a schematic diagram of a portion of a device for obtaining a pair of photons in a Bell state, in accordance with some embodiments.

FIG. 24 illustrates a schematic diagram of a portion 2400 of a device for obtaining a pair of photons in a Bell state, in accordance with some embodiments. (For simplicity, the portion 2400 of the device is referred to as "device 2400" below). Device 2400 is sometimes referred to as a Bell state generator. Device 2400 includes a plurality of sets of waveguides. For example, device 2400 includes a set of waveguides 2402 (including waveguides 2402a through 2402d), a set of waveguides 2404 (including waveguides 2404a through 2404d), a set of waveguides 2406 (including waveguides 2406a through 2406d), and a set of waveguides 2408 (including waveguides 2408a through 2408d). Each set of waveguides of the plurality of sets of waveguides includes a respective input waveguide. For example, the input waveguide for the set of waveguides 2402 is waveguide 2402a; the input waveguide for the set of waveguides 2404 is waveguide 2404a; the input waveguide for the set of waveguides 2406 is waveguide 2406a; and the input waveguide for the set of waveguides 2408 is waveguide 2408a. In operation, a single-photon is concurrently input into each input waveguide of device 2400 (e.g., from a single-photon generator).

In some embodiments, each set of waveguides includes n waveguides, where n is an integer greater than zero. Thus, in some embodiments, each set of waveguides includes at least two waveguides. In the example shown in FIG. 24, device 2400, n=4, so each set of waveguides includes 4 waveguides.

In some embodiments, the input waveguide of each of the plurality of sets of waveguides is coupled to the input waveguide of a different set of waveguides of the plurality of sets of waveguides (e.g., using a respective coupler 2410). For example, input waveguide 2402a is coupled to input waveguide 2404a by coupler 2410a (thus, input waveguide 2404a is also coupled with input waveguide 2402a) and input waveguide 2406a is coupled with input waveguide 2408a by coupler 2410b (thus, input waveguide 2408a is also coupled with input waveguide 2406a). In some embodiments, the couplers 2410 are beam splitters (e.g., 50:50 beam splitters).

Device 2400 includes a set of couplers 2412 for each set of waveguides of the plurality of sets of waveguides. For example, a set of couplers 2412a (e.g., 50:50 beam splitters) couples the respective waveguides of set of waveguides 2402; a set of couplers 2412b (e.g., 50:50 beam splitters) couples the respective waveguides of set of waveguides

2404; a set of couplers 2412c (e.g., 50:50 beam splitters) couples the respective waveguides of set of waveguides 2406; and a set of couplers 2412d (e.g., 50/50 beam splitters) couples the respective waveguide of set of waveguides 2408. In other words, photons in each input waveguide of a respective set of waveguides are spread over n waveguides.

After the waveguides of each set of waveguides are coupled by a respective set of couplers 2412, the photons in device 2400 are passed via the waveguides to a set of staged detectors 2414 and switches 2416. Similar to devices 2100 described above, the device 2400 is successful when two photons are detected, leaving two photons remaining in a Bell state or a state that can be deterministically converted to a Bell state. The arrangement shown in FIG. 24 allows n−1 attempts to detect a total of two photons (e.g., three attempts for device 2400). Thus, the probability of success can be increased by increasing the number of waveguides in each set of waveguides.

In particular, device 2400 attempts to remove one photon from each branch 2420a and 2420-b. Once an attempt is successful (e.g., one photon has been removed from each branch 2420), the remaining photons are output into output waveguides 2422 (e.g., waveguides 2422a through 2422-1) using a respective switch 2416, that is controlled by a logic control 2418. Logic control 2418 may be implemented on a classical computing system, as described above with reference to FIGS. 21-22. Note that, in some embodiments, an output waveguide 2422 may be physically embodied as a continuation of a waveguide 2402 (for example, input waveguide 2402a and output waveguide 2422a may be portions of the same physical waveguide).

Figure 25:
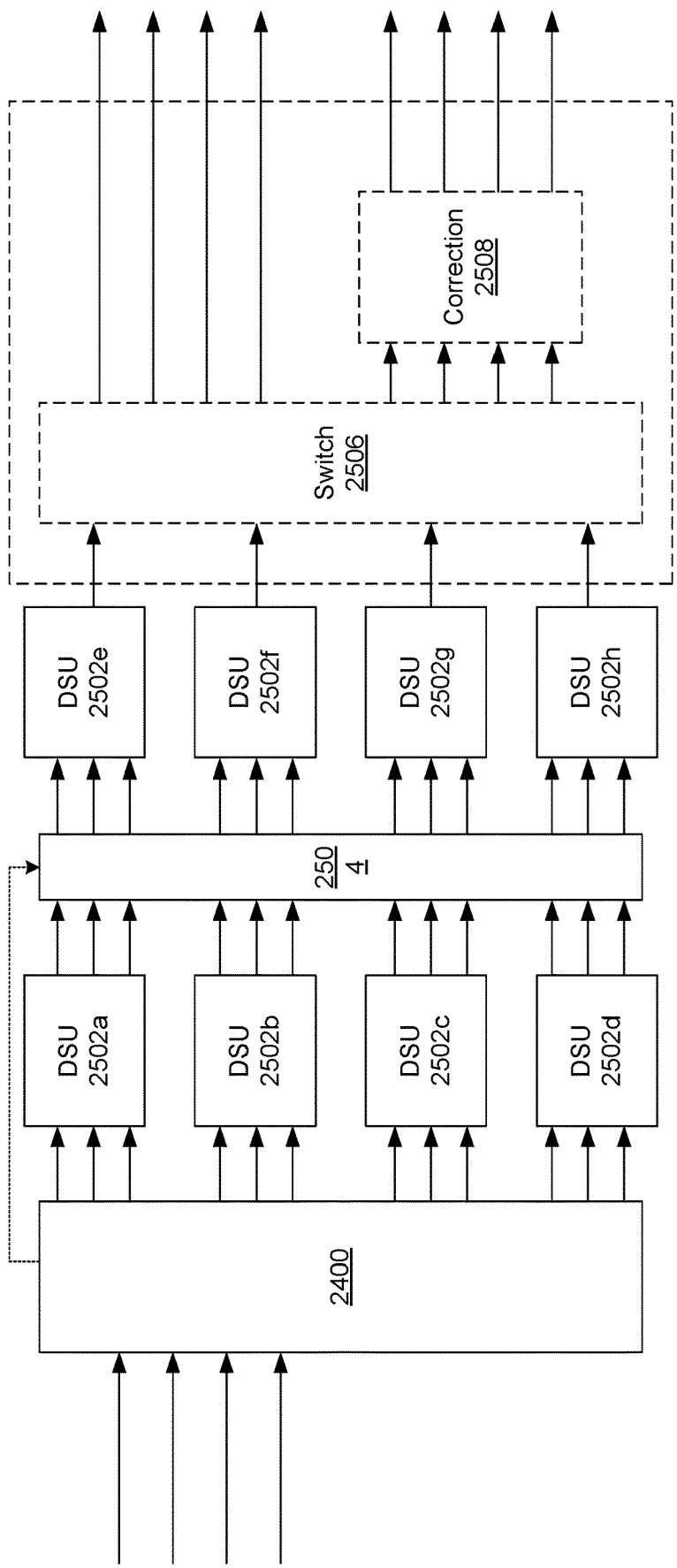
FIG. 25 illustrates a schematic diagram of the device for obtaining a pair of photons in a Bell state, in accordance with some embodiments.

FIG. 25 illustrates a schematic diagram of a device 2500 for obtaining a pair of photons in a Bell state, in accordance with some embodiments. Device 2500 is sometimes referred to as a Bell state generator. Device 2500 includes device 2400 (FIG. 24). As compared with devices 2100, described with reference to FIGS. 21-23, device 2400 (FIG. 24) may produce a photon pair that is spread across 12 modes (e.g., if device 2400 removed two photons in the first detection stage), 8 modes (e.g., if device 2400 removed two photons in the first two detection stages), or four modes (e.g., if device 2400 needed all three detection stages to remove two photons). Note that, when each set of waveguides includes more than 4 modes (n>4, as described with respect to FIG. 24), the photon pair may be spread over a greater number of output modes.

In some circumstances, however, it is desirable for device 2400 to produce a Bell pair, e.g. an entangled photon pair in four modes, and only four modes. To that end, device 2500 includes multiple stages of de-spreading units (DSUs) 2502, including a first stage of DSUs 2502 (that includes DSUs 2502a through 2502d) and a second stage of DSUs 2502 (including DSUs 2502e through 2502h). The DSUs 2502 couple modes within groups of output modes of device 2400. In some embodiments, the DSUs are networks of mode couplers.

In some embodiments, in between subsequent stages of DSUs (e.g. in between DSUs 2502a and 2502e, in between 2502b and 2502f, in between 2502c and 2502g, and in between 2502d and 2502h), device 2500 includes phase shifters 2504. In some embodiments, the values of those phase shifters can be set by device 2400 in accordance with the number of modes the entangled state is spread over. Together with the DSUs, the phase shifters effectively de-spread the entangled state into 4 and only 4 modes.

In addition, device 2500 optionally includes a switch 2506 that routes the outputted pair of photons to a correction circuit 2508 when the outputted pair of photons is not in a Bell pair state, but is in a state that can be converted to a Bell pair state. When the outputted pair of photons is in a Bell pair state, the switch 2506 routes the pair of photons to an output of the device 2500. Depending on the circumstances (e.g., the state of the photon pair) correction circuit 2508 can be a distillation circuit or a circuit that deterministically converts a pair of photons from a first state that is not a Bell state to a Bell state (e.g., by swapping modes), or both.

Figure 26:
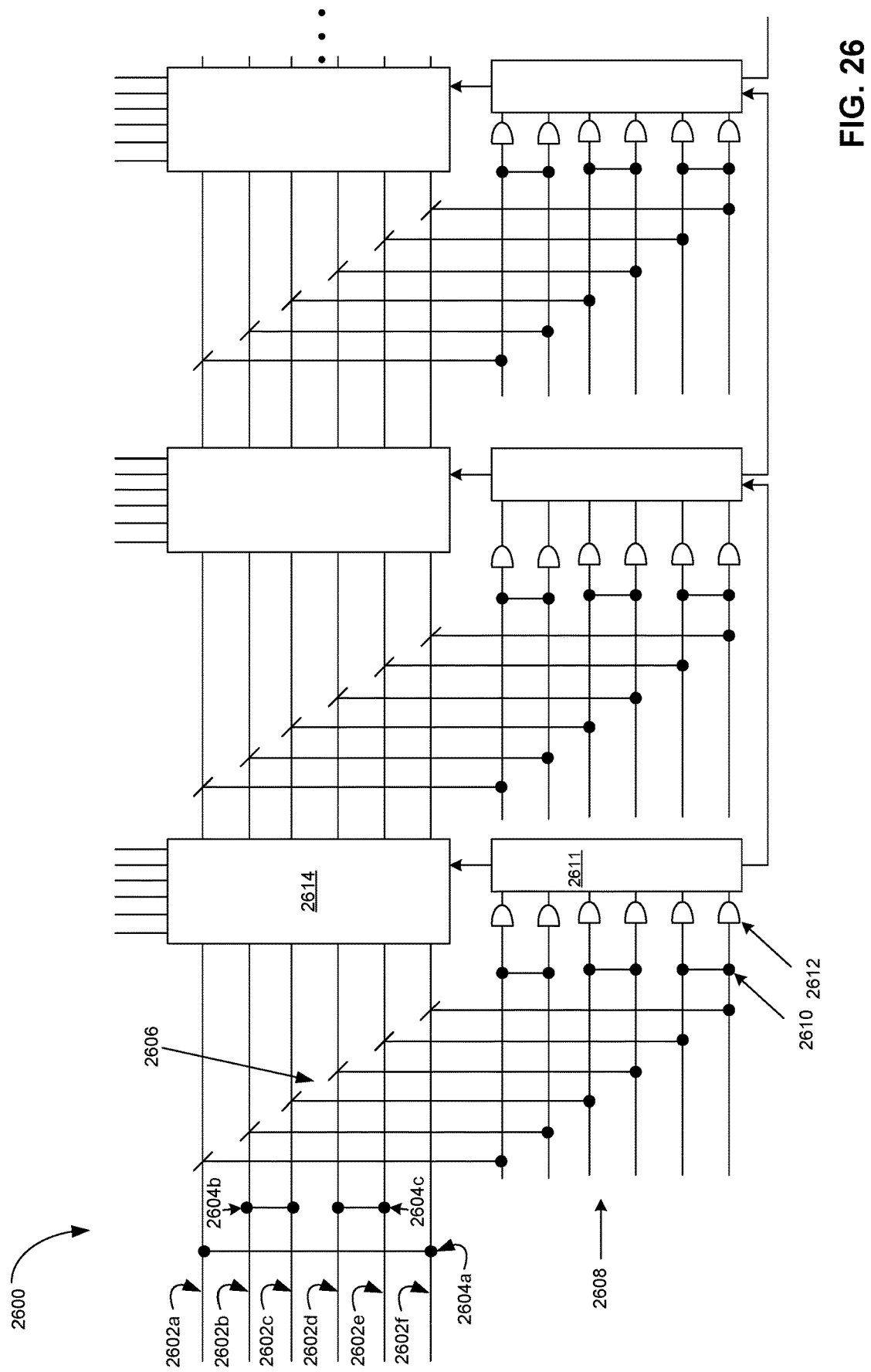
FIG. 26 illustrates a schematic diagram of a device for obtaining a group of photons in a 3-GHZ state, in accordance with some embodiments.

FIG. 26 illustrates a schematic diagram of a device 2600 for obtaining a group of photons in a 3-GHZ state, in accordance with some embodiments. Device 2600 includes a first plurality of waveguides 2602 (e.g., photonic waveguides).

In the example shown in FIG. 26, the first plurality of waveguides 2602 includes six waveguides (e.g., waveguides 2602a through 2602f). In some embodiments, the first plurality of waveguides 2602 include a first pair of waveguides (e.g., waveguide 2602a and waveguide 2602b), a second pair of waveguides (e.g., waveguide 2602c and waveguide 2602d), and a third pair of waveguides (e.g., waveguide 2602e and waveguide 2602f). Each pair of waveguides is capable of encoding a qubit. For example, a single-photon in waveguide 2602a and zero photons in waveguide 2602b may define a logical "0" for a first qubit, while a single-photon in waveguide 2602c and zero photons in waveguide 2602d may define a logical "0" for a second qubit. Thus, three photons in the first plurality of waveguides 2602 may be in a 3-GHZ state.

In some embodiments, in operation (e.g., during an attempt to produce three photons in a 3-GHZ state), a single-photon is input concurrently into each waveguide of the first plurality of waveguides 2602. In some embodiments, the state of the photons upon being input into the first plurality of waveguides 2602 can be written:

$$|\psi_1\rangle = |111111\rangle_{a,b,c,d,e,f}$$

where the subscripts a, b, c, d, e, f refer to the photon occupation number in waveguides 2602a, 2602b, 2602c, 2602d, 2602e, and 2602f, respectively.

Device 2600 includes a set of couplers 2604 (e.g., couplers 2604a through 2604c). In some embodiments, the couplers 2604 are beam splitters. For example, a photon incident upon coupler 2604a, which couples waveguide 2602a and waveguide 2602f, has some portion of the amplitude of its wave function in both waveguide 2602a and waveguide 2602f after being acted on by coupler 2604a. In some embodiments, couplers 2604 are 50:50 beam splitters (e.g., have a 50% transmissivity, meaning that a photon incident upon coupler 2604a is equally split between waveguide 2602a and waveguide 2604f after being acted upon by coupler 2604a). In some embodiments, couplers 2604 couple the respective modes of the first plurality of waveguides to produce a predefined photonic state of the respective photons in the first plurality of waveguides. In some embodiments, the photonic state, after having a single-photon input into each waveguide 2602 and having said photons acted upon by the set of couplers 2604 (e.g., beam splitters), can be written as follows:

$$|\Psi_2\rangle = \frac{1}{2\sqrt{2}}(|202020\rangle + |020022\rangle + |220020\rangle + |002022\rangle +$$
$$|202200\rangle + |020202\rangle + |220200\rangle + |002202\rangle)$$

In the equation above, the subscripts have been omitted, as it should be understood by now that the states shown above indicate photon occupation numbers in respective waveguides of the first plurality of waveguides 2602.

Device 2600 includes a second set of couplers 2606 that weakly couple the first plurality of waveguides 2602 to a second plurality of waveguides 2608. For example, the transmissivity of the couplers in the second set of couplers is greater than 0.5 (e.g., a photon acted upon a coupler 2606 maintains more than 50% of its wave function the first waveguide and transfers less than 50% of its wave function in the second waveguide). In some embodiments, the transmissivity of the couplers in the second set of couplers is greater than 0.6, greater than 0.7, greater than 0.8, or greater than 0.9.

In some embodiments, the second plurality of waveguides initially carry only vacuum modes (e.g., have no photons in them). In some embodiments, each waveguide of the first plurality of waveguides 2602 is coupled to a respective waveguide of the second plurality of waveguides 2608 by a respective coupler of the second set of couplers 2606. In some embodiments, the second set of couplers are beam splitters.

The second set of couplers 2606 "slice off" some of the amplitude of the wave function of the photons in the first set of waveguides 2602 and move the "sliced off" portion of the wave function to the second set of waveguides 2608, which are coupled with a first set of detectors 2612. Device 2600 is successful when three photons are detected in a "detection pattern" that indicates that the remaining photons in the first set of waveguides are either in a 3-GHZ state or a state that is deterministically convertible to a 3-GHZ state. Device 2600 is also successful when three photons are detected in a detection pattern that indicates that the remaining photons in the first set of waveguides are in a state that can be probabilistically converted to a 3-GHZ state (e.g., through distillation), and that probabilistic conversion is itself successful.

To determine whether the detection pattern indicates that the remaining photons in the first set of waveguides are either in a 3-GHZ state or a state that is convertible to a 3-GHZ state, in some embodiments, device 2600 includes digital logic units 2611 (analogous to digital logic units 2311, discussed with reference to FIG. 23A).

In some embodiments, determining that the remaining photons are in the 3-GHZ state or a state that is deterministically convertible to the 3-GHZ state includes determining that there are three photons remaining in the first set of waveguides (e.g., by inferring the number of photons remaining based on the number of photons that have been measured).

Device 2600 also includes a set of scrambling couplers 2610. The effect of the scrambling couplers 2610 is that detectors 2612 can determine which pair of waveguides 2602 a photon came from but not which waveguide, which in some circumstances is necessary to generate the entanglement of the GHZ state.

In some embodiments, the detectors 2612 are coupled to a classical computer (not shown) with one or more processors (e.g., CPUs) and memory. In some embodiments, the classical computer receives information from each detector 2612 indicating whether the detector 2612 detected a photon (and optionally how many). Stated another way, the classical computer receives the detection pattern for a detection operation from the detectors 2612. The classical computer executes logic (e.g., stored as a program in the memory) that configures a switch 2614 to either output the photons or pass the photons to a subsequent GHZ-state generation stage of the device 2600. In some embodiments, the classical computer does so by referencing a look-up table (e.g., stored in the memory) to determine whether the detection pattern indicates that the photons remaining in the first set of waveguides 2602 are in a GHZ state or a state that can be converted to a GHZ state. In some embodiments, when a total of more than three of the input photons have not been detected, the switch 2614 passes the photons to a subsequent GHZ-state generation stage of the device 2600.

Figure 27:
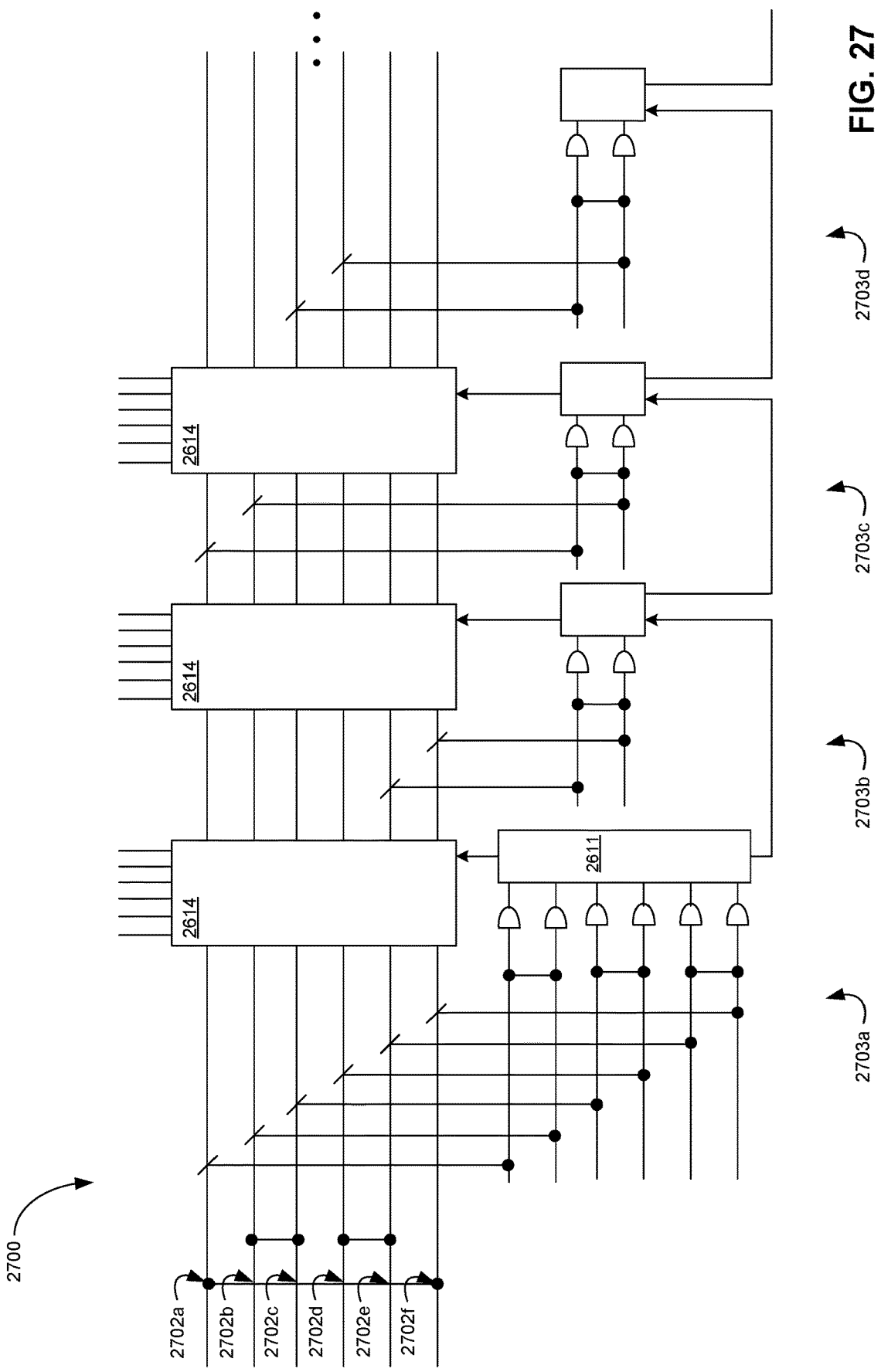
FIG. 27 illustrates a schematic diagram of a device for obtaining a group of photons in a 3-GHZ state, in accordance with some embodiments.

FIG. 27 illustrates a schematic diagram of a device 2700 for obtaining a group of photons in a 3-GHZ state, in accordance with some embodiments. Device 2700 is analogous to device 2600 except as described below. Device 2700 includes an initial stage 2703a in which all six waveguides of a first set of a waveguides 2702 (e.g., input waveguides) are coupled to vacuum modes and a set of detectors, as was the case for device 2600, discussed above. In some embodiments, the initial stage is repeated until at least one photon is detected in the set of detectors. In some embodiments, the initial stage is repeated until a single photon is detected in the set of detectors. After the initial stage, the remaining photons are routed to a plurality of stages 2703 in which only one respective pair of waveguides 2702 is coupled to vacuum modes and a set of detectors. This "pair-wise" slicing reduces the probability of detecting too many photons, which results in failure (e.g., leaves fewer than 3 photons in the first set of waveguides 2702). In some embodiments, successive stages 2703 of device 2700 (after the initial stage 2703a) alternate between coupling the first pair of the first set of waveguides 2702 (e.g., waveguides 2702a and 2702b) to detectors; coupling the second pair of the first set of waveguides 2702 (e.g., waveguides 2702c and 2702d) to detectors; and coupling the third pair of the first set of waveguides 2702 (e.g., waveguides 2702e and 2702f) to detectors.

It should be understood that the embodiments illustrated in FIGS. 26-27 may be extended to an m-GHZ state by, for example, a suitable addition of waveguides and couplings between the waveguides. For example, device 2600/2700 can be extended to generate 4-, 5-, or 6-GHZ states, or GHZ states with larger numbers of photons. In such embodiments, the device continues to slice off portions of the input wave function until, for example, m photons remain in the remaining input waveguides.

Figure 28:
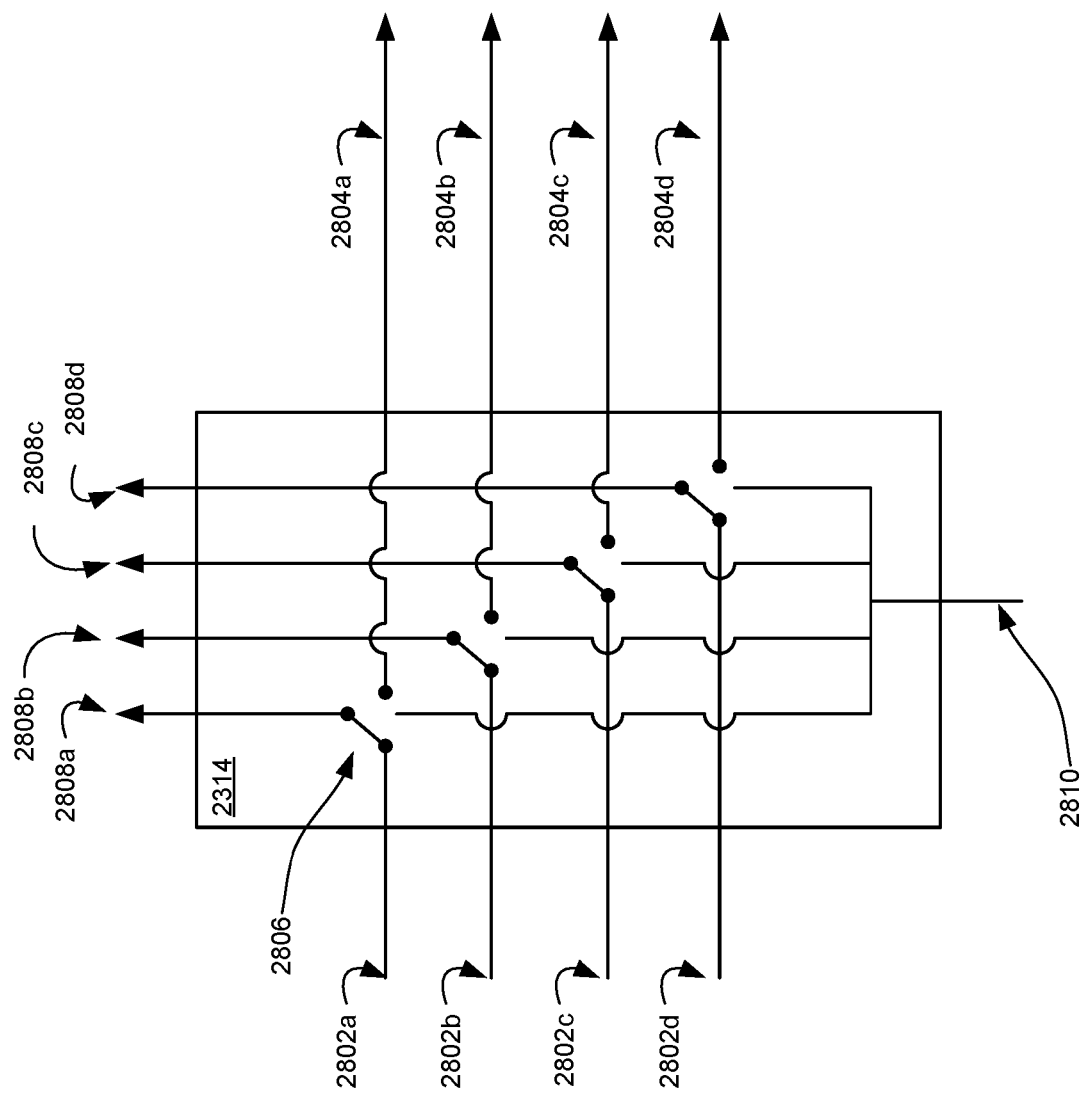
FIG. 28 illustrates a schematic diagram of a switch, in accordance with some embodiments.

FIG. 28 illustrates schematic diagrams of a switch 2314 (e.g., FIGS. 23A-23B), in accordance with some embodiments. Switch 2314 couples input waveguides 2802 (e.g., input waveguides 2802a through 2802d) either to a first set of output waveguides 2804 (e.g., output waveguides 2804a through output waveguides 2804d) or to a second set of output waveguides 2808 (e.g., output waveguides 2808a through output waveguides 2808d). To do so, switch 2314 includes a plurality of optical switches 2806 (only one of which is labeled, for visual clarity), each of which is controlled by the same control signal 2810. In some embodiments, optical switches 2806 can be directional couplers or Mach-Zehnder interferometers, as shown above in reference to FIGS. 15A-15C or any other type of optical switch architecture without departing from the scope of the present disclosure. For example, a Mach-Zehnder type interferometer can be used as a switch where the transmissivity to the output ports can be can be toggled between either 0 or 1 depending on a configurable phase (e.g., provided by control signal 2810).

One of ordinary skill having the benefit of this disclosure will appreciate that the particular type of detector employed in the systems disclosed herein is not critical and can be chosen to be any type of number resolving photon detector, e.g., superconducting nanowire photon detectors (SNSPD), transition edge sensors (TES), a charge integration photon detector (CIPD), single photon avalanche diodes (SPAD), avalanche photodiode (APD), and the like.

Figure 29:
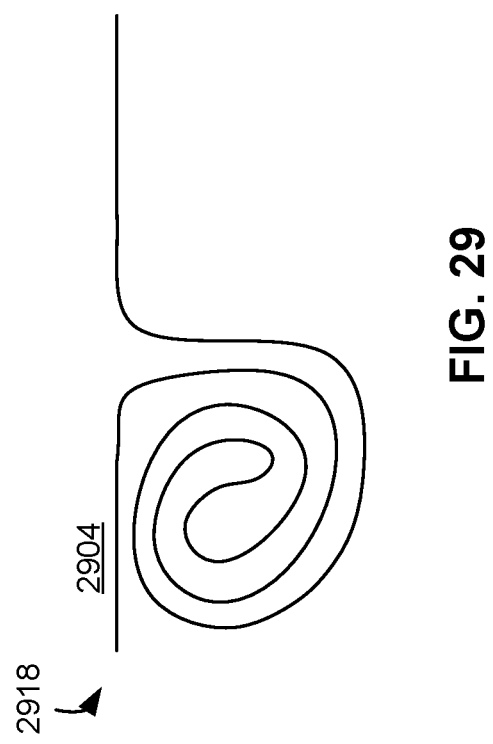
FIG. 29 is a schematic diagram illustrating a photon-delay component, in accordance with some embodiments.

FIG. 29 is a schematic diagram illustrating a photon-delay component 2918 in accordance with some embodiments. A photons delayed by delay component 2918, which includes a geometric lengthening of a waveguide 2904 carrying the photon (e.g., the waveguide forms a spiral that spirals in and then out).

Distillation

In some cases, during the generation of Bell states described above, states are produced that are not maximally entangled because the amplitudes of their terms are not uniform. For example, as described above with reference to FIGS. 21-22, when two photons are detected in the same waveguide of an initial detection operation stage, the photons remaining in the output modes are not in a Bell state but are in a state that can be probabilistically converted to a Bell state through a process of distillation (also called probabilistic entanglement distillation). To obtain a maximally-entangled state, distillation involves damping (i.e., reducing) the amplitude of some modes in an interferometer.

Consider the general state of two photons in n modes:

$$|\Psi\rangle = \sum_{i,j=1}^{n} a_{ij} a_i^\dagger a_j^\dagger |0\rangle = (a^\dagger)^T \cdot A \cdot a^\dagger |0\rangle$$

wherein a† is a vector of creation operators associated with each mode and $$A = \begin{pmatrix} a_{11} & a_{12} & \cdots \\ a_{21} & a_{22} & \cdots \\ \vdots & \vdots & \ddots \end{pmatrix}$$

with $a_{ij}=a_{ji}$ by symmetry. Using the Takagi factorization for symmetric matrices, A can be written as $A=U^T \cdot \Sigma \cdot U$, where $\Sigma=\text{diag}\{\sigma_1, \sigma_2, \ldots, \sigma_n\}$ is the diagonal matrix of singular values of A and U ordered such that $\sigma_1 \geq \sigma_2 \geq \ldots \geq \sigma_n$. The fact that U is unitary means that it can be implemented as a linear optical circuit, allowing diagonalization of the matrix A of any state of 2 photons in n modes.

A Bell state has:

$$\sigma_1 = \sigma_2 = \sigma_3 = \sigma_4 \neq 0$$

and $\sigma_i=0$ for $i>4$ (i.e., it is a rank 4 state). Any state of two photons $|\psi\rangle$ can be probabilistically converted into a Bell state as long as its associated matrix A is of rank of at least 4.

The procedure to obtain a Bell state from $|\psi\rangle$ then comprises (1) applying U to A to diagonalize it, evolving the state into $$|\Psi\rangle = \sum_{i=1}^{4} \sigma_i (a_i^\dagger)^2 |0\rangle$$

and (2) damping the modes corresponding to the singular values until $$\sigma_1' = \sigma_2' = \sigma_3' = \sigma_4' = \sigma_4, \text{ and } \sigma_i' = 0 \text{ for } i>4$$

The state obtained in this way is in diagonal form $$|\Psi'\rangle = \sum_{i=1}^{4} \sigma_i'(a_i^\dagger)^2 |0\rangle$$

$$= \sigma_4 \sum_{i=1}^{4} (a_i^\dagger)^2 \bigg| 0 \bigg\rangle$$

$$= \sqrt{2}\,\sigma_4(|2000\rangle + |0200\rangle + |0020\rangle + |0002\rangle)$$

which can be deterministically converted into a Bell pair in standard form using 50:50 beam splitters and, in some circumstances, phase shifters (e.g., depending on the relative phases between the terms).

The probability of success using the distillation technique described above is $p_s = \langle \Psi'|\Psi'\rangle = 8\sigma_4^2$.

In some embodiments, in order to damp a singular value, the mode corresponding to the value to be reduced is coupled to an ancillary vacuum mode through a beam splitter with appropriate reflectivity. Then a detector is applied to this ancillary mode. If the ancillary mode is found to be empty (e.g., no photon is detected), then the procedure has succeeded and the desired singular value is obtained.

Consider, as an example, a state that is sometimes produced by the devices described above with reference to FIGS. 21-25:

$$|\Psi\rangle = \alpha|2000\rangle + \beta(|0200\rangle + |0020\rangle + |0002\rangle)$$

$$= \left[\alpha \frac{(a_1^\dagger)^2}{\sqrt{2}} + \beta\left(\frac{(a_2^\dagger)^2}{\sqrt{2}} + \frac{(a_3^\dagger)^2}{\sqrt{2}} + \frac{(a_4^\dagger)^2}{\sqrt{2}}\right)\right]|0\rangle$$

In this particular case $\alpha=3\beta$. The state is also normalized so that $|\alpha|^2+|\beta|^2=1$.

This state is already in diagonal form, so the first step of the distillation procedure does not have to be applied in this case. The singular values $\sigma_i$ of this state can be read directly from the amplitude of the terms:

$$\sigma_1 = \frac{3\beta}{\sqrt{2}} \text{ and } \sigma_2 = \sigma_3 = \sigma_4 = \frac{\beta}{\sqrt{2}}.$$

The singular value associated with the first term is the one that has to be damped. This is done by coupling the first mode with an ancillary vacuum mode through a beam splitter with transmissivity $$t = \frac{1}{\sqrt{3}}$$

and applying a detector to this ancilla mode. The probability of success for distilling a Bell state in this case is 33%.

X. A PERCOLATED CLUSTER STATE FROM BELL PAIRS

Figure 30:
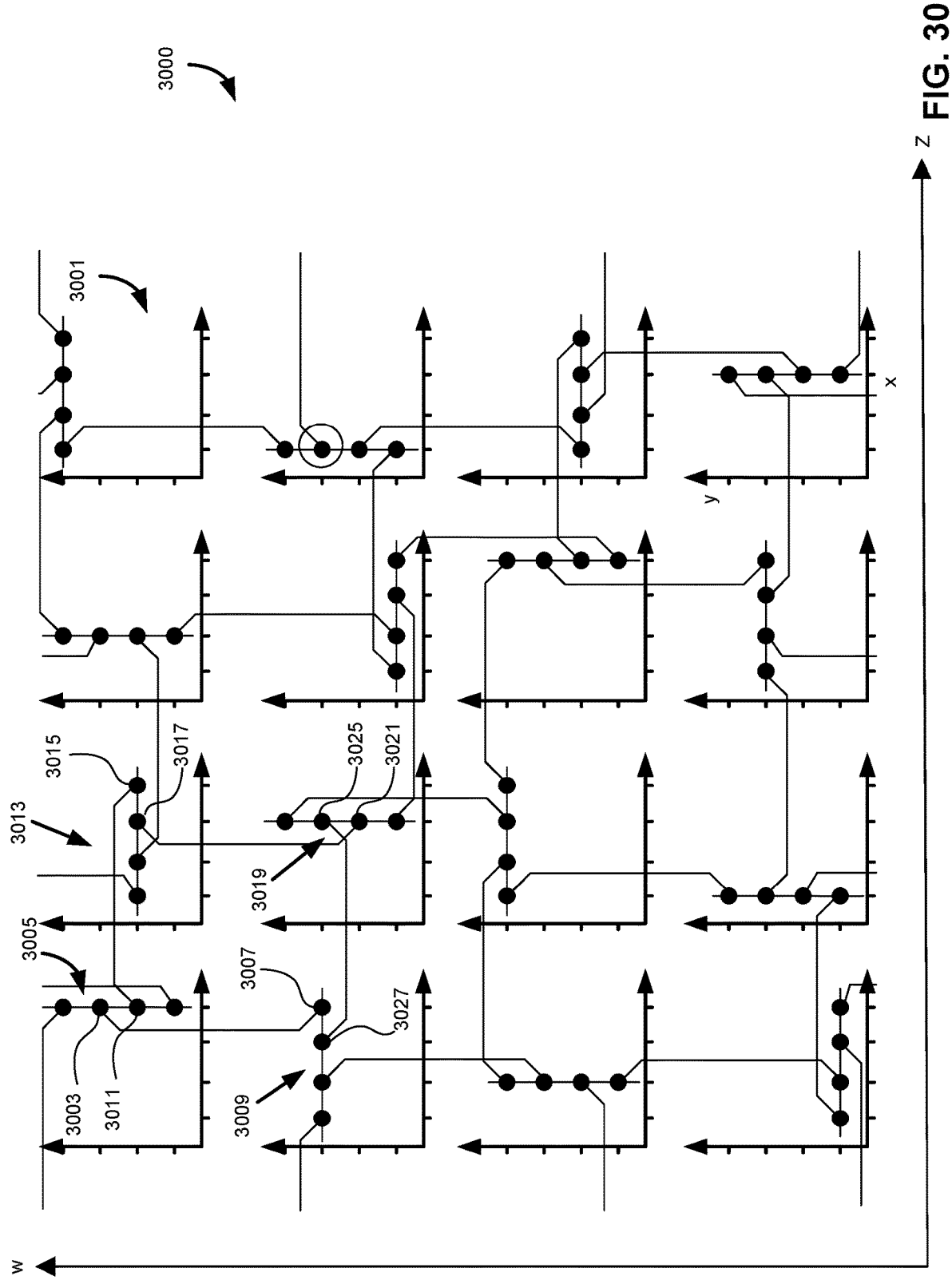
FIG. 30 is a schematic diagram of a cluster state, in accordance with some embodiments.

FIG. 30 is a diagram showing the unit cell of a cluster state 3000 in accordance with some embodiments. Most generally, a cluster state of highly entangled qubits can be described by an undirected graph G=(V, E) with V and E denoting the sets of vertices and edges, respectively. Each vertex of the graph corresponds to a physical qubit in the cluster state. The physical qubits are initialized in the $|+\rangle$ state, where $|+\rangle = (|0\rangle + |1\rangle)/\sqrt{2}$. On each edge of the graph, a controlled-phase gate CZ is applied to the qubits that terminate that edge. Accordingly, any cluster state, which physically corresponds to a large entangled state of physical qubits can be described as $$|\Psi\rangle_{graph} = \prod_{(i,j)\in E} CZ_{i,j} |+\rangle^{\otimes |V|}$$

where the $CZ_{i,j}$ is the controlled phase gate operator. Thus, any cluster state can be graphically represented by a graph that includes vertices that represent physical qubits and edges that represent entanglement between them.

More specifically the cluster state 3000 is a 4-dimensional generalization of the (10,3)b lattice. In FIG. 30, the four dimensional space is represented using several (x,y) subspaces, e.g., subspace 3001, that are themselves distributed within a two dimensional (z,w) subspace. In each x-y plane (subspace), the cluster state includes a linear chain of entangled qubits that extends in the plane, e.g., along the x direction, along the y-direction etc. While the linear chains shown in FIG. 30 only show 4 qubits, the number of qubits in each individual chain can be increased depending on the desired size of the cluster state (which can depend on many factors, e.g., the tolerance to errors of the quantum algorithm being run). In the cluster state 3000, qubits from each linear chain are entangled by way of edges that can extend in the z-dimension and/or w-dimension, as shown, and this each qubit is three valent, i.e., each qubit is a degree three vertex of the corresponding graph. For example, qubit 3003 that is part of linear cluster 3005 is entangled with qubit 3007 of linear cluster 3009, by way of an edge that extends in the (w,z) plane. Likewise, qubit 3011 that is part of linear cluster 3005 is entangled with qubit 3015 of linear cluster 3013, by way of an edge that extends along a direction in the (w,z) plane; qubit 3017 that is part of linear cluster 3013 is entangled with qubit 3021 of linear cluster 3019, by way of an edge that extends along a direction in the (w,z) plane; and qubit 3025 that is part of linear cluster 3019 is entangled with qubit 3027 of linear cluster 3009, also by way of an edge that extends along a direction in the (w,z) plane. Accordingly, each qubit of the cluster state 3000 are entangled such that there are many loop-like paths through the cluster exist, thereby increasing the probability that the lattice will percolate given some non-zero probability that is will have missing vertices. Again, as with the x-y subspaces, the extent of the cluster in both the w and z dimensions can vary depending on the desired size of the cluster state.

Advantageously, the particular cluster state 3000 shown in FIG. 30 is a cluster state that can be generated from a collection of Bell pairs (graphically a Bell pair is an entangled state of two qubits that can be represented by two vertices joined by a single edge) using probabilistic fusion gates without the need for multiplexing. Furthermore, as described in more detail below, when Boosted Type I Fusion gates are used as the probabilistic entangling gates, the cluster state is percolated, i.e., the number of missing vertices (qubits) is low enough that it can be used as a resource for universal quantum computation. In some embodiments, the devices and methods described herein, e.g., qubit entangling system 203 of hybrid QC system 201, can generate a cluster state having the unit cell shown in FIG. 30 and, using Boosted Type I fusion gates within the qubit entangling system 203, the probability for successfully generating any given site can be higher than the site percolation threshold of the cluster state 3000.

Figure 31:
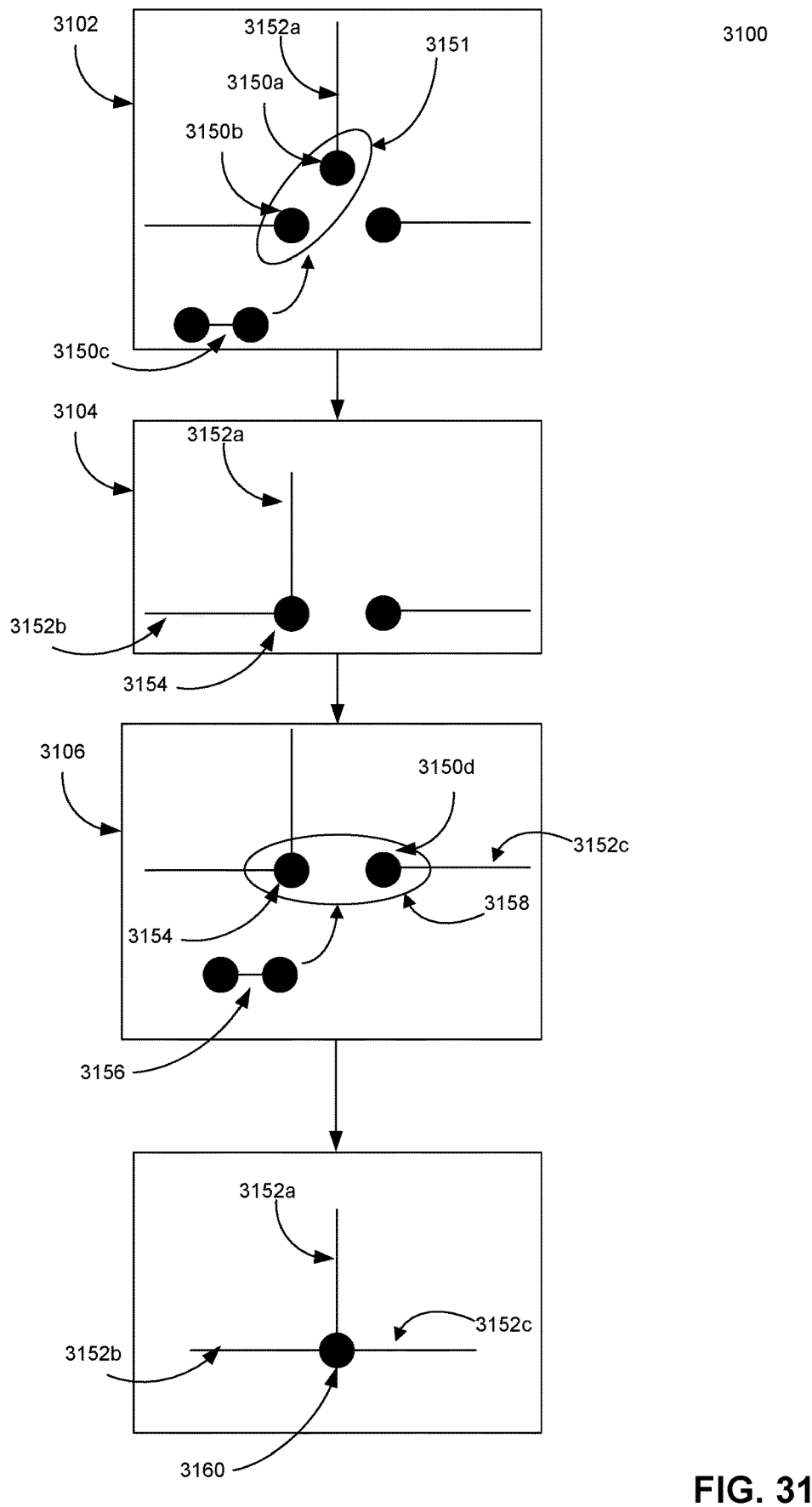
FIG. 31 is a flow chart illustrating a process for generating a respective node of the cluster state of FIG. 30, in accordance with some embodiments.

FIG. 31 is a flow chart illustrating a process 3100 for generating a respective node 3108 of the graph structure 3000 of FIG. 30 using Bell pairs as resources, in accordance with some embodiments. FIG. 31 is an example that employs two Boosted Type-I Fusion gates, described in further detail below in reference to FIGS. 7-9 to generate a qubit that can be represented as a graph with a single vertex and three edges. The method shown in FIG. 31 can be used to generate a single vertex 3108 of the cluster state 3000 shown in FIG. 30, and thus the entire cluster state can be generated by conducting many of these two-step fusion methods in parallel (simultaneously, sequentially, or in any order). If Boosted Type-I fusion is employed, the two fusion operations result in successfully generating a vertex of the graph with a probability of $(3/4)^2$. However, one of skill in the art will recognize other probabilistic entangling gates that may be used in an analogous fashion without departing from the scope of the present disclosure.

Process 3100 includes fusion operation 3102. In fusion operation 3102, a first qubit 3150a, second qubit 3150b, and an ancilla Bell pair 3150c are provided to the input of a Boosted Type-I Fusion gate 3151. In some embodiments, first qubit 3150a is a respective qubit of a first Bell pair and the second qubit 3150b is a respective qubit of a second Bell pair that is different from the first Bell pair. If successful, the result of the fusion operation 3102 is to generate a fused qubit 3154 that inherits the entangling bonds (edges 3152a and 3152b) from both the first qubit 3150a and the second qubit 3150b, i.e., the fused qubit 3154 is entangled with all other qubits that the first and second qubits 3150a and 3150b were entangled with before the fusion operation. As described below with reference to FIG. 34-36, the use of the ancilla Bell pair 3150c boosts the success probability of fusion operation 3102 as compared to a fusion operation that does not use any ancilla qubits (referred to herein as un-boosted fusion). In some embodiments, the success probability of fusion operation 3102, using one ancilla Bell pair 3150c, is 0.75 (e.g., fusion operation 3102 is successful on 75% of fusion attempts). The result of a successful fusion operation 3102 is shown in pane 3104. In some embodiments, fusion operation 3102 is a pairwise fusion operation (e.g., it fuses two existing clusters of qubits by acting on a pair of qubits that respectively belong to each unfused cluster).

Process 3100 further includes second fusion operation 3106. In second fusion operation 3106, a third qubit 3150d, fused qubit 3154, and another ancilla Bell pair 3156 are provided to a second Boosted Type-I Fusion gate 3158. Prior to fusion operation 3106, the third qubit 3150d is entangled, via entanglement 3152c (e.g., pairwise entanglement), with a third quantum system (not shown). In some embodiments, third qubit 3150d is a respective qubit of a third Bell pair, different from the first and second Bell pairs, and the third quantum system comprises the other qubit of the third Bell pair (not shown).

As before, if fusion operation 3106 is successful it leaves behind a fused qubit 3160 that inherits all of the entangling bonds that the third qubit 3150d and the fused qubit 3154 possessed before the fusion (e.g., edges 3152a, 3152b, and 3152c).

Thus, process 3100 uses two Boosted Type-I Fusion gates 3151 and 3158 to attempt to generate each qubit located at the vertex (having degree 3) of the graph 3000. Each boosted type-I fusion operation has a success probability of 0.75. Thus, in this example, the success probability of generating a respective qubit in the cluster state 3000 is $p=(0.75)^2=0.5625$, which is higher than the site percolation threshold of the graph structure 3000 shown in FIG. 30. (Graph structure 3000 has a site percolation threshold between 0.54 and 0.55 as computed using numerical techniques that employ a Newman Ziff algorithm). Thus, advantageously the cluster state shown here can be generated directly from Bell pairs using two Boosted Type 1 Fusion gates for each vertex. Using higher dimensional versions of graph structure 3000, the site percolation threshold can be made to approach 0.5. Thus, in some embodiments, the gap between the site percolation threshold and the site success probability can be made to approach 6.25%.

Figure 32:
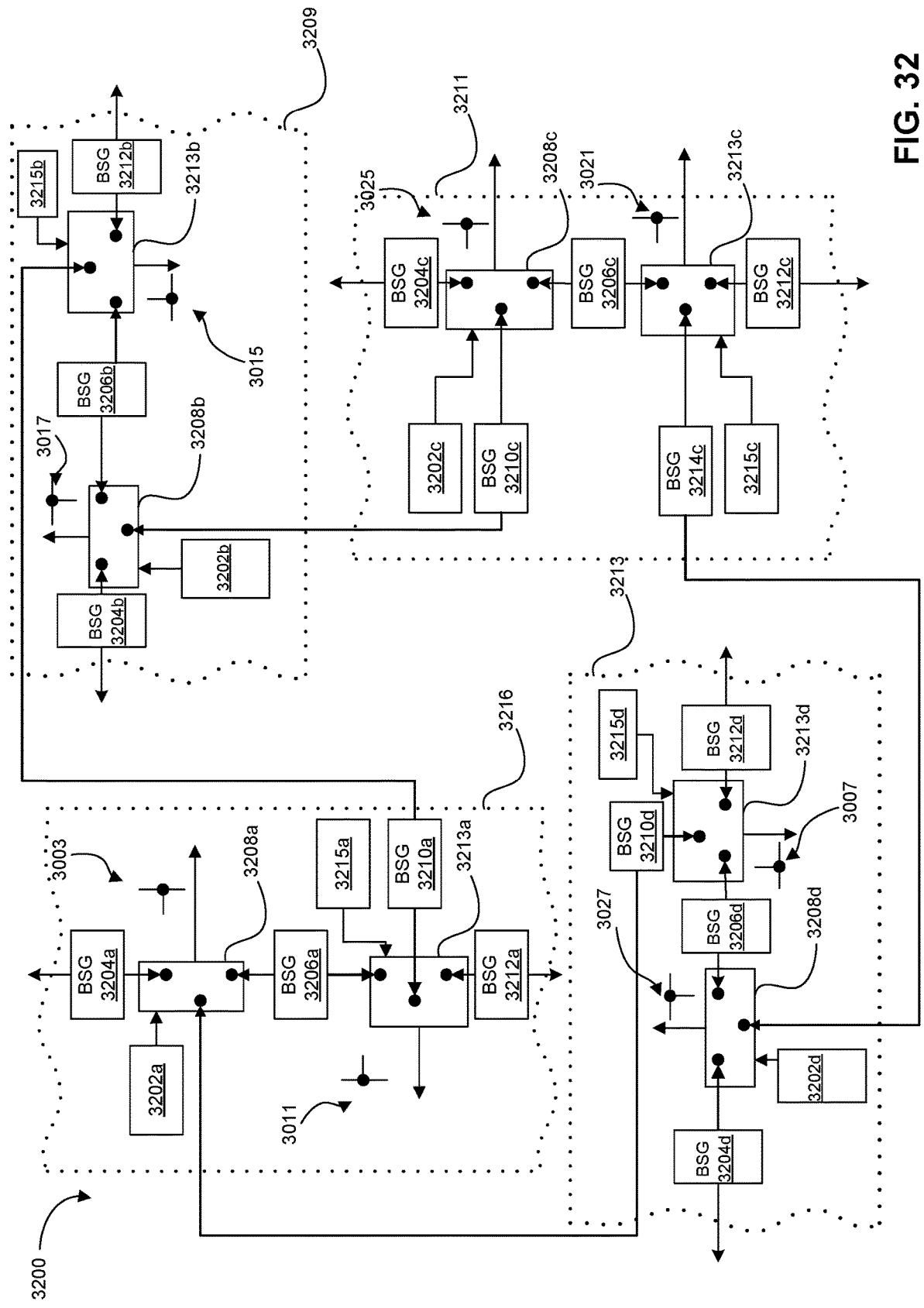
FIG. 32 is a schematic diagram illustrating a device for generating a cluster state, in accordance with some embodiments.

FIG. 32 illustrates a device 3200 for generating a cluster state, in accordance with some embodiments. In some embodiments, the device can be implemented on an integrated photonics chip, in which case the lines shown may be one or more photonic waveguides. In such an implementation, the qubit sources can be photon sources of various levels of entanglement, e.g., photonic Bells state generators. Such sources can include integrated optical components such as waveguides, beam splitters, photon detectors, phase shifters, and photonic switches in any appropriate combination to produce the entangled quantum systems that will be fused to generate the larger cluster. Likewise, the fusion gates can include integrated optical circuits components such as waveguides, beam splitters, photon detectors, phase shifters, photonic switches, and the like. One of ordinary skill will appreciate that the diagram shown in FIG. 32 can also be interpreted as a generalized schematic diagram that is not strictly limited to a photonic implementation but rather can employ any other qubit architecture without departing from the scope of the present disclosure.

Device 3200 includes a plurality of boosted fusion generators (e.g., fusion generator 3208a through 3208d and 3213a through 3213d). In some embodiments, device 3200 includes one boosted fusion generator for each node of the graph structure 3000 shown in FIG. 30. For example, FIG. 32 shows a subset of boosted fusion generators 3208a, 3213a, 3208b, 3213b, 3208c, 3213c, and 3208d, 3213d, that generate the entangled qubits 3003, 3011, 3015, 3017, 3025, 3021, 3027, and 3007, respectively. To aid the eye, the components shown in FIG. 32 are arranged into sub-circuits 3209, 3211, 3213, and 3216, with each sub-circuit surrounded by a dotted line (curved dotted lines indicate that the sub-circuit can have additional components (not shown) that extend further along the length of the sub-circuit, e.g., to generate linear clusters that are much longer than the two qubits shown here). In some embodiments, the sub-circuits can all be part of a chip and can share the same substrate, or they can be formed from different chips on different substrates and networked together by way of optical interconnects. In the simplified diagram shown in FIG. 32, only a small section of the sub-circuits is shown in order to avoid over complicating the description. However, one of ordinary skill will appreciate that the size of the circuit shown in FIG. 32 will map directly to the size of the cluster state shown in FIG. 30.

The device 3200 for generating the cluster state will now be described by referring to sub-circuit 3216 of FIG. 32 that shows the components necessary to generate qubits 3003 and 3011 of the cluster 3000 shown in FIG. 30. For each qubit, the sub-circuit includes an ancilla qubit source 3202 (e.g., qubit source 3202a-3202d), a three way Boosted Type I Fusion gate 3208 (e.g., gates 3208a-3208d), Bell state generator 3204 (e.g., Bell state generator 3204a-3204d), Bell state generator 3206 (e.g., Bell state generator 3206a-3206d), Bell state generators 3210 (e.g., Bell state generator 3210a-3210d), and Bell state generator 3212 (e.g., Bell state generator 3212a-3212d). As already described in reference to FIG. 31, the three way Boosted Type I Fusion gate 3208a receives as input one qubit from two different Bell pairs, one generated by Bell state generator 3204a and one generated by Bell state generator 3206a. In addition, three way Boosted Type I Fusion gate 3208a also receives ancilla qubits from ancilla qubit source 3202a. In some examples, the ancilla qubit source 3202a generates two Bell pairs to be used as ancillae for a Boosted Type I fusion operation at three way Boosted Type I Fusion gate 3208a. If the fusion operation is successful, the three way Boosted Type I Fusion gate 3208a will output a degree-three fused qubit, in this case corresponding to qubit 3003 of the cluster state. Note that, in some embodiments, Bell state generators 3204, 3210, and 3212 are not considered part of their respective sub-circuits. Stated another way, in some embodiments, sub-circuits 3209, 3211, 3213, and 3216 do not include their respective Bell state generators 3204, 3210, and 3212, but rather these Bell state generators are external to the sub-circuits 3209, 3211, 3213, and 3216.

The sub-circuit 3216 also includes components for generating qubit 3015 and those operate in a manner similar to that described above in reference to the generation of qubit 3003. Likewise, each of sub-circuits 3209, 3211, 3213, etc., will generate corresponding fused qubits in a similar manner. Accordingly, the device 3200 can generate the cluster state 3000 by taking many Bell pairs as inputs and then performing many Boosted Type I fusion operations, resulting in a collection of output qubits that are entangled in a cluster state defined by the geometry of the cluster state 3000, i.e., the 4-dimensional generalization of the (10,3)b lattice. This highly entangled cluster state can then be employed as a resource for universal quantum computation, e.g., it can be entangled state 215 of the hybrid QC system 201. In addition, rather than producing the final cluster state that is used for the quantum computation, the circuit 3216 can be employed to make one or more intermediately sized cluster states that can be fused together at some downstream circuit (not shown).

Figure 33:
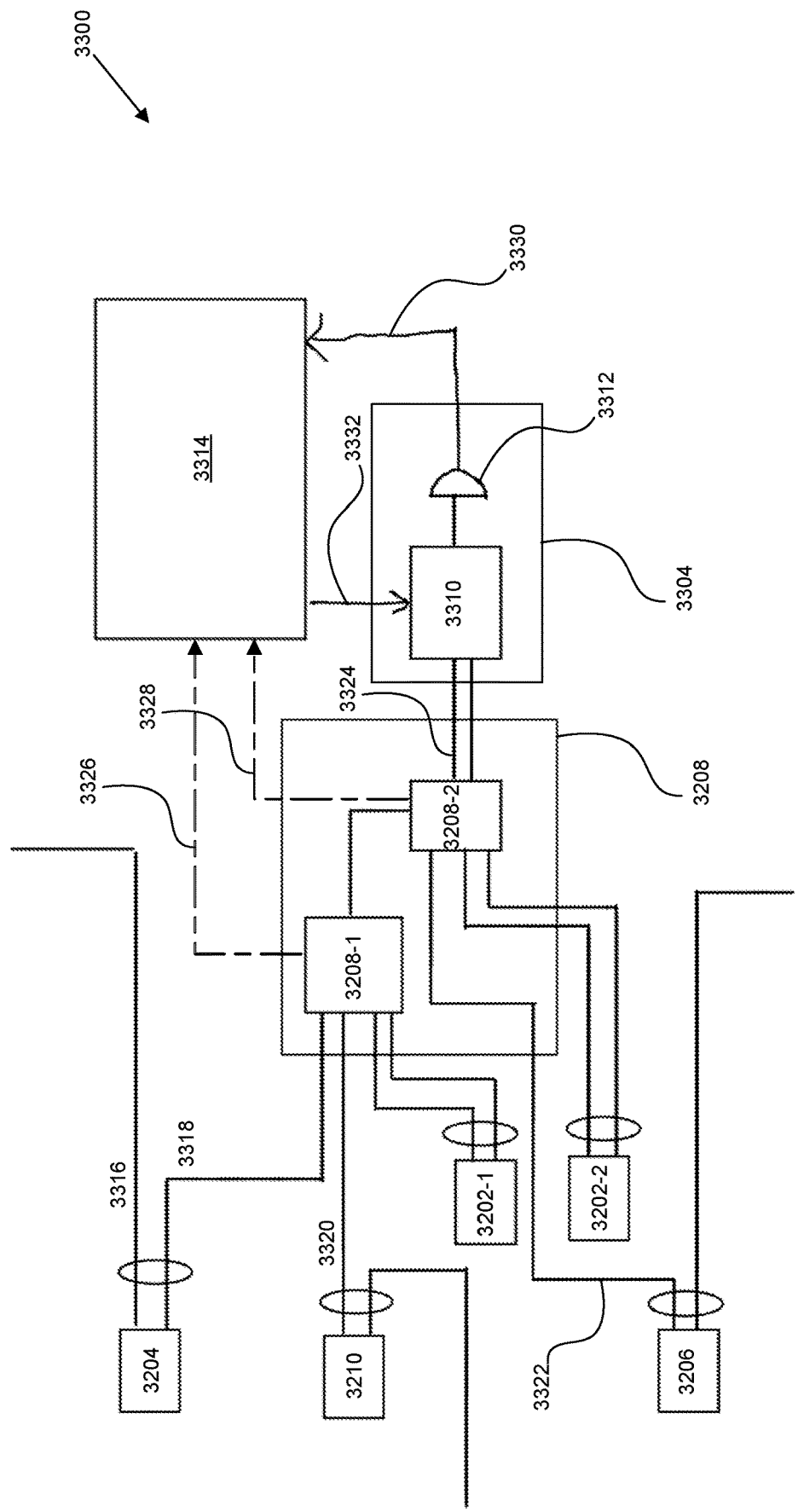
FIG. 33 is a schematic diagram of a device for generating a vertex of the cluster state of FIG. 30, in accordance with some embodiments.

FIG. 33 shows a device 3300 for generating and measuring a degree-three entangled qubit in accordance with one or more embodiments. More specifically, the system shown in FIG. 33 is a more detailed view of a three way Boosted Type I fusion gate, such as three way Boosted Type I fusion gate 3208a shown in FIG. 32 that can generate one of the degree-three vertex qubits in the cluster state 3000. In addition, the device 3300 includes additional components not shown in FIG. 32, e.g., components that can be used to make one or more measurements on the degree-three qubit during the course of a quantum computation. More specifically the device 3300 includes measurement device 3304 that includes hardware capable of measuring the qubit in any of an (X, Y, or Z) basis. In addition, the measurement device 3304 can also include hardware capable of performing a "mode-swap operation" before the measurement. In some embodiments, the measuring device 3300 can include one or more photonic components, e.g., a linear optical system 3310 and a photon detector 3312.

The system shown in FIG. 33 can be used to accomplish a fusion operation between any three input qubits that may themselves be members of cluster states, i.e., the input qubits may be already entangled with other qubits (not shown). Components that have similar functions to those already described in FIG. 32 are labeled identically to those in FIG. 32 to avoid complicating the description. For example, the system shown in FIG. 33 includes Bell state generators 3204, 3210, and 3206 that generate three Bell pairs, three qubits of which are sent to three way Boosted Type I Fusion gate 3208. In this example, the paths of individual qubits in the circuit are represented by solid lines and entanglement between two qubits is shown as an ellipse. For example, input qubits 3316 and 3318 are entangled because they are members of a Bell pair that is generated by Bell state generator 3204. The device 3300 also includes two ancilla Bell state generators 3202-1 and 3202-2.

As in FIG. 32, the three way Boosted Type I Fusion gate 3208 takes as input the three qubits (3318, 3320, and 3322) from three different entangled states (Bell pairs in this example) and two Bell pair ancillae. If successful, the gate outputs a single degree-three fused qubit 3324 (or a redundantly encoded qubit depending on the fusion gate's detection pattern as described in more detail below in reference to FIG. 35D).

The three way Boosted Type I Fusion gate 3208 includes two two-way Type I fusion gates the details of which are described in more detail below in reference to FIGS. 36A-36C. Both two-way Type I fusion gate 3208-1 and two-way Type I fusion gate 3208-2 include internal detectors that can perform a measurement, e.g., a Bell measurement, on their respective input qubits. The results of these measurements take the form of classical data, e.g., binary data that can signal (also referred to as "herald") the different outcomes (e.g., "success" or "failure" to generate a fused qubit) of each fusion gate. The classical data output from the two-way Type I fusion gates can be provided to the controller 3314 via classical information channels 3326 and 3328 and stored in a classical computer memory that is accessible by controller 3314. Such information can be useful for a number of operations because it gives the controller information regarding specific errors in the cluster state (e.g., which qubits within the cluster state are missing). Such information can be used by the controller to improve a number of processes that may be required to perform the quantum computation, including, e.g., renormalizing the percolated cluster to an error correcting code, decoding the measurement results, performing adaptive cluster state generation, performing adaptive measurements, etc.

While the fusion gate shown in FIG. 33 takes Bell pairs as input, one of ordinary skill in the art having the benefit of this disclosure would appreciate that a qubit from any entangled state can be used as input and thus any type of three clusters can be used using the fusion gates.

In some embodiments, the measurement device 3304 can also include classical information channels 3330 and 3332 that can send/receive classical data (e.g., binary encoded data) to/from the classical controller 3314, e.g., as already described in further detail above in reference to the qubit readout system shown in FIG. 2. In some embodiments, the state of the linear optical system 3310 can be set by the controller based on classical data received by the controller 3314 from the two-way fusion gate 3208-2. For example, in some situations, a successful fusion operation results in either a redundantly encoded fused qubit (formed from two qubits) or a single fused qubit and the state of the optical system 3310 is set accordingly, based on the information from classical channel 3328. In other embodiments, the redundantly encoded qubit can be reduced to a single qubit before being output from the two-way type I fusion gate 3208-2. More details are described below in reference to FIGS. 36A-36C below.

XI. TYPE I FUSION

Figure 34A:
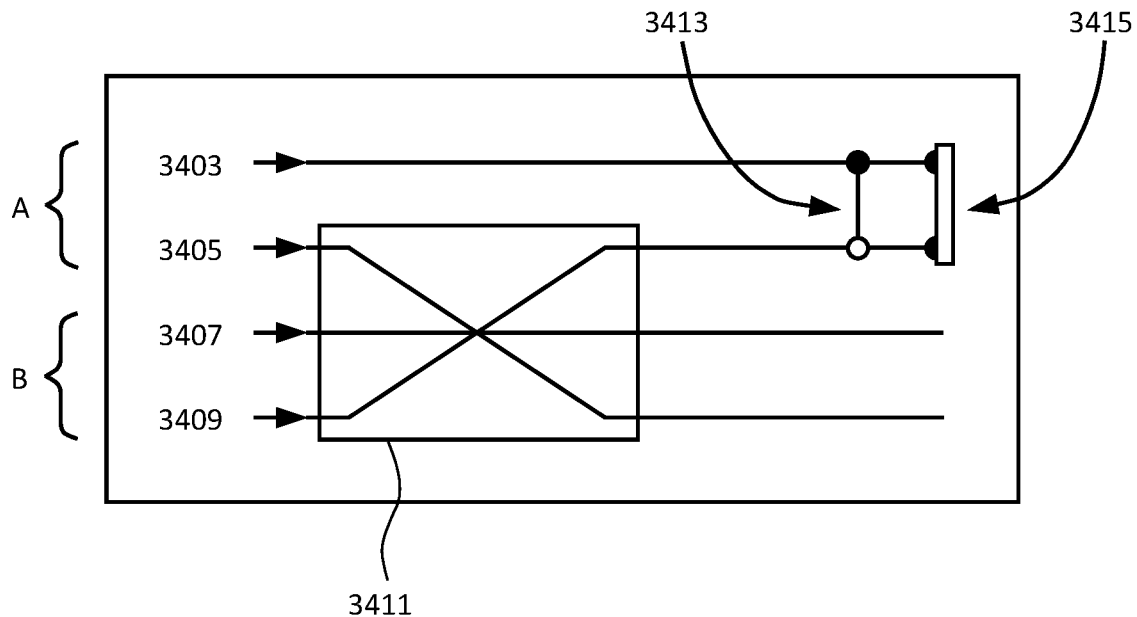
FIG. 34A is a type I fusion gate in accordance with some embodiments.
Figure 34B:
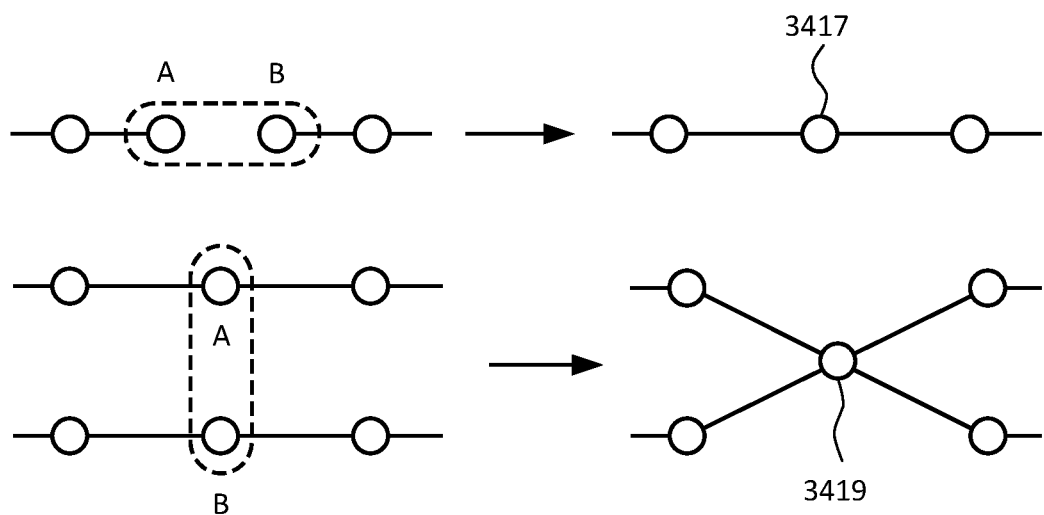
FIG. 34B shows type I fusion in accordance with some embodiments.

FIG. 34A shows one example of Type I fusion gates in accordance with some embodiments. FIG. 34B shows two examples of qubit cluster states that result from fusion operations in accordance with some embodiments. In the description that follows, embodiments will be described that employ spatial modes of photons as the qubit system, but one of ordinary skill will appreciate that any type of qubit described by any type of mode can be employed without departing from the scope of the present disclosure. Furthermore, in what follows, photonic waveguides are used to define the spatial modes of the photon. However, one of ordinary skill having the benefit of this disclosure will appreciate that any type of mode, e.g., polarization modes, temporal modes, and the like, can be used without departing from the scope of the present disclosure.

In general, in a photonic system, fusion gates can be linear optical circuits that allow the fusion of small entangled resources, e.g., Bell pairs, to obtain larger entangled states and, ultimately, generate a cluster state used for quantum computation. There are two types of fusion gates, Type I and Type II fusion gates, with Type I described in detail below. Both types of fusion gates work by performing a probabilistic Bell state measurement (BSM) on the input state, to collapse the two input qubits onto a Bell pair when the fusion succeeds. For the case of Type I fusion, the collapse of the state of the two input qubits onto a Bell pair can be viewed as the application of Kraus operators to the input.

FIG. 34A shows a circuit diagram illustrating a type I fusion gate in accordance with some embodiments. The diagram shown in FIG. 34A is schematic with each horizontal line representing a mode of a quantum system, e.g., a photon. In the dual rail path encoding, each pair of modes represents a qubit. In a photonic implementation of the gate the modes in diagrams such as that shown in FIG. 34A can be physically realized using single photons in photonic waveguides. Most generally, a type I fusion gate like that shown in FIG. 34A fuses qubits A (physically realized by photon modes 3403 and 3405) and B (physically realized by photon modes 3407 and 3409) to create a Bell pair between them. Qubits A and B are each entangled with the modes of one or more other qubits (not shown) and thus, when they are fused by the gate, a larger cluster state can be created.

For example, FIG. 34B shows the result of fusing two qubits A and B that are each, respectively, a qubit located at the end (i.e., a leaf) of some longer entangled cluster state (only a portion of which is shown). The qubit 3417 that remains after the fusion operation inherits the entangling bonds from the original qubits A and B thereby creating a larger fused linear cluster state. FIG. 34B also shows the result of fusing two qubits A and B that are each, respectively, an internal qubit that belongs to some longer entangled cluster of qubits (only a portion of which is shown). As before, the qubit 3419 that remains after fusion inherits the entangling bonds from the original qubits A and B thereby creating a fused cluster state. In this case, the qubit that remains after the fusion operation is entangled with the larger cluster by way of four other nearest neighbor qubits as shown.

Returning to the schematic illustration of the type I fusion gate shown in FIG. 34A, qubit A is dual rail encoded by modes 3403 and 3405 and qubit B is dual rail encoded by modes 3407 and 3409. For example, in the case of path encoded photonic qubits, the logical zero state of qubit B |0>B occurs when mode 3403 is a photonic waveguide that includes a single photon and mode 3405 is a photonic waveguide that includes zero photons (and likewise for qubit B). Thus, the type 1 fusion gate shown in FIG. 34A takes as input two dual rail encoded photon qubits thereby resulting in a total of four input modes (e.g., modes 3403, 3405, 3407, and 3409). To accomplish the fusion operation, a mode coupler (e.g., 320:50 beam splitter) 3413 is applied between a mode of each of the input qubits, e.g., between mode 3403 and mode 3409 before performing a detection operation on both modes using photon detectors 3415 (which includes two distinct photon detectors coupled to modes 3403 and 3409 respectively). In addition, to ensure that the output modes are adjacently positioned, a mode swap operation 3411 can be applied that swaps the position of the second mode of qubit A (mode 3405) with the position the second mode of qubit B (mode 3409). In some embodiments, mode swapping can be accomplished through a physical waveguide crossing or by one or more photonic switches or by any other type of physical mode swap.

FIG. 34A shows only an example arrangement for the type I fusion gate and one of ordinary skill will appreciate $$|\Psi\rangle = (|A_0\rangle|0\rangle_a + |A_1\rangle|1\rangle_a) \otimes (|B_0\rangle|0\rangle_b + |B_1\rangle|1\rangle_b),$$

where a, b label the qubits entering the fusion gate, A, B label the systems entangled to them respectively, and $|0\rangle$, $|1\rangle$ are the basis states in the qubit basis (also referred to as the computational basis or z basis). This state can be further expanded as:

$$\Psi_{in}\rangle = |A_0\rangle|B_0\rangle|0\rangle_a|0\rangle_b + |A_1\rangle|B_0\rangle|1\rangle_a|0\rangle_b + |A_0\rangle|B_1\rangle|0\rangle_a|1\rangle_b + |A_1\rangle|B_1\rangle|1\rangle_a|1\rangle_b$$
$$= |A_0\rangle|B_0\rangle|10\rangle_a|10\rangle_b + |A_1\rangle|B_0\rangle|01\rangle_a|10\rangle_b + |A_0\rangle|B_1\rangle|10\rangle_a|01\rangle_b + |A_1\rangle|B_1\rangle|01\rangle_a|01\rangle_b$$
$$\mapsto |A_0\rangle|B_0\rangle|0\rangle_a|0\rangle_b|1\rangle_a|1\rangle_b + |A_1\rangle|B_0\rangle|1\rangle_a|0\rangle_b|0\rangle_a|1\rangle_b + |A_0\rangle|B_1\rangle|0\rangle_a|1\rangle_b|1\rangle_a|0\rangle_b + |A_1\rangle|B_1\rangle|1\rangle_a|1\rangle_b|0\rangle_a|0\rangle_b$$

that the position of the beam splitter and the presence of the mode swap region 3411 can be altered without departing from the scope of the present disclosure. For example, beam splitter 3413 can be applied between modes 3405 and 3407. Mode swaps are optional and are not necessary if qubits having non-adjacent modes can be dealt with, e.g., by tracking which modes belong to which qubits by storing this information in a classical memory.

The type I fusion gate shown in FIG. 34A is a nondeterministic gate, i.e., the fusion operation only succeeds with a certain probability and in other cases the quantum state that results is not a larger cluster state that comprises the original cluster states fused together to a larger cluster state. More specifically, the gate "succeeds" with probability 320%, when only one photon is detected by detectors 3415, and "fails" if zero or two photons are detected by detectors 3415. When the gate succeeds, the two cluster states that qubits A and B were a part of become fused into a single larger cluster state with a fused qubit remaining as the qubit that links the two previously unlinked cluster states (see, e.g., FIG. 34B). However, when the fusion gate fails, it has the effect of removing both qubits from the original cluster resource states without generating a larger fused state.

While the type I fusion gate described above exhibits only a 320% success rate, in accordance with some embodiments, it is possible to increase the success probability of the gate by interfering the qubits that enter the gate with an ancillary entangled resource before the detection. This type of fusion gate, referred to herein as a two-way boosted type I fusion gate exhibits a success probability of $$p_{succ}^n = 1 - \frac{1}{2^{n+1}}$$

where n is referred to as the "level" of the boosting and defines the size of the ancilla resource that is used for the boosting. In general, the ancilla is prepared in a $2^n$-Greenberger-Horne-Zeilinger state, also referred to as a $2^n$-GHZ state. For n=1, the ancilla resource used for boosting is two qubits in a Bell state resulting a 75% fusion success probability, as described in further detail below.

Figure 35A:
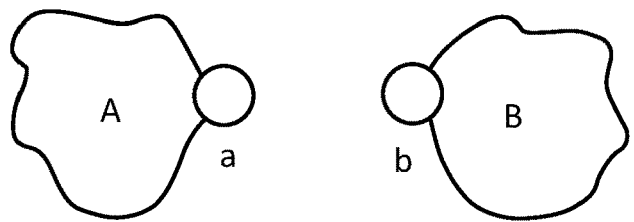
FIGS. 35A-35G show a boosted type I fusion gates and associated fusion outcomes in accordance with some embodiments.

FIG. 35A shows an example of two input states for a typical fusion operation. More specifically the input qubits to the fusion gate are two qubits a and b that are each entangled to larger states represented as regions A and B. This state can be described as where in the second line the qubit states have been expressed in the path encoding (Fock notation) and in the third line, the modes have been rearranged so that even modes are first and odd modes are second, where even and odd refer to the mode ordering on input, e.g., as shown in FIG. 35B.

In the same notation (dual rail path encoding, even modes first) the state of an ancilla Bell pair can be written as $$|\phi^+\rangle = \frac{(|10\rangle|10\rangle + |01\rangle|01\rangle)}{\sqrt{2}} \mapsto \frac{(|00\rangle|11\rangle + |11\rangle|00\rangle)}{\sqrt{2}}$$

where in the second line the modes have been rearranged to place even modes first and odd modes second.

Figure 35B:
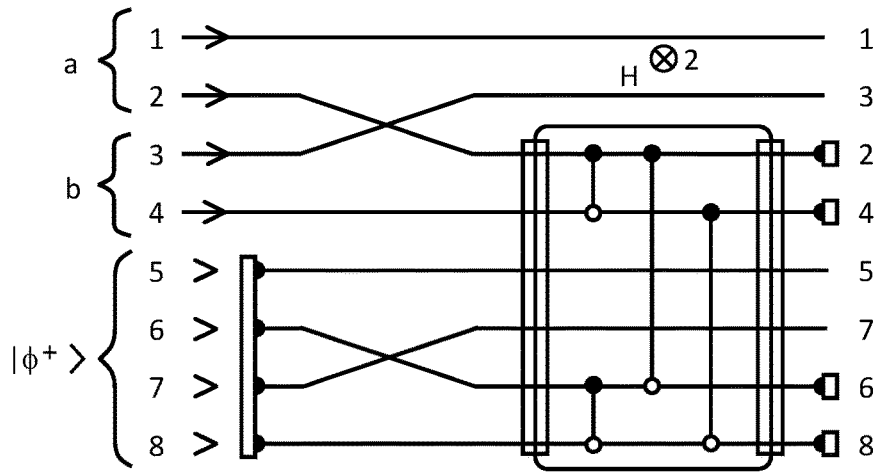

To illustrate the boosted fusion operation, consider sending the last two modes of each of $|\Psi_{in}\rangle$ and $|\phi^+\rangle$ (in the rearranged form) through a four-mode Hadamard gate and then detecting them, as shown in the schematic of FIG. 35B. Such a four-mode Hadamard can be realized with a series of four beam splitters, as further explained in reference to FIGS. 36A-36B below. Such a Hadamard gate applied to the modes as shown in FIG. 35B has the effect of removing the information about which modes the detected photons come from, without altering their number.

FIG. 35B shows a Boosted Type I fusion circuit, including the input qubits a (e.g., a first qubit) and b (e.g., a second qubit), the ancilla Bell pair $|\phi^+\rangle$, and mode swaps on the input and ancilla. The cluster states A and B with which qubits a and b are entangled are not shown to avoid complicating the diagram. Each input mode 1-8 is labeled as an integer with modes 1 and 2 belonging to qubit a (e.g., a quantum state of the first qubit is encoded in mode 1 and a mode 2), and modes 3 and 4 belonging to qubit b (e.g., a quantum state of the second qubit is encoded in mode 3 and mode 4) and modes 32, 6, 7, and 8, belonging to the two qubits associated with the Bell state $|\phi^+\rangle$ (e.g., the Bell pair comprises a fourth qubit that is entangled with a fifth qubit, and the quantum state of the Bell pair is encoded in modes 32, 6, 7, and 8). Mode swaps are shown as crossing lines and are used to rearrange the even and odd modes to be adjacent such that the diagram corresponds to the more mathematical description above. One of ordinary skill will appreciate that the modes need not be rearranged as shown as long as the mode coupling and detector placement is consistent with the description above, i.e., the 4-mode Hadamard (e.g., a Hadamard gate, which is sometimes referred to simply as a "Hadamard") can take in one respective mode from each of the input qubits a and b and can take in two modes from the Bell pair ancilla. At the output of the gate, all four of these modes are measured by a corresponding photon detector (e.g., by performing a single photon measurement on each of the four modes to produce a detection result for the mode). The Hadamard is configured (by the application of the appropriate pair-wise beam splitters) to ensure that a detection of a photon by any one of the 4 detectors does not reveal any information about which input mode the detected photon originated. At the output of the boosted fusion gate, modes 1 and 3 from qubits a and b constitute the fused qubit that, under certain detector results, is fused with the cluster states A and B that were originally entangled with the input qubits a and b. Note that Type-I fusion can be performed with different types of ancilla (e.g., not just an ancilla Bell pair, as described above). For example, in some embodiments, type-I fusion is boosted using a 4-GHZ ancilla, with an appropriately modified circuit.

The possible detection outcomes are determined by taking the sum of the photon counts on the detectors of modes 2, 4, 6, and 8 that are coupled to the outputs of the Hadamard gate. Possible outcomes for the final quantum state are shown in FIGS. 35C-35E with FIGS. 35C-35D illustrating the result of a successful fusion and FIG. 35E illustrating the result of a failed fusion.

Odd Number of Photons Detected

Figure 35C:
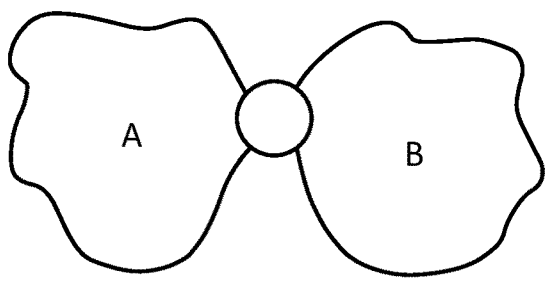
Figure 35D:
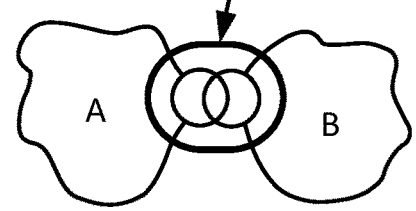
Figure 35E:
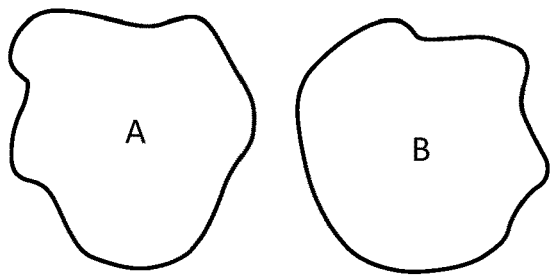

If the total number of photons detected is odd, then the fusion result is the success scenario illustrated in FIG. 35C where the cluster states A and B are fused via a single fused qubit. This can be understood by recognizing that the Bell pair ancilla can contribute either 0 or 2 photons to the detection pattern. So, in the case of an odd number of photons detected, it must be the case that the modes coming from $|\Psi_{in}\rangle$ contain 1 photon. The probability of this happening is $P_{odd}=1/2$. In this case, the (unnormalized) post-measurement state of the output modes is one of:

$$|\Psi_{out}^1\rangle = (|A_1\rangle|B_0\rangle|10\rangle \pm |A_0\rangle|B_1\rangle|01\rangle) \otimes |11\rangle$$

$$|\Psi_{out}^3\rangle = (|A_1\rangle|B_0\rangle|10\rangle \pm |A_0\rangle|B_1\rangle|01\rangle) \otimes |00\rangle$$

depending on whether 1 or 3 photons are detected (as indicated by the superscript). The relative phase between the two terms is determined by the specific measurement pattern obtained.

The state of the two modes coming from the Bell pair (modes 32 and 7) is revealed by the number of photons detected and factors out (i.e., the modes can be discarded), while the two modes coming from $|\Psi_{in}\rangle$ (modes 1 and 3) become entangled to both systems A and B, resulting in successful fusion. This is illustrated graphically in FIG. 35C.

2 Photons Detected

The detection of two photons can happen in two cases: either $|\Psi_{in}\rangle$ contributes 2 photons and the Bell pair contributes zero photons or vice versa. The probability of this happening is therefore $$p_2 = p_\psi^2 p_{BP}^0 + p_\psi^0 p_{BP}^2 = \frac{1}{4} \times \frac{1}{2} + \frac{1}{4} \times \frac{1}{2} = \frac{1}{4}.$$

The (unnormalized) post-measurement state of the output modes is:

$$|\Psi_{out}^2\rangle = |A_0\rangle|B_0\rangle|00\rangle|11\rangle \pm |A_1\rangle|B_1\rangle|11\rangle|00\rangle$$
$$= |A_0\rangle|B_0\rangle|10\rangle|10\rangle \pm |A_1\rangle|B_1\rangle|01\rangle|01\rangle$$

where, in the first line, the first two modes come from $|\Psi_{in}\rangle$ and the other two from $|\phi^+\rangle$ and the second line is obtained by rearranging the modes. Again, the sign between the two terms depends on the specific detection pattern observed. This state corresponds to a successful fusion, where both systems A and B end up entangled to a single redundantly-encoded qubit, as illustrated in FIG. 35D.

Zero or Four Photons Detected

The detection of 0 or 4 photons collapses both $|\Psi_{in}\rangle$ and $|\phi^+\rangle$ to one of their terms only, since these outcomes can only be obtained if both states contribute the same number of photons, 0 or 2, respectively. In such a case, the post-measurement states in the two cases are the product states:

$$|\Psi_{out}^4\rangle = |A_0\rangle|B_0\rangle|00\rangle|00\rangle$$

$$|\Psi_{out}^0\rangle = |A_1\rangle|B_1\rangle|11\rangle|11\rangle$$

neither of which produce any entanglement between the two systems A and B and therefore correspond to failure of the gate. In this case both the input qubits are destroyed, as illustrated in FIG. 35E.

In summary:

| No. of detected photons | Probability | Outcome Success |
|---|---|---|
| 1 or 3 photons | 1/2 | Entanglement through one single central qubit |
| 2 photons | 1/4 | Success Entanglement through a redundantly encoded central qubit |
| 0 or 4 photons | 1/4 | Failure No entanglement |

The overall success probability of the scheme is therefore 3/4=75%.

Figure 35F:
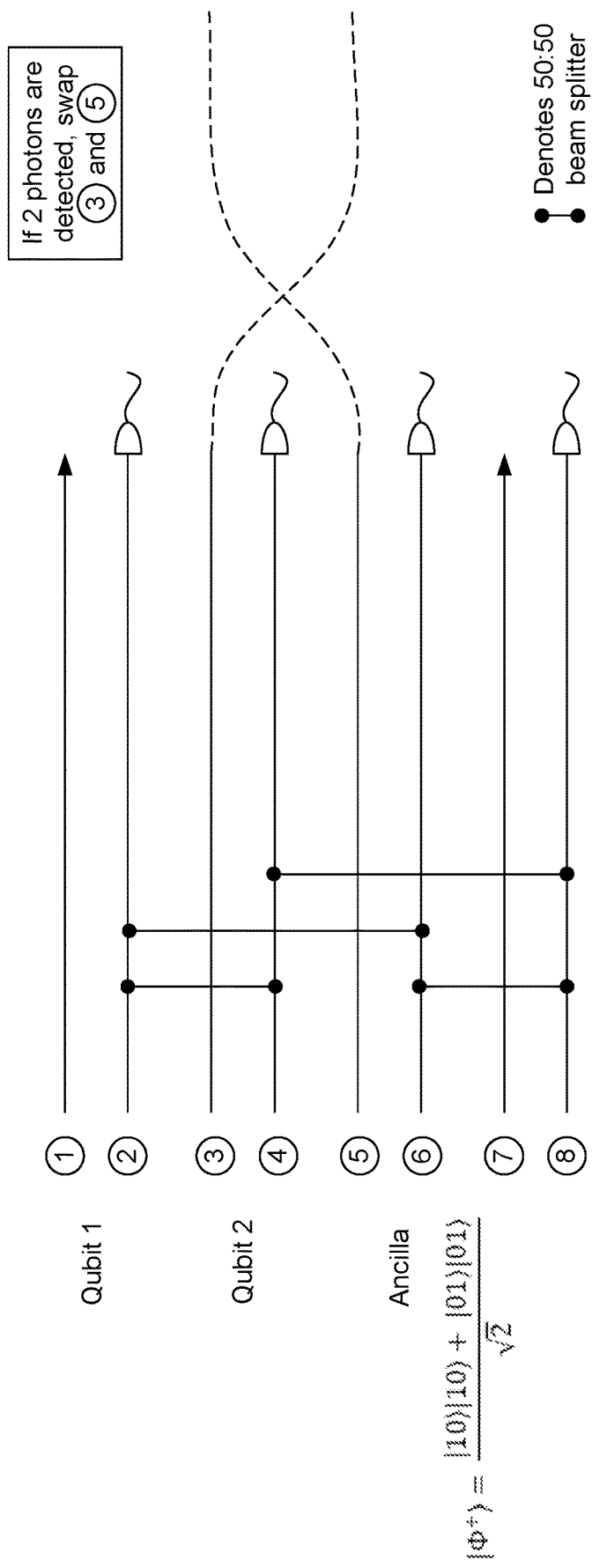

In some embodiments, boosted Type I fusion can employ some form of adaptivity, i.e., certain operations such as mode swaps can be conditioned on a certain detection pattern. For example, in the case that 2 photons are detected, the output modes can be swapped so that the modes that define the output qubits are adjacent in the circuit. Such a swap is shown in FIG. 35F. However, such adaptivity is not necessary if the position, i.e., mode number for each mode of the output qubits is stored in memory and tracked such that any gates/measurement to be applied to those modes will be applied consistently despite the fact that the qubit itself may be defined in non-adjacent modes.

Figure 35G:
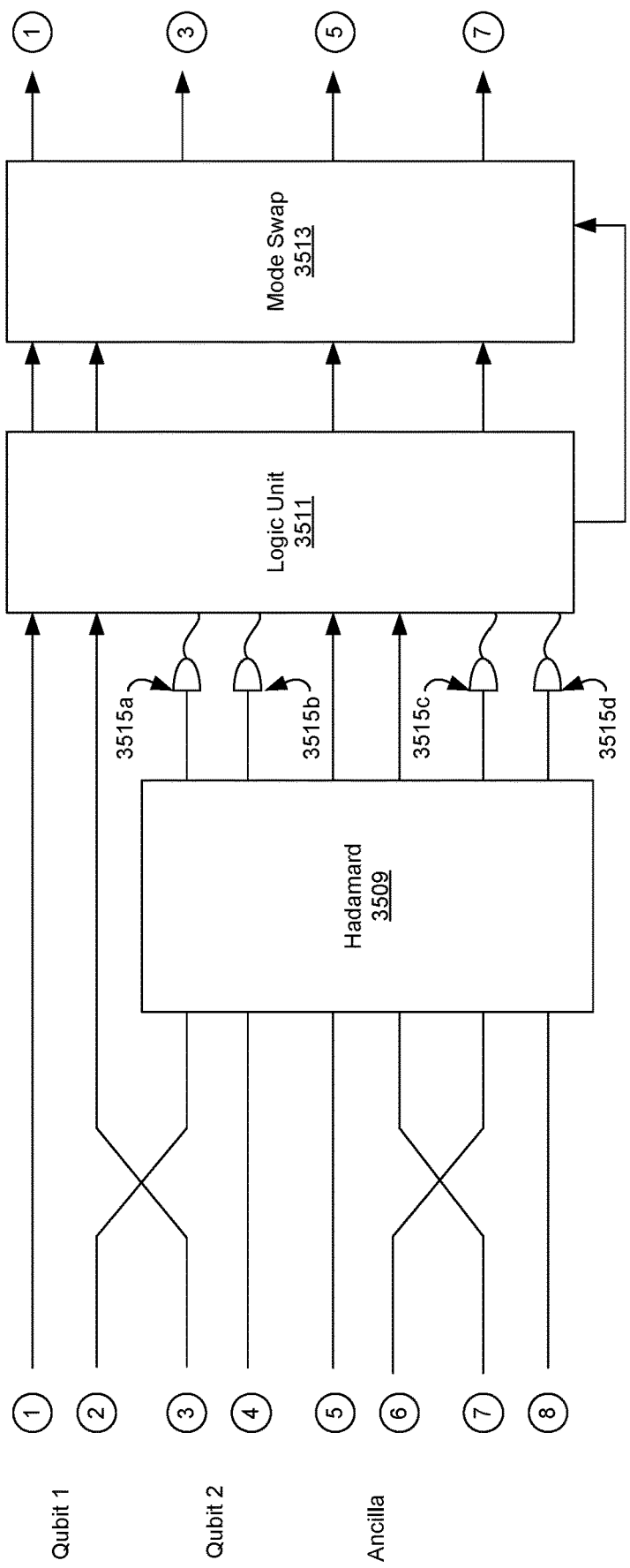

FIG. 35G shows a boosted type I fusion gate 3500, in accordance with some embodiments. Fusion gate 3500 includes first, second, third, fourth, fifth, sixth, seventh, and eighth modes (labeled modes 1 through 8).

Fusion gate 3500 includes a Hadamard gate 3509 configured to act on the second, fourth, sixth, and eighth modes (e.g., modes 2, 4, 6, and 8). In some embodiments, Hadamard gate 3509 is embodied as the Hadamard gate shown in FIG. 35B. However, one of skill in the art, having had the benefit of this disclosure, will recognize that any number of suitable Hadamard gates may be used in accordance with various embodiments of the present disclosure.

Fusion gate 3500 includes one or more photon detectors 3515 (e.g., detectors 3515a-3515d) configured to: perform a single photon measurement on the second mode to obtain a second mode photon detection result (e.g., a binary result, indicating that photons were or were not detected; or a result comprising a number (e.g., count) of photons detected); perform a single photon measurement on the fourth mode to obtain a fourth mode photon detection result; perform a single photon measurement on the sixth mode to obtain a sixth mode photon detection result; perform a single photon measurement on the eighth mode to obtain an eighth mode photon detection result.

Fusion gate 3500 includes a logic unit 3511 (also referred to as a digital logic module) operatively coupled with the one or more photon detectors 3515. The logic unit 3511 receives received the detection results of the various single photon measurements described above (e.g., receives information indicating which photon detectors 3515 detected a photon and, optionally, how many photons were detected by the respective photon detectors 3515). The logic unit 3511 is configured to determine whether the second, fourth, sixth, and eighth mode photon detection results, collectively, herald successful qubit fusion (e.g., according to the detection patterns described above). In various embodiments, the logic unit 3511 is implemented as field programmable digital logic using, for example, a field programmable gate array (FPGA) or an on-chip hard-wired circuit, such as an application specific integrated circuit (ASIC). The logic unit 3511 is further configured to in accordance with the determination that the second, fourth, sixth, and eighth mode photon detection results, collectively, herald successful qubit fusion, output a fused qubit (e.g., on modes 1, 3, 32, and 7). The fused qubit inherits the entanglement of the first and second qubits (e.g., the fused qubit is entangled with the first quantum system and the second quantum system).

Fusion gate 3500 optionally includes a set of components that form mode swap circuit 3513. For example, as described below in greater detailed with reference to FIG. 36B, in some embodiments, mode swap circuit 3513 comprises a Mach-Zehnder interferometer 3603 that accomplishes a conditional mode swap between modes 3 and 32 depending on the detection results from detectors 3515.

Figure 36A:
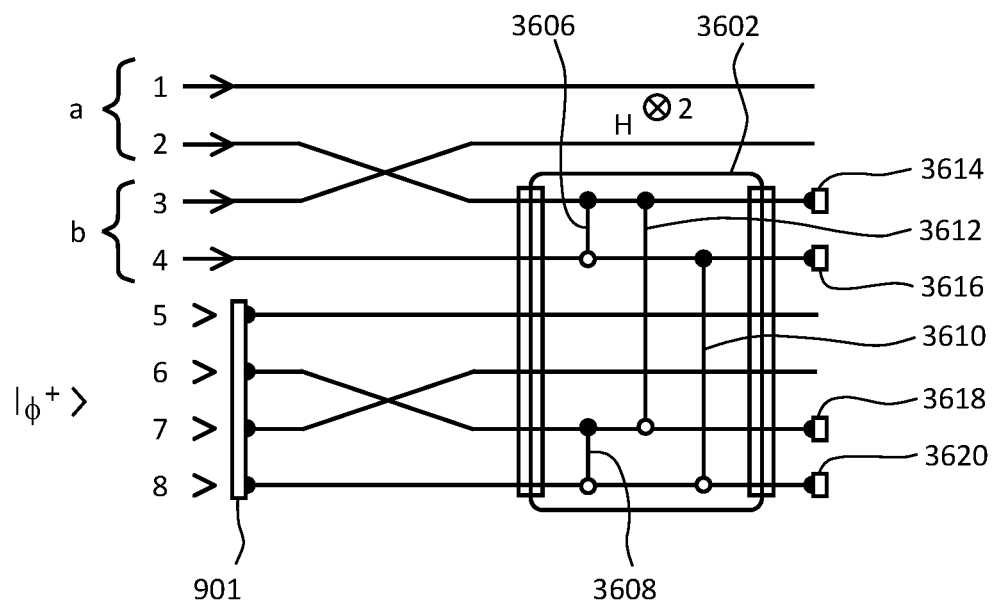
FIGS. 36A-36C shows boosted type I fusion gates in accordance with some embodiments.
Figure 36B:
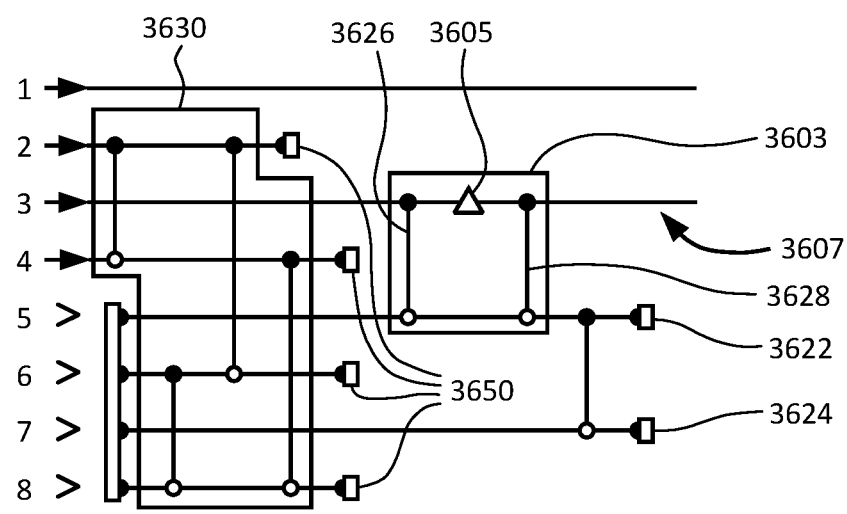
Figure 36C:
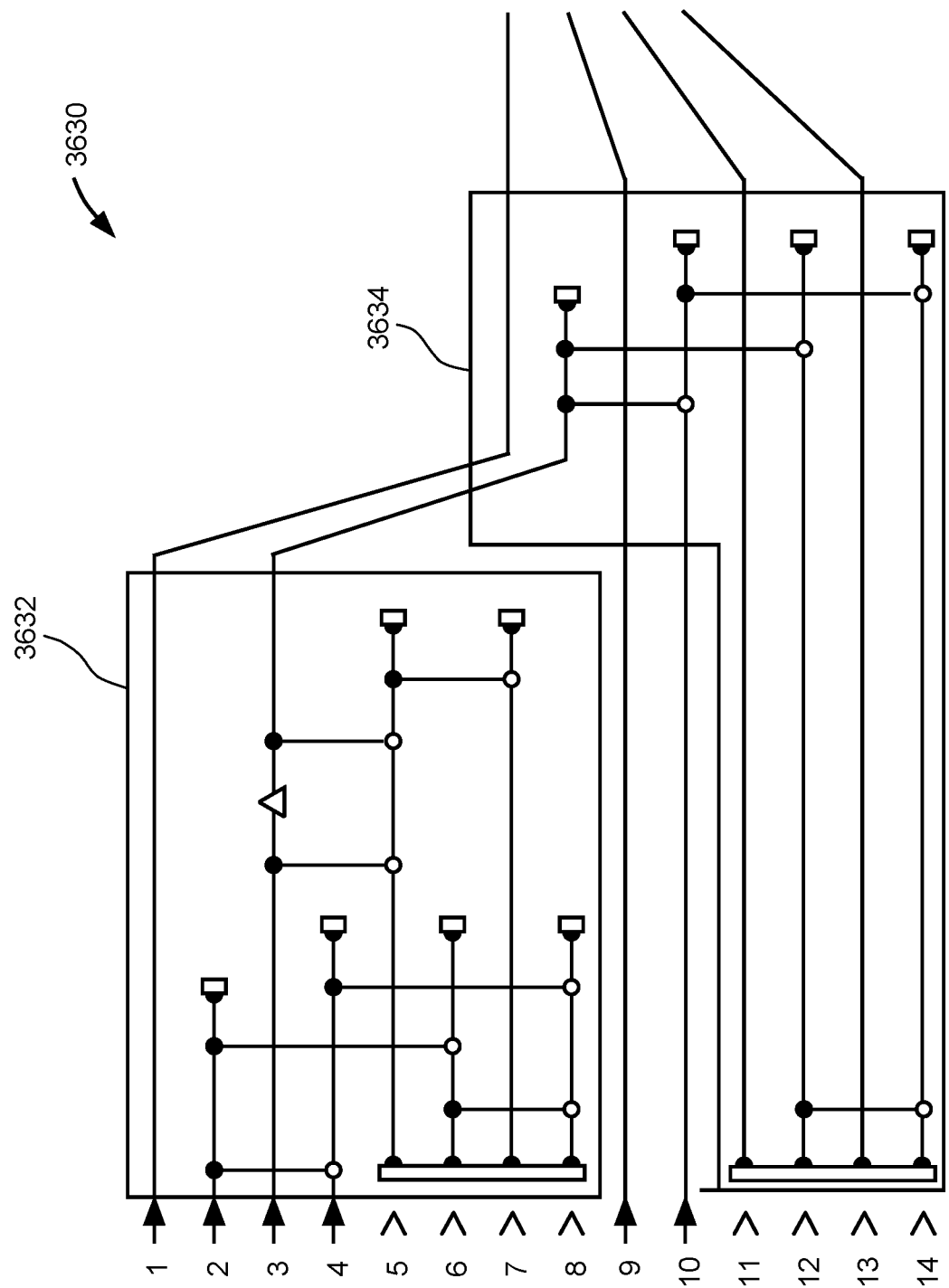

FIGS. 36A-36C show examples of two-way boosted type I fusion gates in accordance with some embodiments. As in FIG. 35B, qubit modes are represented as horizontal lines. Entangled states of many modes are represented by rectangles that extend across, and thereby join, multiple modes. For example, rectangle 3601 in FIG. 36A signifies that the four modes 32-8 form a Bell state. In the examples shown here, qubits are encoded in a two-mode (i.e., dual rail encoding). For example, in a photonic implementation, all modes can be physically implemented as waveguides as already described above. Furthermore, in FIGS. 36A-36C, collections of components that can be grouped together functionally to form gates are outlined by larger rectangles. For example, Hadamard gate 3602 is outlined in a shaded rectangle having four input modes (2, 4, 6, 8) and four output modes (2, 4, 6, 8). In the diagrams shown here, modes that pass through a rectangular block are not part of the gate, e.g., modes 32 and 7 in FIG. 36A are not acted on by the Hadamard gate 3602. Photon detectors are shown as small rectangles that terminate a given mode, e.g., detectors 3614, 3616, 3618, and 3620. Detectors generally measure whether or not the quantum system being measured is in the mode being measure (e.g., whether or not any given waveguide being measured includes a photon). For example, the two-way boosted type I fusion gate shown in FIG. 36A includes four detectors that terminate modes 2, 4, 6, and 8 labeled as detectors 3614, 3616, 3618, and 3620, respectively. Such detectors can be any type of single photon detector, including, e.g., superconducting nanowire single photon detectors, SPADs, APDs and the like.

In the two-way boosted type I fusion gate shown in FIG. 36A, the Hadamard gate 3602 includes a collection of mode couplers, e.g., beam splitters 3606, 3608, 3610, and 3612. At a high level, the function of the beam splitters is to couple the modes such that if a photon is detected at any one of detectors 3614, 3616, 3618, and 3620 it is impossible to determine which input mode that photon originated from. To function this way, the example shown in FIG. 36A includes a first mode coupler 3606 that couples two of the modes from input qubits a and b and a second mode coupler 3608 that couples two of the four modes that make up the ancilla Bell pair $|\phi^+\rangle$. The coupled modes 2 and 4 from the input qubits a and b and the coupled modes 6 and 8 from the ancilla Bell pair are then coupled via beam splitter 3616 and beam splitter 3610, respectively. Details of the operation of the fusion gate shown in FIG. 36A were previously described above in reference to FIGS. 35A-35G and therefore will not be repeated here.

FIG. 36B shows another example of a two-way boosted type I fusion gate shown i) without the mode swaps shown in FIG. 36A; ii) with additional circuitry to effectuate a conditional mode swap described in more detail above in reference to FIGS. 35A-35G; and iii) two additional detectors 3622 and 3624 to measure out the two Bell state modes that do not contribute to the fused cluster state. Before detection, the two Bell state modes are coupled to ensure that detection in either mode does not provide information relating to which mode the photon originated from thereby ensuring that the measurements at detectors 3622 and 3624 do not collapse the output modes of the fusion operation to an undesired state.

The fusion gate shown in FIG. 36B also includes a set of components that form a Mach-Zehnder interferometer 3603 that accomplishes a conditional mode swap between modes 3 and 32 depending on the detection results from detectors 3650. More specifically the Mach-Zehnder interferometer 3603 includes a phase shifter 3605 sandwiched between to mode couplers 3626 and 3628, which can be 50/50 beam splitters. One of ordinary skill will appreciate that the Mach-Zehnder interferometer shown here is but one example and many different implementations of Mach-Zehnder interferometers (or conditional mode swappers) can be implemented without departing from the scope of the present disclosure. In the boosted type I fusion gate shown in FIG. 36B, the Hadamard gate 3630 is implemented as in FIG. 36A, i.e., by a set of mode couplers that couple four modes (two from the input qubits and two from the ancilla Bell pair).

In each boosted fusion circuit shown in FIGS. 36A-36B, Hadamard gates are accomplished by a collection of beam splitters that operate to couple all the input modes together in such a way that detection of a photon at one of the detectors located at one of the output ports of the Hadamard does not reveal which mode the detected photon originated from, i.e., the action of the Hadamard is to erase any information relating to which input modes any given detected photon originated from. This "mode-scrambling" or "information erasure" function of the Hadamard can be implemented in any number of ways without departing from the scope of the present disclosure. For example, as shown schematically in FIGS. 36A-36B, Hadamard 3602 can be accomplished in a photonic system by coupling the two input modes 2 and 4 (originating from qubits a and b, respectively) via a 50/50 beam splitter 3606. In other architectures other types of physical mode couplers can be used. For example, trapped ion systems or superconducting qubits may employ mode couplers that are physically implemented by some form of electromagnetic coupling between qubit modes, e.g., via laser light and/or RF/microwave electromagnetic fields.

In each of the boosted type 1 fusion gates shown in FIGS. 36A-36B, detectors are placed on the even modes (or more generally they can be placed on the modes that do not make up the final fused qubit). Backing logic circuitry (not shown) can take the detector outputs (which can be analog pulses and/or digital data in the forms of ones and zeroes) and can then determine an action to take (e.g., swap modes 3 and 32) based on the detection result. As described above, if a total of two photons is detected by the detectors, then the backing logic circuitry can send a control signal to the phase shifter 3605 of the Mach-Zehnder interferometer 3603 resulting in the desired mode swap.

FIG. 36C shows a three-way boosted type I fusion gate in accordance with some embodiments. This three-way boosted type I fusion gate 3630 is one way to implement the boosted fusion generators described above in reference to FIG. 32 above. At a high level, the three-way boosted type I fusion gate 3630 includes two two-way boosted type I fusion gates 3632 and 3634 such as those described above in reference to FIGS. 36A-36B. Modes 1-8 are input on two-way boosted type I fusion gate 3632, which is a circuit that is equivalent to that described above in reference to FIG. 36B. Likewise, the two output modes from the two-way boosted type I fusion gate 3632 and new modes 9-15 form the 8 input modes for the second-stage two-way boosted type I fusion gate 3634, which is equivalent to the gate shown in FIG. 36A but without the optional mode swaps.

Notation

Figure 37:
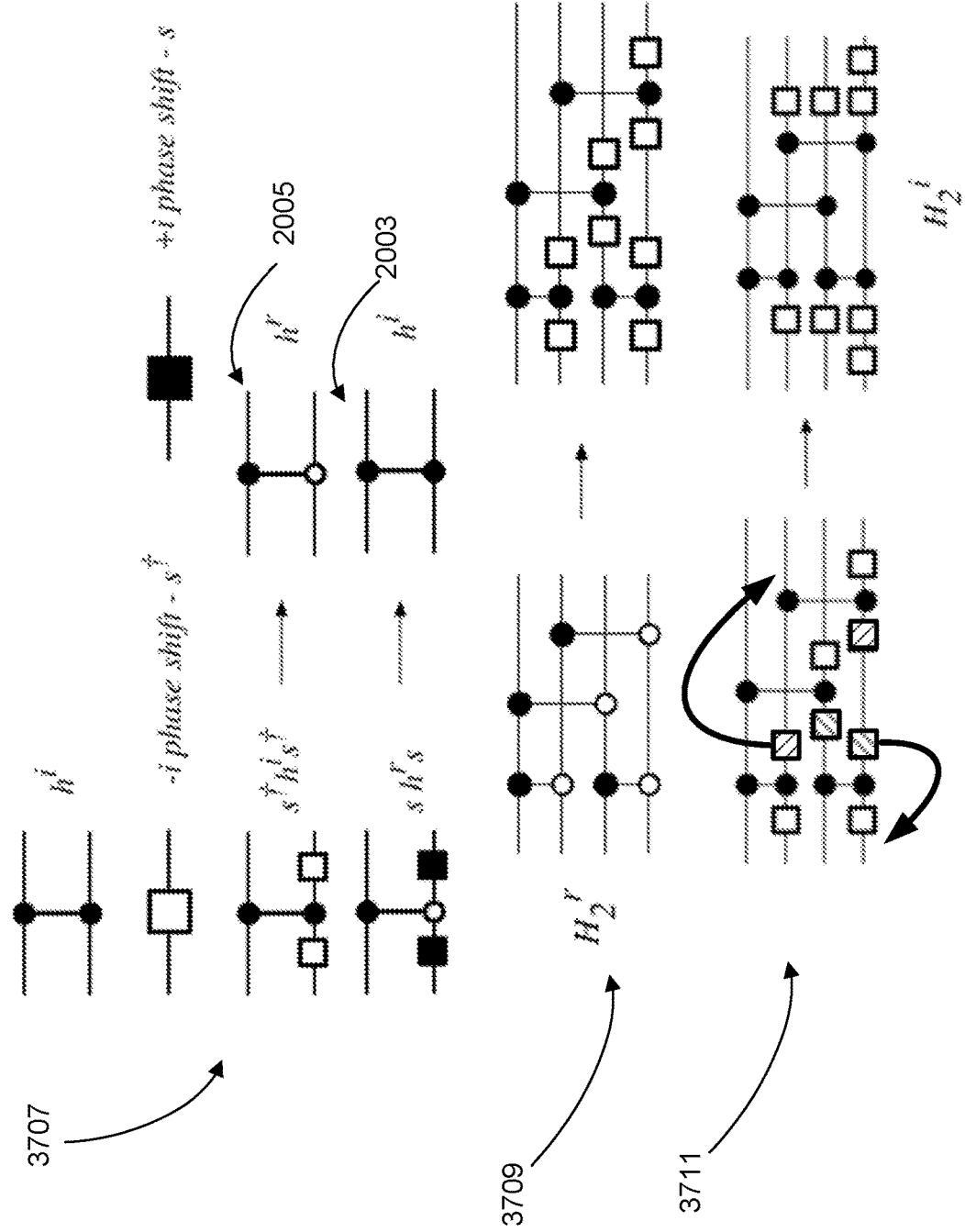
FIG. 37 shows schematic diagrams of beam splitters and Hadamard gates in accordance with some embodiments.

In the schematic diagrams used herein, e.g., FIGS. 34A, 35B, 36A-36C, certain components/quantum gates are represented as shown in FIG. 37. In general, the definitions and relations between beam splitters and n-mode Hadamards can be translated to the path-encoded diagrams using the notation shown in FIG. 37. Mathematically, the imaginary Hadamard can be written as $$h^i = \frac{1}{\sqrt{2}}\begin{pmatrix} 1 & i \\ i & 1 \end{pmatrix}$$

and the real Hadamard $h^r$ can be written as $$h^r = \frac{1}{\sqrt{2}}\begin{pmatrix} 1 & 1 \\ 1 & -1 \end{pmatrix}$$

Physically, e.g., in a photonic system, the above Hadamard gates can be implemented as beam splitters and/or directional couplers. The real and complex Hadamards can be transformed into one another by applying a ±i phase shift to the second mode. The unitary operators that define such a phase shift are given by $$s = \begin{pmatrix} 1 & 0 \\ 0 & i \end{pmatrix} \text{ and } s^\dagger = \begin{pmatrix} 1 & 0 \\ 0 & -i \end{pmatrix},$$

in which case $h^i = s h^r s$ and $h^r = s^\dagger h^i s^\dagger$.

In view of the above mathematical relations, the complex Hadamard corresponds to a real Hadamard preceded and followed by a phase of i on the second mode, and the real Hadamard corresponds to a complex Hadamard preceded and followed by a phase of −i on the second mode. Both matrices are symmetric, but they differ in that $h^i$ applies the same operation to both the modes it acts on, while $h^r$ acts differently on the two modes. This means that, while the order of the input modes is irrelevant when the complex Hadamard is used, it is important if the real version is applied.

The two-mode imaginary Hadamard h' and the two-mode real Hadamard $h^r$ can be represented schematically as mode couplers 3703 and 3705, respectively. The transformations between the two are also shown via schematic elements 3707, where −i phase shifts applied to a mode are represented by open boxes and i phase shifts applied to a mode are represented by boxes with black fill. As already described above, these mode couplers can be physically implemented as beam splitters, directional couplers and the like.

The above description for two-mode Hadamard gates can be generalized to n-mode situations. More specifically an n-mode (also referred to herein as an n-th order Hadamard) real/imaginary Hadamard can be expressed as $$H_n^r = h^r \otimes h^r \otimes \ldots \otimes h^r = h^{r \otimes n}$$

$$H_n^i = h^i \otimes h^i \otimes \ldots \otimes h^i = h^{i \otimes n}$$

For example, the $2^{nd}$ order Hadamards are $$H_2^r = \frac{1}{2}\begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

$$H_2^i = \frac{1}{2}\begin{pmatrix} 1 & i & i & -1 \\ i & 1 & -1 & i \\ i & -1 & 1 & i \\ -1 & i & i & 1 \end{pmatrix}$$

More generally, the 2n×2n Hadamards (real or complex) can be decomposed into products of single beam splitters using the following formula:

$$H_n^{r(i)} = \prod_{j=1}^{log_2(N)} \left( \prod_{\substack{i=0 \\ i \bmod 2^j < 2^{j-1}}}^{N-1} h_{i,i+2^{j-1}}^{r(i)} \right)$$

Where $N = 2^n$ and the lower indices on $h^{r(i)}$ indicate the modes the beam splitters act on. For example, expanding this formula gives:

$H_1^{r(i)} = h_{0,1}^{r(i)}$ (2×2)

$H_2^{r(i)} = h_{0,1}^{r(i)} h_{2,3}^{r(i)} h_{0,2}^{r(i)} h_{1,3}^{r(i)}$ (4×4)

$H_3^{r(i)} = h_{0,1}^{r(i)} h_{2,3}^{r(i)} h_{4,5}^{r(i)} h_{6,7}^{r(i)} h_{0,2}^{r(i)} h_{1,3}^{r(i)} h_{4,6}^{r(i)} h_{5,7}^{r(i)} h_{0,4}^{r(i)} h_{1,5}^{r(i)} h_{2,6}^{r(i)} h_{3,7}^{r(i)}$ (8×8)

Schematic diagrams 3709 show one example of the real second order Hadamard. Likewise, schematic 3711 shows the imaginary second order Hadamard. Also included are the steps by which the real Hadamard can be converted to the imaginary Hadamard.

Figure 38:
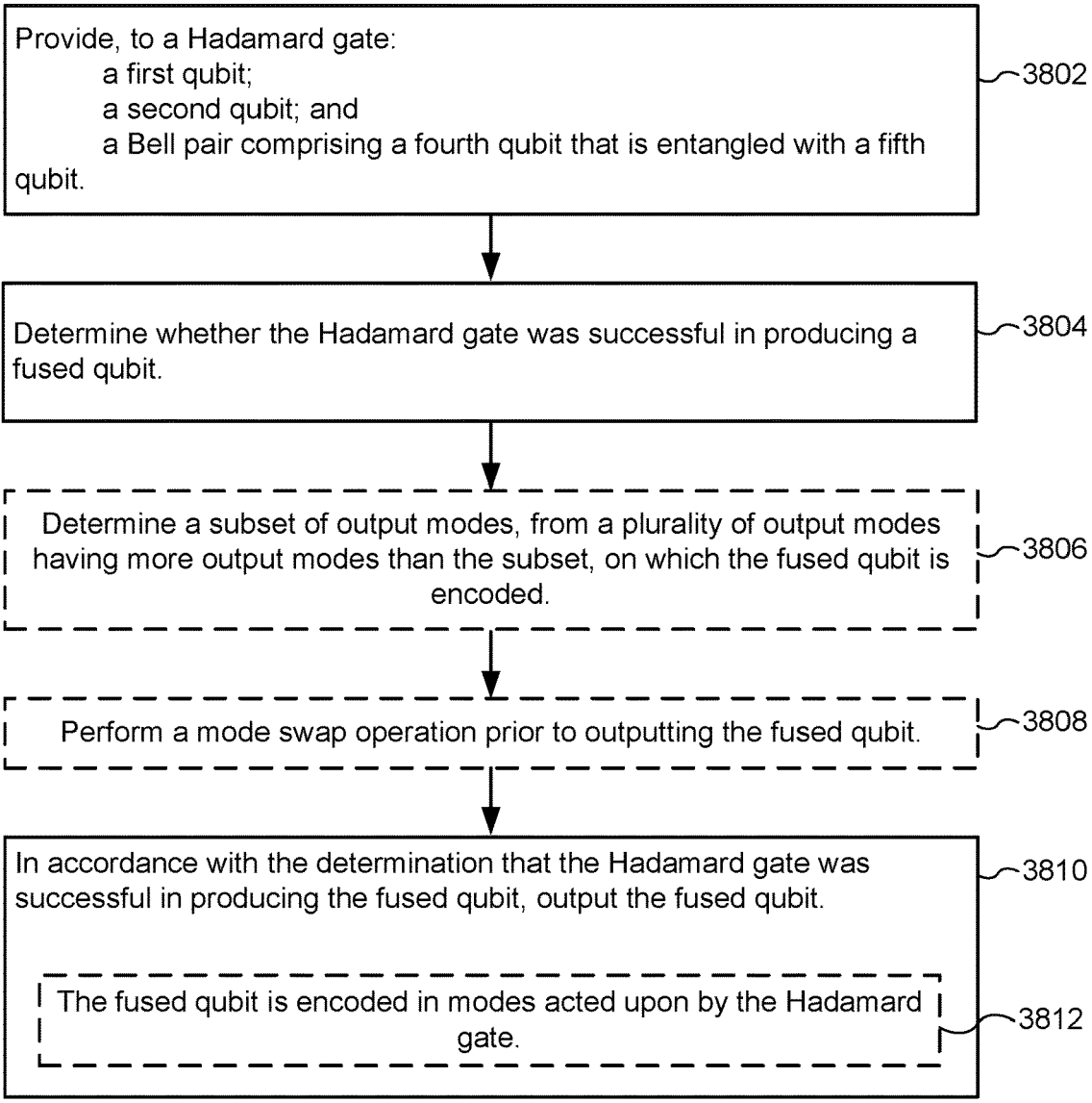
FIG. 38 illustrates a method of fusing groups of qubits, in accordance with some embodiments.

FIG. 38 illustrates a method 3800 of fusing groups of qubits, in accordance with some embodiments. In various embodiments, certain operations of method 3800 are performed by any of the devices described herein. For example, in some embodiments, method 3800 is performed at any of the devices shown in FIGS. 35B, 35F, 35G, and/or 36A-36C.

Method 3800 includes providing (3802), to a Hadamard gate (e.g., the Hadamard shown in FIG. 35B: a first qubit (e.g., entangled with a first quantum system); a second qubit (e.g., entangled with a second quantum system); and a Bell pair comprising a fourth qubit that is entangled with a fifth qubit (e.g., as shown in FIGS. 35B, 35F, and 35G). The Bell pair comprises an ancillae pair of qubits. For example, in some embodiments, the Hadamard gate includes: a first coupler coupling the second mode to the fourth mode, a second coupler coupling the sixth mode to the eighth mode; a third coupler coupling the second mode to the sixth mode; and a fourth coupler coupling the fourth mode to the eighth mode. In some embodiments, the first, second, third, and fourth couplers are 320:50 beam splitters (e.g., as shown in FIGS. 15A-15C). In some embodiments, the first, second, third, fourth, fifth, sixth, seventh, and eighth modes are defined by waveguides and the first qubit, second qubit, and Bell pair are path encoded in the waveguides.

Method 3800 includes determining (3804) whether the Hadamard gate was successful in producing a fused qubit (e.g., an output qubit that is fused with the first quantum system and the second quantum system). In some embodiments, determining that the second, fourth, sixth, and eighth mode photon detection results, collectively, herald successful qubit fusion includes determining that a sum of the second, fourth, sixth, and eighth mode photon detection results is an odd number of photons (e.g., see "Odd Number of Photons Detected," above).

In some embodiments, determining that the second, fourth, sixth, and eighth mode photon detection results, collectively, herald successful qubit fusion includes determining that a sum of the second, fourth, sixth, and eighth mode photon detection results is two photons (e.g., see "2 Photons Detected," above). In some embodiments, a determination that a sum of the second, fourth, sixth, and eighth mode photon detection results is two photons heralds that the fused qubit is a redundantly-encoded qubit (e.g., as illustrated in, and described with reference to FIG. 35D).

In some embodiments, method 3800 includes determining (3806) a subset of output modes, from a plurality of output modes having more output modes than the subset, on which the fused qubit is encoded. In some embodiments, determining the subset of output modes on which the fused qubit is encoded includes determining that the second, fourth, sixth, and eighth mode photon detection results, collectively, herald that the quantum state of the fused qubit is encoded in the first and third modes. In some embodiments, outputting the fused qubit includes: in accordance with a determination that the second, fourth, sixth, and eighth mode photon detection results, collectively, herald that the quantum state of the fused qubit is encoded in the first and third modes, outputting the fused qubit in the first and third modes.

In some embodiments, method 3800 includes performing (3808) a mode swap operation prior to outputting the fused qubit (e.g., when the output modes are not the first and third modes).

In some embodiments, method 3800 includes, in accordance with the determination that the Hadamard gate was successful in producing the fused qubit, outputting (3810) the fused qubit. In some embodiments, the fused qubit is encoded (3812) in modes acted upon by the Hadamard gate.

Figure 39:
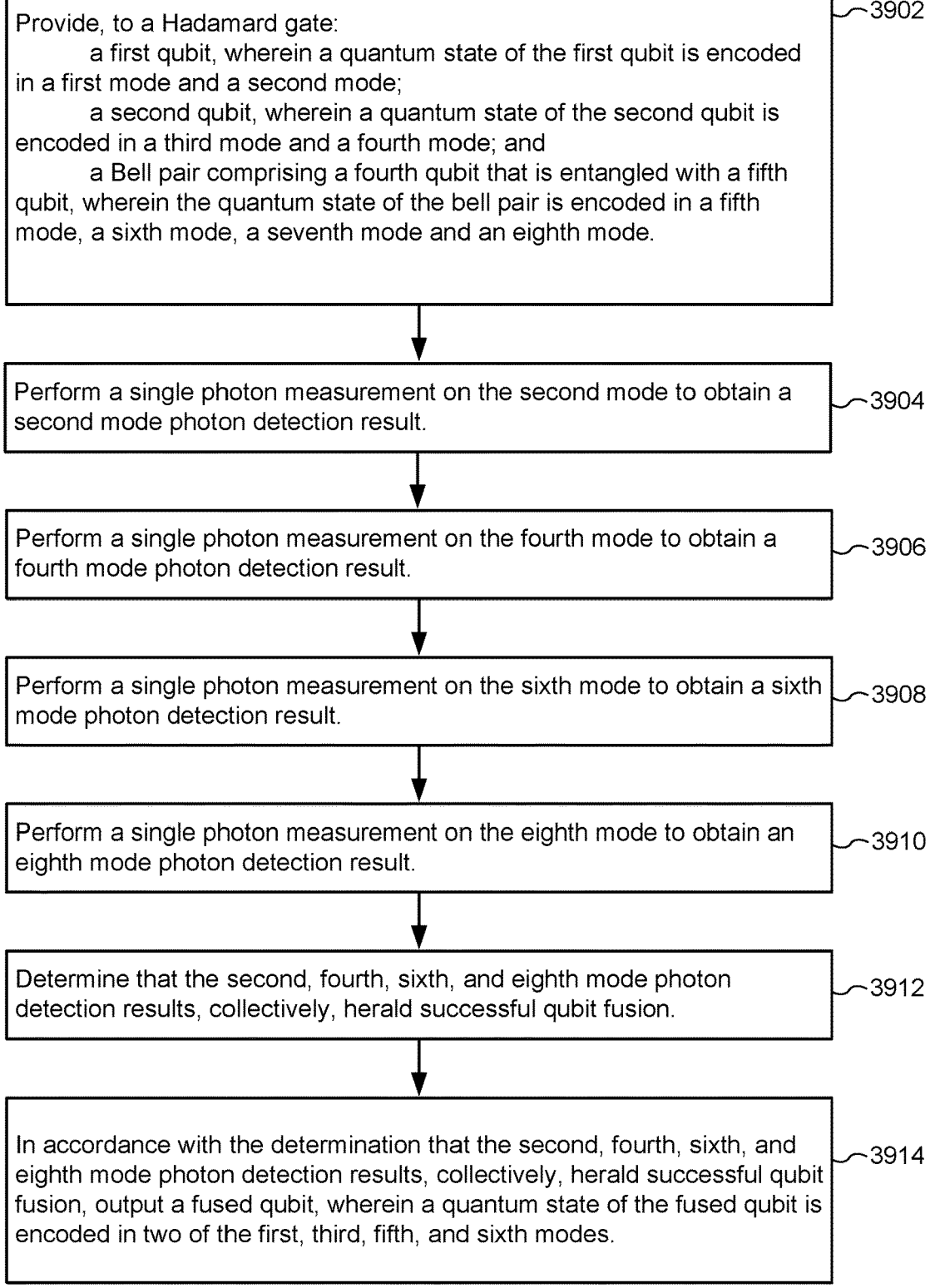
FIG. 39 illustrates a method of fusing groups of qubits, in accordance with some embodiments.

FIG. 39 illustrates a method 3900 of fusing groups of qubits, in accordance with some embodiments. In various embodiments, certain operations of method 3900 are performed by any of the devices described herein. For example, in some embodiments, method 3900 is performed at any of the devices shown in FIGS. 35B, 35F, 35G, and/or 36A-36C.

Method 3900 includes providing (3902), to a Hadamard gate: a first qubit, a second qubit, and a Bell pair. A quantum state of the first qubit is encoded in a first mode and a second mode. In some embodiments, the first qubit is entangled with a first quantum system. A quantum state of the second qubit is encoded in a third mode and a fourth mode. In some embodiments, the second qubit is entangled with a second quantum system. The Bell pair includes a fourth qubit that is entangled with a fifth qubit. The quantum state of the bell pair is encoded in a fifth mode, a sixth mode, a seventh mode and an eighth mode.

In some embodiments, the first, second, third, fourth, fifth, sixth, seventh, and eighth modes are defined by waveguides and the first qubit, second qubit, and Bell pair are path encoded in the waveguides.

In some embodiments, the Bell pair comprises an ancillae pair of qubits.

In some embodiments, the Hadamard gate includes: a first coupler coupling the second mode to the fourth mode; a second coupler coupling the sixth mode to the eighth mode; a third coupler coupling the second mode to the sixth mode; a fourth coupler coupling the fourth mode to the eighth mode.

Method 3900 includes performing (3904) a single photon measurement on the second mode to obtain a second mode photon detection result.

Method 3900 includes performing (3906) a single photon measurement on the fourth mode to obtain a fourth mode photon detection result.

Method 3900 includes performing (3908) a single photon measurement on the sixth mode to obtain a sixth mode photon detection result.

Method 3900 includes performing (3910) a single photon measurement on the eighth mode to obtain an eighth mode photon detection result.

Method 3900 includes determining (3912) that the second, fourth, sixth, and eighth mode photon detection results, collectively, herald successful qubit fusion. In some embodiments, method 3900 includes determining that the second, fourth, sixth, and eighth mode photon detection results, collectively, herald unsuccessful qubit fusion, including determining that a sum of the second, fourth, sixth, and eighth mode photon detection results is zero or four photons.

In some embodiments, determining that the second, fourth, sixth, and eighth mode photon detection results, collectively, herald successful qubit fusion includes determining that a sum of the second, fourth, sixth, and eighth mode photon detection results is an odd number of photons.

In some embodiments, determining that the second, fourth, sixth, and eighth mode photon detection results, collectively, herald successful qubit fusion includes determining that a sum of the second, fourth, sixth, and eighth mode photon detection results is two photons. In some embodiments, a determination that a sum of the second, fourth, sixth, and eighth mode photon detection results is two photons heralds that the fused qubit is a redundantly-encoded qubit.

Method 3900 includes, in accordance with the determination that the second, fourth, sixth, and eighth mode photon detection results, collectively, herald successful qubit fusion, outputting (3914) a fused qubit. The quantum state of the fused qubit is encoded in two of the first, third, fifth, and sixth modes. In some embodiments, the fused qubit is entangled with the first quantum system and the second quantum system.

Note that, in accordance with some embodiments, the exact labeling of the various modes (e.g., the first mode, third mode, etc.) is not important. Rather, it suffices to say that the fused qubit is encoded on two of the modes on which no detection operation was performed. In some embodiments, the possible output modes include one mode from each of the input qubits (e.g., the first, second, third, and fourth qubits). The detected modes include another (different) mode from each of the input qubits.

In some embodiments, method 3900 includes determining that the second, fourth, sixth, and eighth mode photon detection results, collectively, herald that the quantum state of the fused qubit is encoded in the first and third modes. Outputting the fused qubit includes: in accordance with a determination that the second, fourth, sixth, and eighth mode photon detection results, collectively, herald that the quantum state of the fused qubit is encoded in the first and third modes, outputting the fused qubit in the first and third modes.

XII. ADAPTIVE PHOTON SUBTRACTION SYSTEMS

One or more embodiments disclosed herein provide methods and systems for adaptive photon subtraction (of which the embodiments described above with reference to "thin slicing" and "primates" are examples). In such systems, adaptive photon subtraction is a way of increasing success probabilities of probabilistic photon subtraction of greater than or equal to 1 photons from greater than or equal to 1 modes by potentially repeating the probabilistic photon subtraction process, based on the heralding signals from each attempt at probabilistic photon subtraction. Accordingly, the methods and systems disclosed herein can be employed to increase the success probability of any process that employs probabilistic photon subtraction to generate a desired quantum state.

For example, FIG. 23A, shows one example of a system that employs adaptive photon subtraction on the state $$|\Psi_1\rangle = |1111\rangle_{a,b,c,d}$$

to generate Bell pairs on the same four modes (a, b, c, d) by removing two photons. However, any number of modes producing any final entangled state can be employed without departing from the scope of the present disclosure.

Furthermore, while the figures such as FIG. 23A show photon subtraction being accomplished by coupling a first mode (e.g., 2302a) to second (vacuum) mode followed by measurement on the second mode, any physical process that results in photon subtraction can be employed without departing from the scope of the present disclosure. For example, a photon detector could be integrated directly with the first mode such that the photon couples out of the first mode and into the detector. Examples of this architecture include a superconducting nanowire single photon detector that is formed from a layer of superconducting material disposed above, below, or laterally adjacent to the first mode.

Furthermore, while some of the embodiments illustrated in the various drawings show temporally-sequential photon subtraction stages (as implied by the path of the photon, e.g., in mode 2302, a photon will encounter couplers 2306, then couplers 2316, then couplers 2326, etc.), other physical realizations are possible. For example, the photon path can be curved or folded, or even be part of an optical cavity looped (e.g., a micro-ring resonator that is circular, elliptical and the like) such that the photon repeatedly encounters the same photon subtraction hardware (e.g., the superconducting detector) at each pass through the loop. In other examples, the optical cavity can be designed to have a detuning that depends on the absorption of a specific number of photons in some element in this cavity. Other examples of designs for photon detectors and couplers include those shown in U.S. Patent Application No. 62/627,115 filed Feb. 6, 2018, corresponding International Patent Application No. PCT/US2019/016885 filed Feb. 6, 2019, and corresponding U.S. patent application Ser. No. 16/450,911 filed Jun. 24, 2019, which has been published as U.S. Patent Publication No. 2019/0323886, each of which is hereby incorporated by reference in its entirety for all purposes. Other examples of photon couplers and detectors that can be employed include those in U.S. Application No. 62/665,491 filed May 1, 2018, and corresponding International Patent Application No. PCT/US2019/030019 filed Apr. 30, 2019, which has been published as WO 2019/213147, each of which is hereby incorporated by reference in its entirety for all purposes.

XIII. CONCLUDING REMARKS

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc., are, in some instances, used herein to describe various elements, these elements should not be limited by these terms. These terms are only used to distinguish one element from another. For example, a first switch could be termed a second switch, and, similarly, a second switch could be termed a first switch, without departing from the scope of the various described embodiments. The first switch and the second switch are both switches, but they are not the same switch unless explicitly stated as such.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of generating an m photon entangled state, the method comprising:
   inputting a photon into a respective input mode of each of a plurality of sets of modes, wherein each of the plurality of sets of modes is coupled to an input mode of a different set of modes of the plurality of sets of modes;
   performing a first detection operation that includes detecting zero or more photons in the plurality of sets of modes; and
   in accordance with a determination, based on a number of photons detected in the first detection operation, that more than m photons remain in the plurality of sets of modes after the first detection operation:
      performing a second detection operation that includes detecting zero or more photons in the plurality of sets of modes;
      determining, based at least in part on a number of photons detected in the second detection operation, whether the photons remaining in the plurality of sets of modes after the second detection operation are in the m photon entangled state; and
      in accordance with a determination that the photons remaining in the plurality of sets of modes after the second detection operation are in the m photon entangled state, outputting the photons remaining in the plurality of sets of modes.

2. The method of claim 1, wherein each set of modes of the plurality of sets of modes includes at least two modes.

3. The method of claim 1, wherein respective modes of each set of modes of the plurality of sets of modes are coupled to produce a photonic state for the plurality of sets of modes.

4. The method of claim 1, further including:
   determining, based at least in part on a number of photons detected in the second detection operation, whether the photons remaining in the plurality of sets of modes after the second detection operation are in a state convertible to the m photon entangled state; and
   in accordance with a determination that the photons remaining in the plurality of sets of modes after the second detection operation are in the state convertible to the m photon entangled state, outputting the photons remaining in the plurality of sets of modes to a circuit for converting the state to the m photon entangled state.

5. The method of claim 4, wherein determining whether the photons remaining in the plurality of sets of modes after the second detection operation are in a state convertible to the m photon entangled state includes determining that the photons remaining in the plurality of sets of modes are in a state that is deterministically convertible to the m photon entangled state.

6. The method of claim 4, wherein determining whether the photons remaining in the plurality of sets of modes after the second detection operation are in a state convertible to the m photon entangled state includes determining that the photons remaining in the plurality of sets of modes are convertible to the m photon entangled state with a success probability that is less than 1.

7. The method of claim 1, further including:
   in accordance with a determination, based on a number of photons detected in the second detection operation, that more than m photons remain in the plurality of sets of modes after the second detection operation:
      performing a third detection operation that includes detecting zero or more photons in the plurality of sets of modes;
      determining, based at least in part on a number of photons detected in the third detection operation, whether the photons remaining in the plurality of sets of modes after the third detection operation are in the m photon entangled state; and
      in accordance with a determination that the photons remaining in the plurality of sets of modes after the third detection operation are in the m photon entangled state, outputting the photons remaining in the plurality of sets of modes.

8. The method of claim 1, wherein the plurality of sets of modes consists of m sets of modes.

9. The method of claim 1, wherein the m photon entangled state is a Bell state.

10. The method of claim 1, wherein the m photon entangled state is an m-photon GHZ state.

11. A device for generating an m photon entangled state, the device comprising:
    a plurality of sets of modes, wherein each set of modes of the plurality of sets of modes includes an input mode;
    a first set of couplers coupling the input mode of each of the plurality of sets of modes to the input mode of a different set of modes of the plurality of sets of modes; and
    a controller configured to:
       perform a first detection operation that includes detecting zero or more photons in the plurality of sets of modes; and
       in accordance with a determination, based on a number of photons detected in the first detection operation, that more than m photons remain in the plurality of sets of modes after the first detection operation:
          perform a second detection operation that includes detecting zero or more photons in the plurality of sets of modes;
          determine, based at least in part on a number of photons detected in the second detection operation, whether the photons remaining in the plurality of sets of modes after the second detection operation are in the m photon entangled state; and
          in accordance with a determination that the photons remaining in the plurality of sets of modes after the second detection operation are in the m photon entangled state, output the photons remaining in the plurality of sets of modes.

12. The device of claim 11, wherein each set of modes of the plurality of sets of modes includes at least two modes.

13. The device of claim 11, further comprising a second set of couplers that couples respective modes of each set of modes of the plurality of sets of modes to produce a photonic state for the plurality of sets of modes.

14. The device of claim 11, wherein the controller is configured to:
    determine, based at least in part on a number of photons detected in the second detection operation, whether the photons remaining in the plurality of sets of modes after the second detection operation are in a state convertible to the m photon entangled state; and in accordance with a determination that the photons remaining in the plurality of sets of modes after the second detection operation are in the state convertible to the m photon entangled state, output the photons remaining in the plurality of sets of modes to a circuit for converting the state to the m photon entangled state.

15. The device of claim 14, wherein determining whether the photons remaining in the plurality of sets of modes after the second detection operation are in a state convertible to the m photon entangled state includes determining that the photons remaining in the plurality of sets of modes are in a state that is deterministically convertible to the m photon entangled state.

16. The device of claim 14, wherein determining whether the photons remaining in the plurality of sets of modes after the second detection operation are in a state convertible to the m photon entangled state includes determining that the photons remaining in the plurality of sets of modes are convertible to the m photon entangled state with a success probability that is less than 1.

17. The device of claim 11, wherein the controller is configured to:

in accordance with a determination, based on a number of photons detected in the second detection operation, that more than m photons remain in the plurality of sets of modes after the second detection operation:

perform a third detection operation that includes detecting zero or more photons in the plurality of sets of modes;

determine, based at least in part on a number of photons detected in the third detection operation, whether the photons remaining in the plurality of sets of modes after the third detection operation are in the m photon entangled state; and in accordance with a determination that the photons remaining in the plurality of sets of modes after the third detection operation are in the m photon entangled state, output the photons remaining in the plurality of sets of modes.

18. The device of claim 11, wherein the plurality of sets of modes consists of m sets of modes.

19. The device of claim 11, wherein the m photon entangled state is a Bell state.

20. The device of claim 11, wherein the m photon entangled state is an m-photon GHZ state.

\* \* \* \* \*